United States Patent
Takao et al.

(10) Patent No.: US 8,358,908 B2
(45) Date of Patent: Jan. 22, 2013

(54) RECORDING AND PLAYBACK APPARATUS

(75) Inventors: Naoya Takao, Hyogo (JP); Seigo Takayama, Osaka (JP)

(73) Assignee: Panasonic Corporation, Osaka (JP)

( * ) Notice: Subject to any disclaimer, the term of this patent is extended or adjusted under 35 U.S.C. 154(b) by 320 days.

(21) Appl. No.: 12/544,507

(22) Filed: Aug. 20, 2009

(65) Prior Publication Data

US 2010/0046929 A1 Feb. 25, 2010

(30) Foreign Application Priority Data

Aug. 22, 2008 (JP) ................. 2008-213779

(51) Int. Cl.
*H04N 9/80* (2006.01)
(52) U.S. Cl. ............ 386/241; 386/E5.001; 725/87
(58) Field of Classification Search ........ 386/241, 386/E5.001; 725/87
See application file for complete search history.

(56) References Cited

U.S. PATENT DOCUMENTS

| | | | |
|---|---|---|---|
| 5,862,299 A | 1/1999 | Lee et al. | |
| 6,993,508 B1 * | 1/2006 | Major et al. | 705/51 |
| 8,028,322 B2 | 9/2011 | Riedl et al. | |
| 2002/0120667 A1 | 8/2002 | Nakano | |
| 2003/0074868 A1 | 4/2003 | Yasuoka et al. | |
| 2003/0077074 A1 | 4/2003 | Okamoto et al. | |
| 2003/0099456 A1 | 5/2003 | Ohmura et al. | |
| 2003/0158741 A1 | 8/2003 | Nakano | |
| 2004/0064380 A1 | 4/2004 | Hiratsuka | |
| 2005/0177624 A1 | 8/2005 | Oswald et al. | |
| 2005/0283440 A1 | 12/2005 | Saeki et al. | |
| 2006/0015815 A1 | 1/2006 | Okamoto | |
| 2006/0082467 A1 | 4/2006 | Funk et al. | |
| 2006/0218604 A1 | 9/2006 | Riedl et al. | |
| 2006/0227686 A1 | 10/2006 | Nakade | |
| 2007/0054658 A1 * | 3/2007 | Guyard et al. | 455/414.1 |
| 2007/0081430 A1 | 4/2007 | Maeda | |
| 2007/0265966 A1 * | 11/2007 | Kahn et al. | 705/51 |
| 2008/0063384 A1 | 3/2008 | Tanaka et al. | |
| 2008/0104539 A1 | 5/2008 | Ikeda | |
| 2008/0162666 A1 * | 7/2008 | Ebihara et al. | 709/217 |
| 2008/0186527 A1 | 8/2008 | Eguchi et al. | |
| 2008/0307533 A1 | 12/2008 | Hanai | |

(Continued)

FOREIGN PATENT DOCUMENTS

JP 10-013816 A 1/1998

(Continued)

OTHER PUBLICATIONS

The extended European search report for EP Application No. 09 80 8076 dated Aug. 8, 2011.

*Primary Examiner* — Thai Tran
*Assistant Examiner* — Girumsew Wendmagegn
(74) *Attorney, Agent, or Firm* — Panasonic Patent Center

(57) ABSTRACT

A recording and playback apparatus includes a recording unit configured to download a content stored in a server and to record the content in a recording medium, an instruction receiver configured to receive a stop instruction for stopping download of the content done by the recording unit, and a controller configured to control the recording unit. The controller controls the recording unit so as to stop the download of the content when the instruction receiver receives the stop instruction for stopping download of the content, and to restart the download of the content when a predetermined time elapses in which the recording unit is in a stop state of the download.

10 Claims, 46 Drawing Sheets

U.S. PATENT DOCUMENTS

| | | |
|---|---|---|
| 2008/0320533 A1 | 12/2008 | Kitazato |
| 2009/0088145 A1 | 4/2009 | Inohiza |
| 2009/0151000 A1 | 6/2009 | Okamoto et al. |
| 2009/0178070 A1 | 7/2009 | Mitsuji et al. |
| 2009/0268905 A1 | 10/2009 | Matsushima et al. |
| 2010/0088715 A1 | 4/2010 | Sloo |
| 2010/0232759 A1 | 9/2010 | Suga |
| 2010/0275006 A1 | 10/2010 | Mio et al. |

FOREIGN PATENT DOCUMENTS

| | | |
|---|---|---|
| JP | 2000-184338 | 6/2000 |
| JP | 2001-195807 | 7/2001 |
| JP | 2002-100158 | 4/2002 |
| JP | 2002-251819 | 9/2002 |
| JP | 2002-325224 | 11/2002 |
| JP | 2002-369119 | 12/2002 |
| JP | 2003-186751 | 7/2003 |
| JP | 2003-237714 | 8/2003 |
| JP | 2003-259286 | 9/2003 |
| JP | 2004-21882 | 1/2004 |
| JP | 2004-117798 | 4/2004 |
| JP | 2005-301776 | 10/2005 |
| JP | 2006-004072 | 1/2006 |
| JP | 2006-031484 | 2/2006 |
| JP | 2006-80974 | 3/2006 |
| JP | 2006-173766 | 6/2006 |
| JP | 2006-279895 | 10/2006 |
| JP | 2006-286051 | 10/2006 |
| JP | 2006-295395 | 10/2006 |
| JP | 2008-109316 | 5/2008 |
| JP | 2008-118205 | 5/2008 |
| JP | 2008-134992 | 6/2008 |
| JP | 2008-176880 | 7/2008 |
| JP | 2008-192089 | 8/2008 |
| JP | 2008-193537 | 8/2008 |
| JP | 2008-271170 | 11/2008 |
| JP | 2008-278090 | 11/2008 |
| JP | 2008-310809 | 12/2008 |
| JP | 2009-027210 | 2/2009 |
| WO | 92/22983 | 12/1992 |
| WO | 2007/007764 | 1/2007 |
| WO | 2007/136006 | 11/2007 |

* cited by examiner

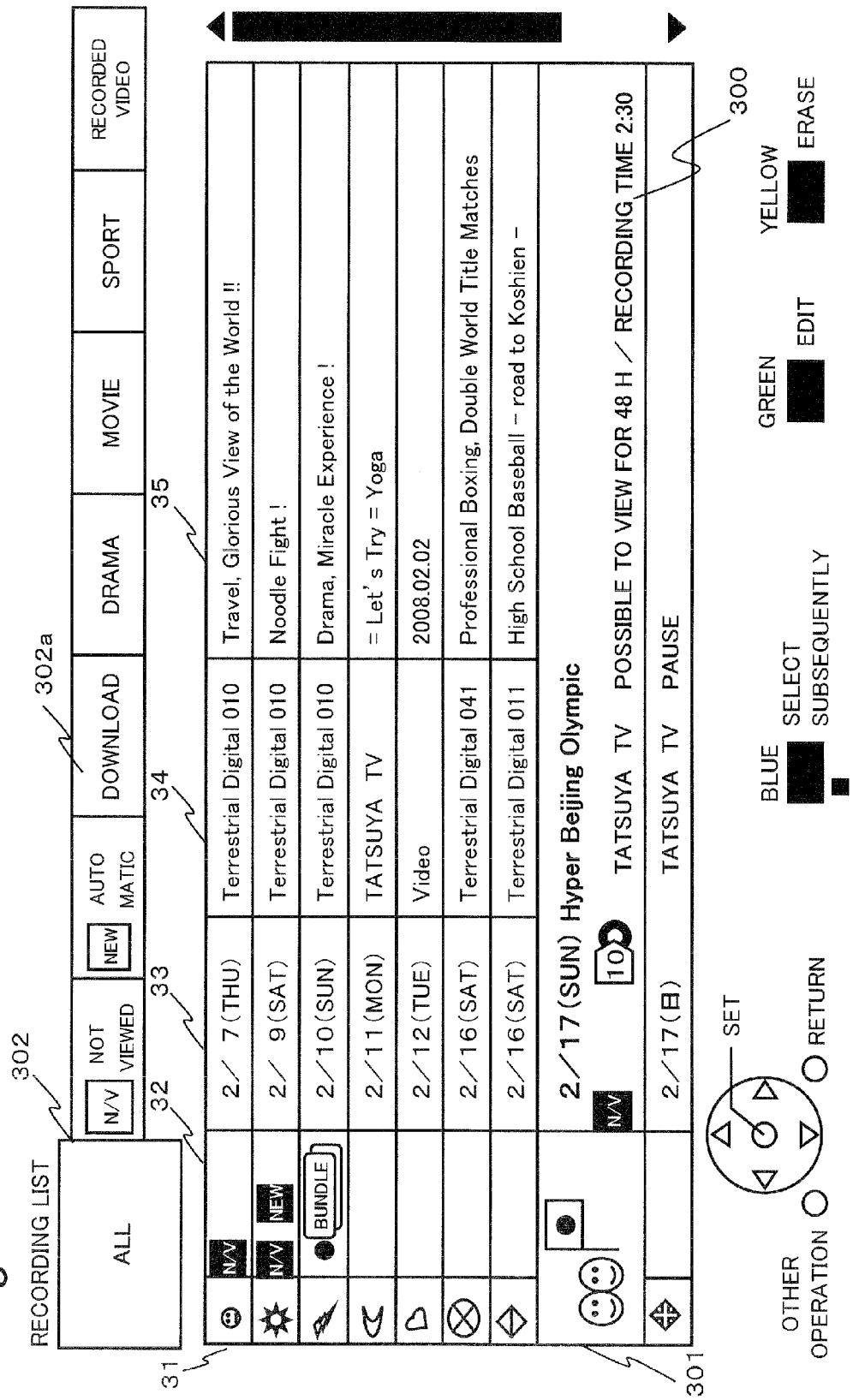

Fig. 5A

RECORDING LIST | ALL | NOT VIEWED N/V | NEW | AUTOMATIC | DOWNLOAD | DRAMA | MOVIE | SPORT | RECORDED VIDEO

CONFIRMATION OF PLAYBACK OF PROGRAM WITH PLAYBACK TIME LIMIT

Hyper Beijing Olympic

Playback time limit is set to this program.
When starting playback now, Playback time limit is:
February 19, 2008   12:34.
Is it OK to start playback?

PLAYBACK START

CANCEL

SET

RETURN

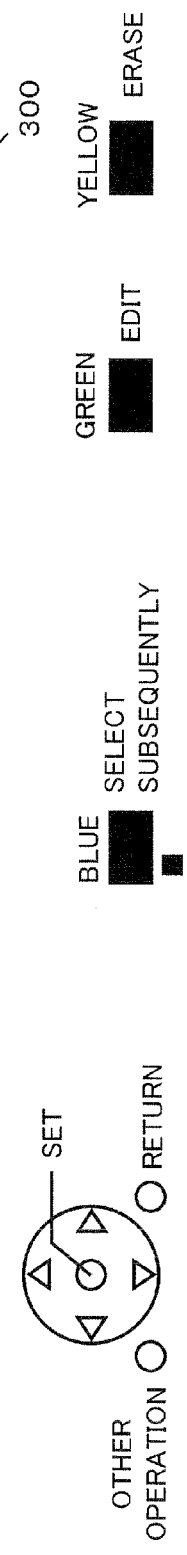

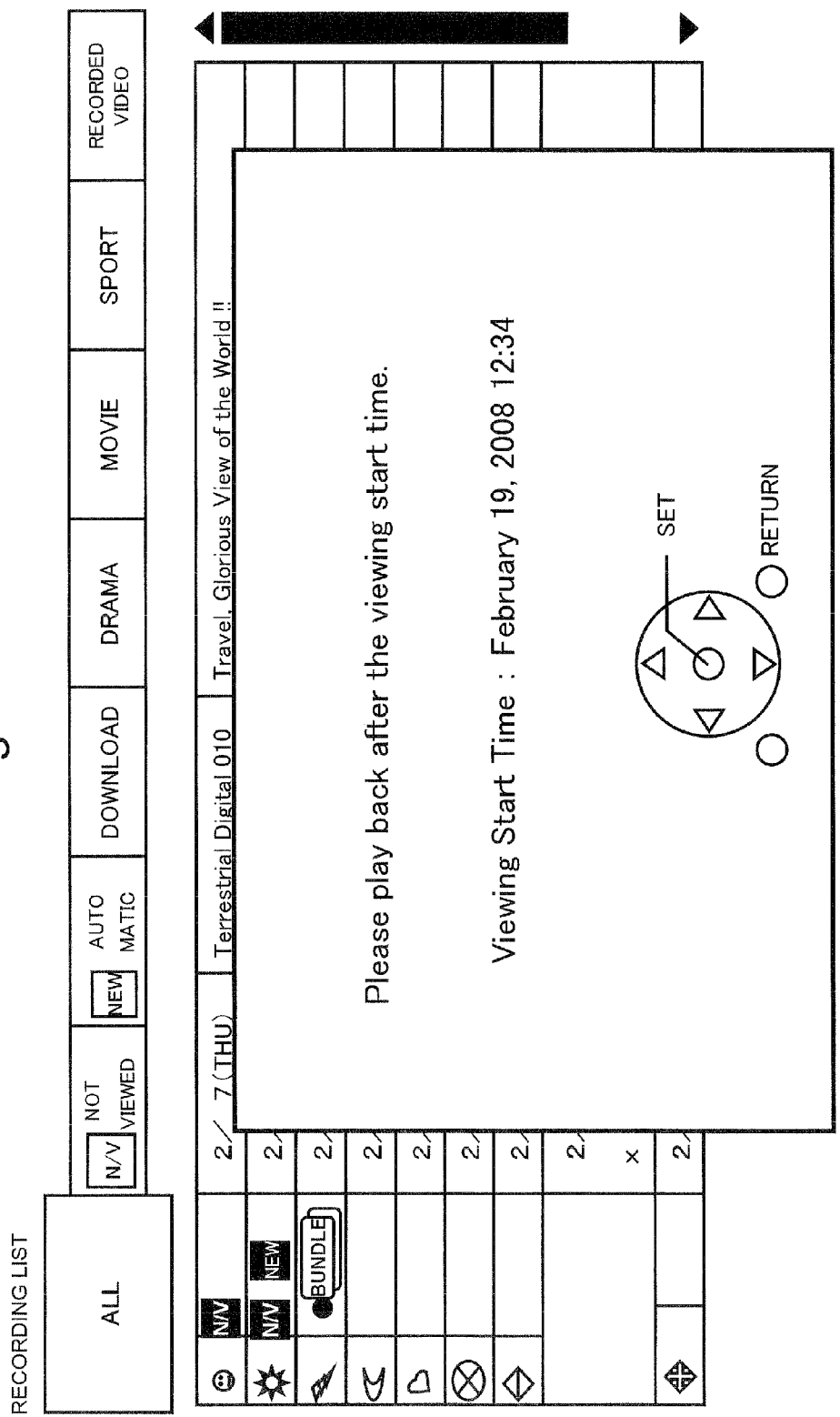

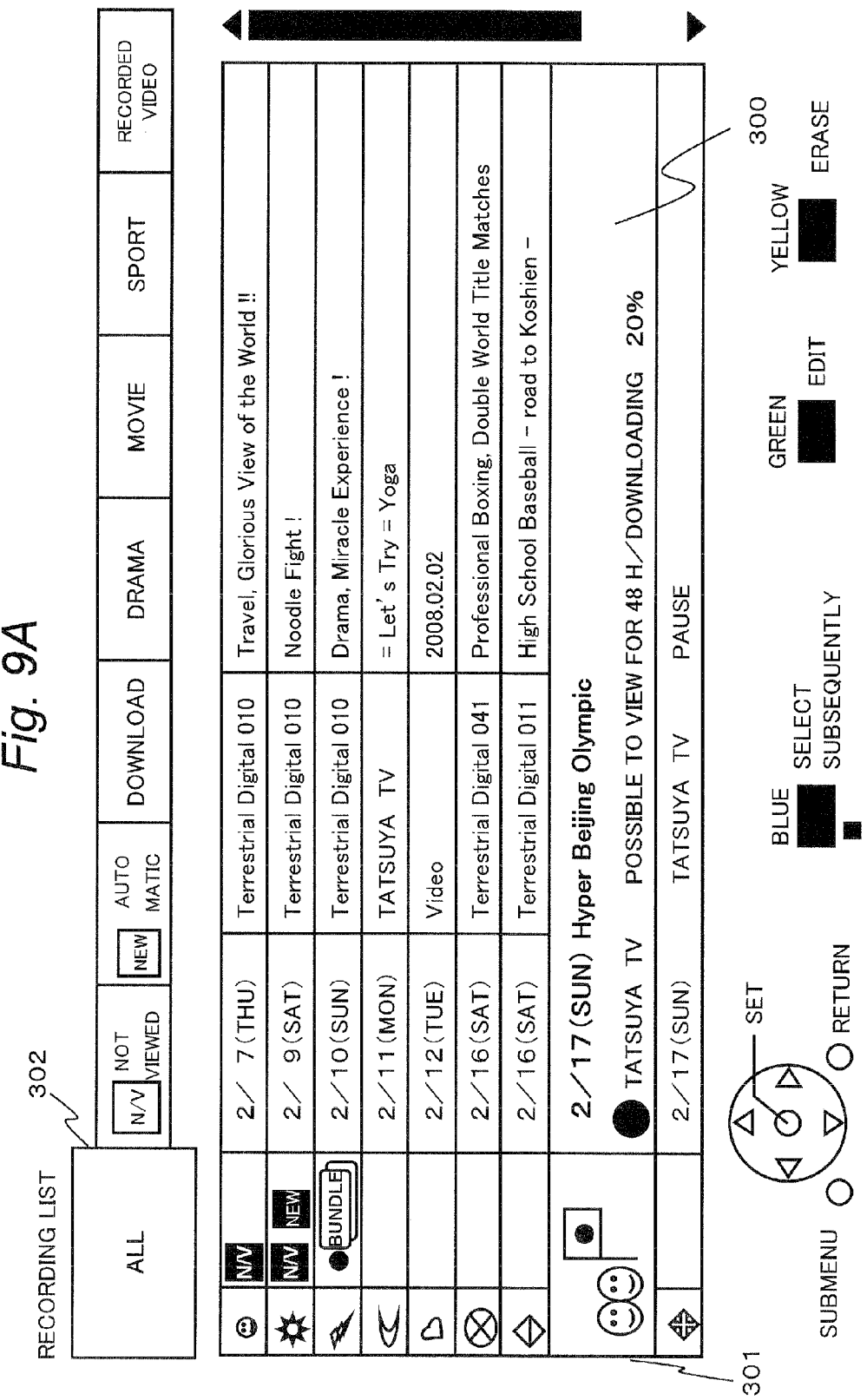

Fig. 9B

| RECORDING LIST | | NOT VIEWED | NEW | AUTO MATIC | | | | |
|---|---|---|---|---|---|---|---|---|
| | ALL | | | DOWNLOAD | DRAMA | MOVIE | SPORT | RECORDED VIDEO |
| ◉ | N/V | 2/ 7 (THU) | | Terrestrial Digital 010 | Travel, Glorious View of the World !! | | | |
| ☼ | N/V NEW | 2/ 9 (SAT) | | Terrestrial Digital 010 | Noodle Fight ! | | | |
| ✎ | BUNDLE | 2/10 (SUN) | | TATSUYA TV | Drama, Miracle Experience !   Number of Content: 3 | | | |
| ℭ | | 2/11 (MON) | | TATSUYA TV | = Let's Try = Yoga | | | |
| △ | | 2/12 (TUE) | | Video | 2008.02.02 | | | |
| ⊗ | | 2/16 (SAT) | | Terrestrial Digital 041 | Professional Boxing, Double World Title Matches | | | |
| ◇ | | 2/16 (SAT) | | Terrestrial Digital 011 | High School Baseball – road to Koshien – | | | |
| 👥 | | 2/17 (SUN) | | TATSUYA TV | Frenetic, Beijing Olympic | | | |

40

BLUE ■ SELECT        RED ■ IN         GREEN ■ EDIT    YELLOW ■ ERASE
      SUBSEQUENTLY        DOWNLOAD

OTHER
OPERATION ○     ─ SET
             ○ RETURN

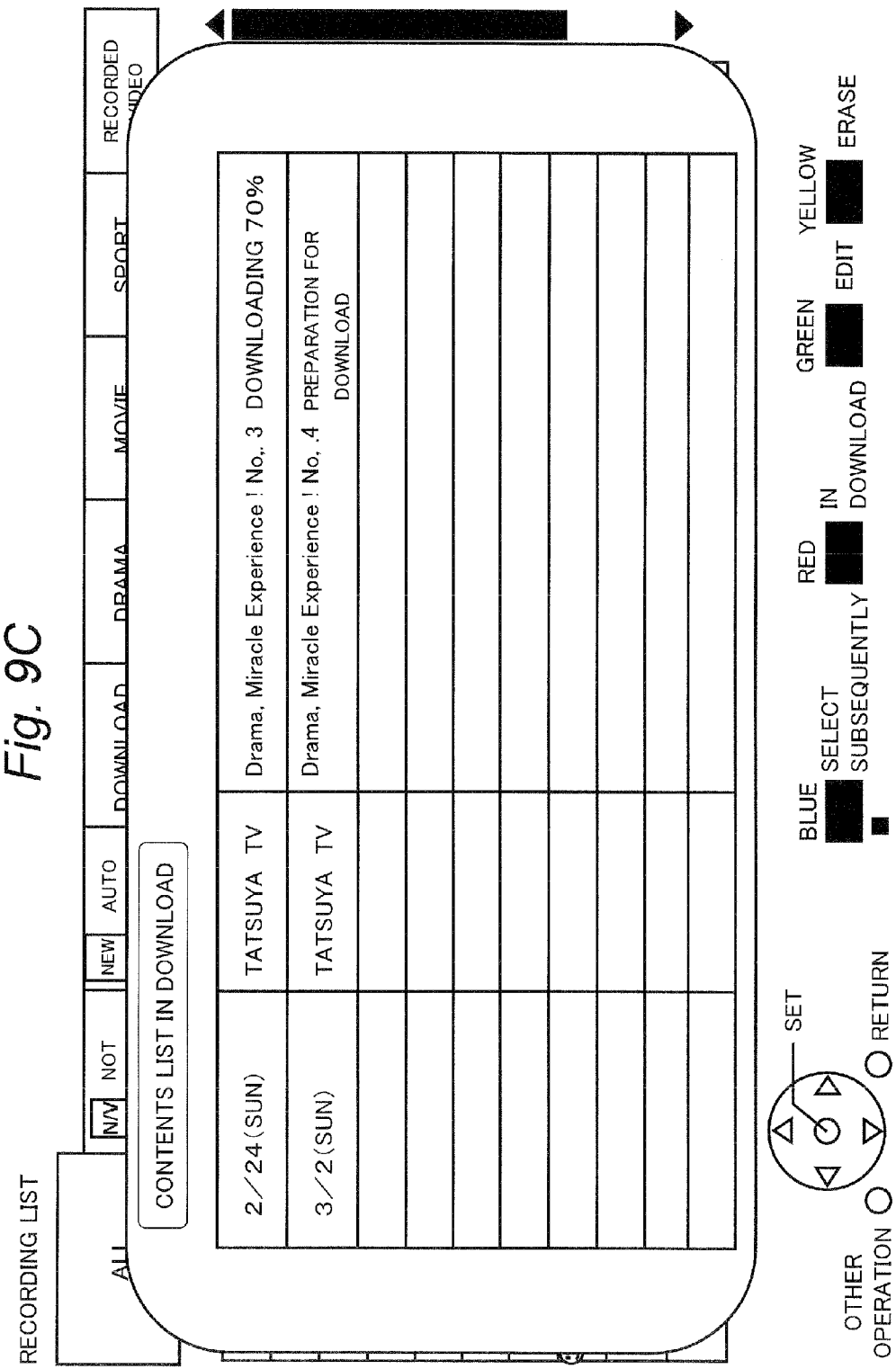

Fig. 12B

| RECORDING LIST | | | | | | | |
|---|---|---|---|---|---|---|---|
| ALL | N/V NOT VIEWED | NEW | AUTO MATIC | DOWNLOAD | DRAMA | MOVIE | SPORT | RECORDED VIDEO |

◄ ▬▬▬▬▬▬▬▬▬▬▬▬▬▬ ►

| | | | |
|---|---|---|---|
| ☺ N/V | 2/ 7 (THU) | Terrestrial Digital 010 | Travel, Glorious View of the World !! |
| ☼ N/V NEW | 2/ 9 (SAT) | Terrestrial Digital 010 | Noodle Fight ! |
| ⚐ BUNDLE | 2/10 (SUN) | TATSUYA TV | Drama, Miracle Experience ! ⟩ Number of Contents: 2 |
| ⋎ | 2/11 (MON) | TATSUYA TV | = Let's Try = Yoga |
| △ | 2/12 (TUE) | Video | 2008.02.02 |
| ⊗ | 2/16 (SAT) | Terrestrial Digital 041 | Professional Boxing, Double World Title Matches |
| ◇ | 2/16 (SAT) | Terrestrial Digital 011 | High School Baseball – road to Koshien – |
| 📅 | 2/17 (SUN) | TATSUYA TV | Hyper, Beijing Olympic |
| | 2/24 (SUN) | Drama, Miracle Experience ! No. 3 | |
| | | TATSUYA TV  DOWNLOADING 70% | |

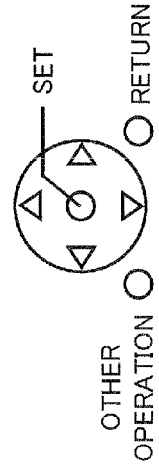

BLUE ▮ SELECT SUBSEQUENTLY    GREEN ▮ EDIT    YELLOW ▮ ERASE

OTHER OPERATION ○

Fig. 12C

| RECORDING LIST | | | | | | |
|---|---|---|---|---|---|---|
| ALL | N/V NOT VIEWED | NEW | AUTO MATIC | DOWNLOAD. | DRAMA | MOVIE | SPORT | RECORDED VIDEO |

| | | | |
|---|---|---|---|
| ☺ | 2/ 7(THU) | Terrestrial Digital 010 | Travel, Glorious View of the World !! |
| ☼ NEW | 2/ 9(SAT) | Terrestrial Digital 010 | Noodle Fight ! |
| ⚡ BUNDLE | 2/10(SUN) | TATSUYA TV | Drama, Miracle Experience !  *(Number of Contents: 3)* |
| ⌒ | 2/11(MON) | TATSUYA TV | = Let's Try = Yoga |
| △ | 2/12(TUE) | Video | 2008.02.02 |
| ⊗ | 2/16(SAT) | Terrestrial Digital 041 | Professional Boxing, Double World Title Matches |
| ◇ | 2/16(SAT) | Terrestrial Digital 011 | High School Baseball – road to Koshien – |
| 🎱 | 2/17(SUN) | TATSUYA TV | Hyper, Beijing Olympic |

300

OTHER OPERATION ○   SET △◁○▷▽   ○ RETURN

BLUE  SELECT SUBSEQUENTLY    GREEN  EDIT    YELLOW  ERASE

Fig. 12D

| RECORDING LIST (BUNDLE DISPLAY: DETAIL) | | | | | | | | | | | |
|---|---|---|---|---|---|---|---|---|---|---|---|
| ALL | N/V NOT VIEWED | NEW AUTO MATIC | DOWNLOAD | DRAMA | MOVIE | SPORT | RECORDED VIEDO | | | | |
| ☺ | | 2/10(SUN) | TATSUYA TV | Drama, Miracle Experience ! No. 1 | | | | | | | |
| ☼ | | 2/17 (SUN) | TATSUYA TV | Drama, Miracle Experience ! No. 2 | | | | | | | |
| ✎ | N/V | 2/24 (SUN) | TATSUYA TV | Drama, Miracle Experience ! No. 3 | | | | | | | |
| | | | | | | | | | | | |
| | | | | | | | | | | | |
| | | | | | | | | | | | |
| | | | | | | | | | | | |
| | | | | | | | | | | | |

300

BLUE ▮ SELECT SUBSEQUENTLY   GREEN ▮ EDIT   YELLOW ▮ ERASE

SET — ◁ △ ▷ ▽   ○ RETURN
OTHER OPERATION ○

Fig. 14

| RECORDING LIST | | | | | | | |
|---|---|---|---|---|---|---|---|
| ALL | NOT VIEWED N/V | AUTOMATIC NEW | DOWNLOAD | DRAMA | MOVIE | SPORT | RECORDED VIDEO |

| | | | | |
|---|---|---|---|---|
| ☺ | N/V | 2/ 7 (THU) | Terrestrial Digital 010 | Travel, Glorious View of the World !! |
| ☆ | N/V NEW | 2/ 9 (SAT) | Terrestrial Digital 010 | Noodle Fight ! |
| ⚡ | [BUNDLE] ● | 2/10 (SUN) | Terrestrial Digital 010 | Drama, Miracle Experience ! |
| ᐯ | | 2/11 (MON) | TATSUYA TV | = Let's Try = Yoga |
| △ | | 2/12 (TUE) | Video | 2008.02.02 |
| ⊗ | | 2/16 (SAT) | Terrestrial Digital 041 | Professional Boxing, Double World Title Matches |
| ◇ | | 2/16 (SAT) | Terrestrial Digital 011 | High School Baseball – road to Koshien – |
| ☺☺ ● | | 2/17(SUN) Hyper Beijing Olympic<br>TATSUYA TV     NOT VIEWED/POSSIBLE TO VIEW FOR 48 H AFTER START OF VIEWING<br>／RECORDING TIME 2:30     (R20 PROGRAM) |
| ✥ | | 2/17 (SUN) | TATSUYA TV | |

OTHER OPERATION ○    ○ SET    ○ RETURN

BLUE ■ SELECT SUBSEQUENTLY    GREEN ■ EDIT    YELLOW ■ ERASE

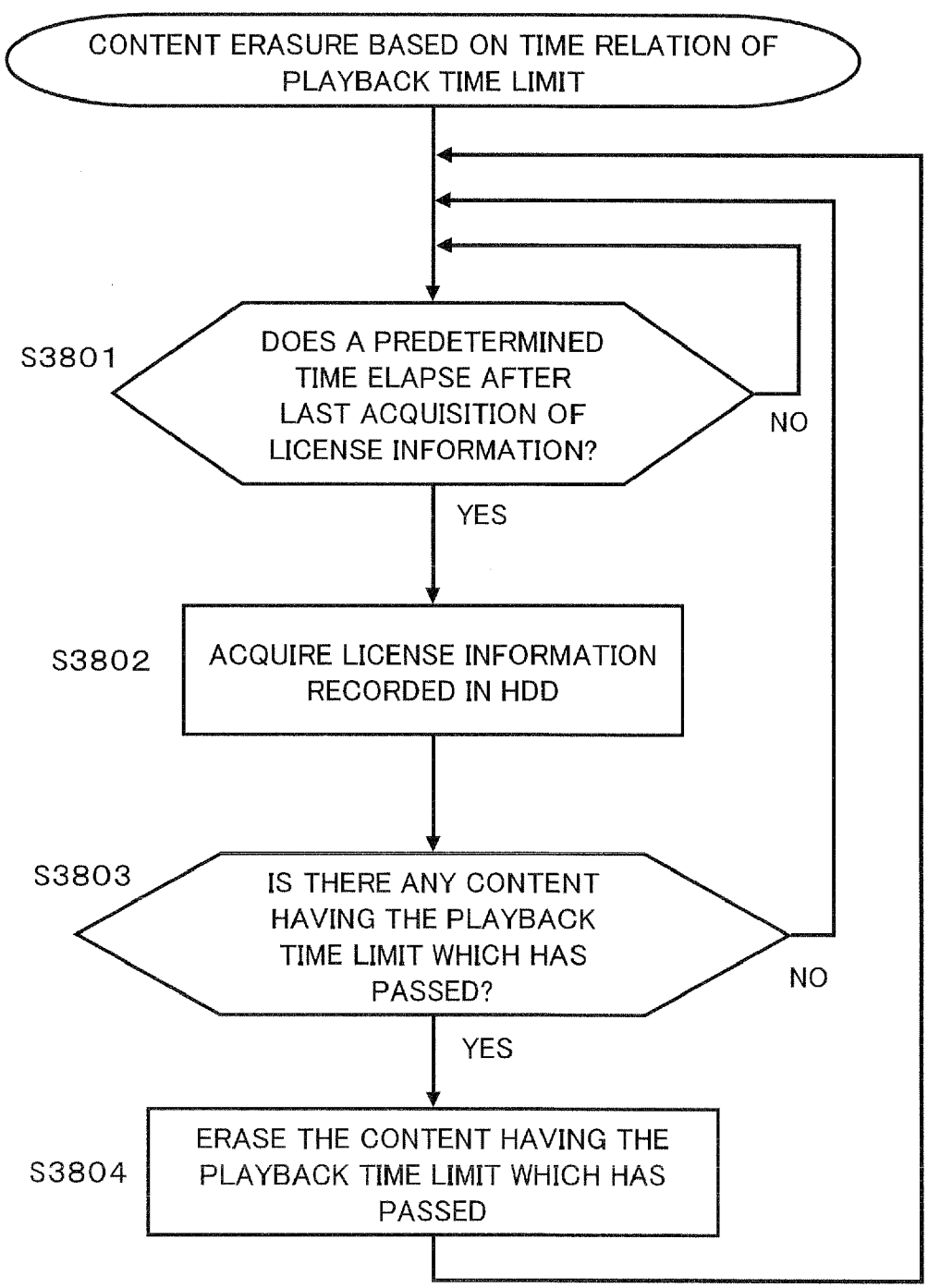

RECORDING AND PLAYBACK APPARATUS

BACKGROUND

1. Technical Field

The present invention relates to a recording and playback apparatus which can reproduce a downloaded content.

2. Related Art

In recent years, for a content distribution method, a content distribution method which uses distribution of a content by using a communication network such as the Internet has been widely used in addition to a content distribution method using a broadcast wave. For example, JP-A-10-13816 discloses a content distribution with a video-on-demand (VOC) system through a communication network.

As a new content distribution method, there is proposed a content distribution method in which additional information such as a playback time limit and an age-limit are added to a content and a recording and playback apparatus downloads the content together with the additional information. According to the distribution method, for example, when information related to the playback time limit is added to the content, the content is erased based on the playback time limit added to the content.

However, in the above distribution method, a user cannot easily recognize the additional information of the content recorded in the recording and playback apparatus, and thus the above distribution method is inconvenient for the user.

SUMMARY

In order to solve the above problem, a recording and playback apparatus is provided that can improve the convenience for a user with respect to management of a content with additional information.

In a first aspect, a recording and playback apparatus is provided, which is capable of recording content downloaded from a server in a recording medium and playing back the content. The recording and playback apparatus includes a recording unit configured to download a content stored in the server and to record the downloaded content in the recording medium, a playback unit configured to play back the content recorded in the recording medium, an instruction receiver configured to receive a stop instruction for stopping download of the content done by the recording unit; and a controller configured to control the recording unit. The controller controls the recording unit so as to stop the download of the content when the instruction receiver receives the stop instruction for stopping download of the content, and to restart the download of the content when a predetermined time elapses in which the recording unit is in a stop state of the download.

In a second aspect, a recording and playback apparatus is provided, which is capable of recording various contents downloaded from a server in a recording medium and playing back the various contents. The recording and playback apparatus includes a recording unit configured to download the various contents stored in the server and to record the downloaded contents in the recording medium; a playback unit configured to play back the various contents recorded in the recording medium; an instruction receiver configured to receive a stop instruction for stopping download of at least one of the various contents; and a controller configured to control the recording unit. The controller controls the recording unit so as to stop the download of the at least one of the various contents when the instruction receiver receives the stop instruction for stopping the download, and to restart the download of the at least one of the various contents when a predetermined time elapses in which the recording unit is in a stop state of the download.

According to the above aspects, convenience for management of a content with additional information can be improved. For example, the controller controls the recording unit to restart the download of the content when a predetermined time elapses in a stopping state of download. Thus, the stopped download of the content can be automatically restarted.

BRIEF DESCRIPTION OF DRAWINGS

FIG. 3A is a diagram showing an example of a recording list image.

FIG. 5A is a diagram showing an example of a warning screen and a selection screen related to a playback time limit (time limit of viewing).

FIG. 5B is a diagram showing an example of a recording list on which the playback time limit (time limit of viewing) is displayed.

FIG. 6 is a diagram showing an example of a warning screen related to playable time.

FIG. 9A is a diagram showing an example of a recording list while a content is being downloaded.

FIG. 9B is a diagram showing an example of a recording list while a content is being downloaded (information of a content being downloaded is not displayed on a recording list).

FIG. 9C is a diagram showing an example of a list of contents being downloaded.

FIG. 12B is a diagram showing an example of a recording list showing details of progress of download.

FIG. 12C is a diagram showing an example of a recording list displayed after download is completed.

FIG. 12D is a diagram showing a display example of a list of contents displayed in a bundle.

FIG. 14 is a diagram showing an example of a recording list image which displays a content having an age limit.

FIG. 38 is a flow chart showing an operation of erasing a content based on time related to a playback time limit.

DETAIL DESCRIPTION OF PREFERRED EMBODIMENTS

Various embodiments will be described below with reference to the accompanying drawings.

Figure 1A:
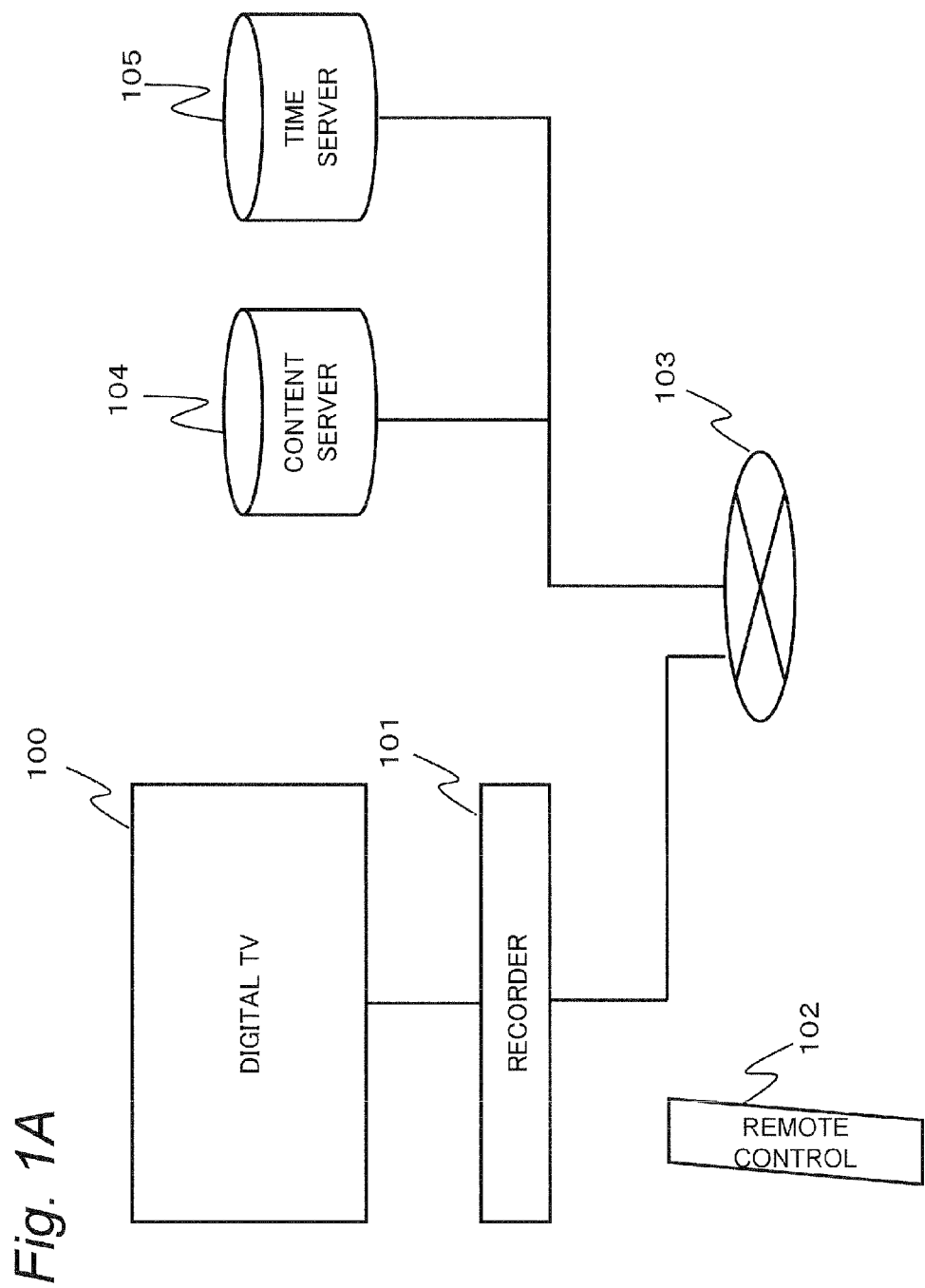
FIG. 1A is a block diagram showing a configuration of a content distribution system.

[Index]
1. Configuration
   1-1 Configuration of content distribution system
   1-2 Configuration of recorder
   1-3 Information managed by content server
2. Operations of recording a broadcast program and playback of recorded broadcast program
   2-1 Recording of broadcast program
   2-2 Playback of recorded broadcast program
3. Download of content
   3-1 Type of download content
   3-2 Initial setting
   3-3 Basic operation of download
      3-3-1 Selection of downloaded content by user
      3-3-2 Download of meta information
      3-3-3 Download of content
4. Display of recording list and playback of content
   4-1 Display of recording list
   4-2 Playback of downloaded content
      4-2-1 Download of license information
      4-2-2 Content playback operation after reception of license information
   4-3 Recording list and operational constraints during download
      4-3-1 Recording list and operational constraints during download of meta information
      4-3-2 Recording list and operational constraints during download of content
   4-4 Display of recording list of age-limited content and playback of age-limited content
      4-4-1 Recording of user age information
      4-4-2 Recording list of age-limited content
      4-4-3 Playback of age-limited content
      4-4-4 Cancellation of age limit by inputting password
5. Special operation during download
   5-1 Follow-up playback during download
   5-2 Operation in download request state of a plurality of contents
   5-3 Automatic stop and forcible restart of download
      5-3-1 Automatic stop of download
      5-3-2 Forcible restart of download
   5-4 Power-off of power supply during download
6. Management of time information
7. Operation in erasure of content
   7-1 Basic operation of content erasure
   7-2 Operation performed when playback time limit passes during playback of content
   7-3 Forcible ending of reproduction of content after playback time limit has passed
   7-4 Warning made before content playback time limit has passed
   7-5 Erasing of content after playback time limit has passed
      7-5-1 Erasing in sequence of power-off
      7-5-2 Erasing at display of recording list
      7-5-3 Erasing performed when playback time limit has passed
8. Copying of content
   8-1 Limit of number of times of copy of content
   8-2 Limit of copying period of content
9. Correspondence of terms
1. Configuration
1-1 Configuration of Content Distribution System An outline of a content distribution system will be described below. FIG. 1A is a block diagram showing a configuration of a content distribution system. A digital television 100 receives and displays a broadcast program. The digital television 100 receives a video signal and an audio signal from a recorder 101 and displays the video signal and the audio signal. The digital television 100 and the recorder 101 are connected to each other via a cable such as an HDMI cable. A LAN system may be used for the connecting method.

The recorder 101 receives and records a broadcast program. The recorder 101 can be loaded with a recording media (BD, DVD, SD card, or the like). The recorder 101 receives a content from the Internet 103 or the loaded recording medium to record the content. A video signal and an audio signal of the received broadcast program or the recorded content are transmitted to the digital television 100.

A user can control the recorder 101 by using a remote controller 102.

The recorder 101 is connected to a content server 104 and a time server 105 through the Internet 103. The content server 104 stores contents. The time server 105 transmits time information to the recorder 101 in response to a request from the recorder 101. The content information mentioned here is data to be played back as a video or music. The content is not limited to a movie, music, or the like, and is a concept including game software, for example.

When using the content distribution system, a user selects a content desired to be downloaded by using the remote controller 102. In this manner, the content stored inn the content server 104 can be downloaded. Details of a method of selecting a content and a method of viewing the content will be described later.

1-2 Configuration of Recorder

Figure 2:
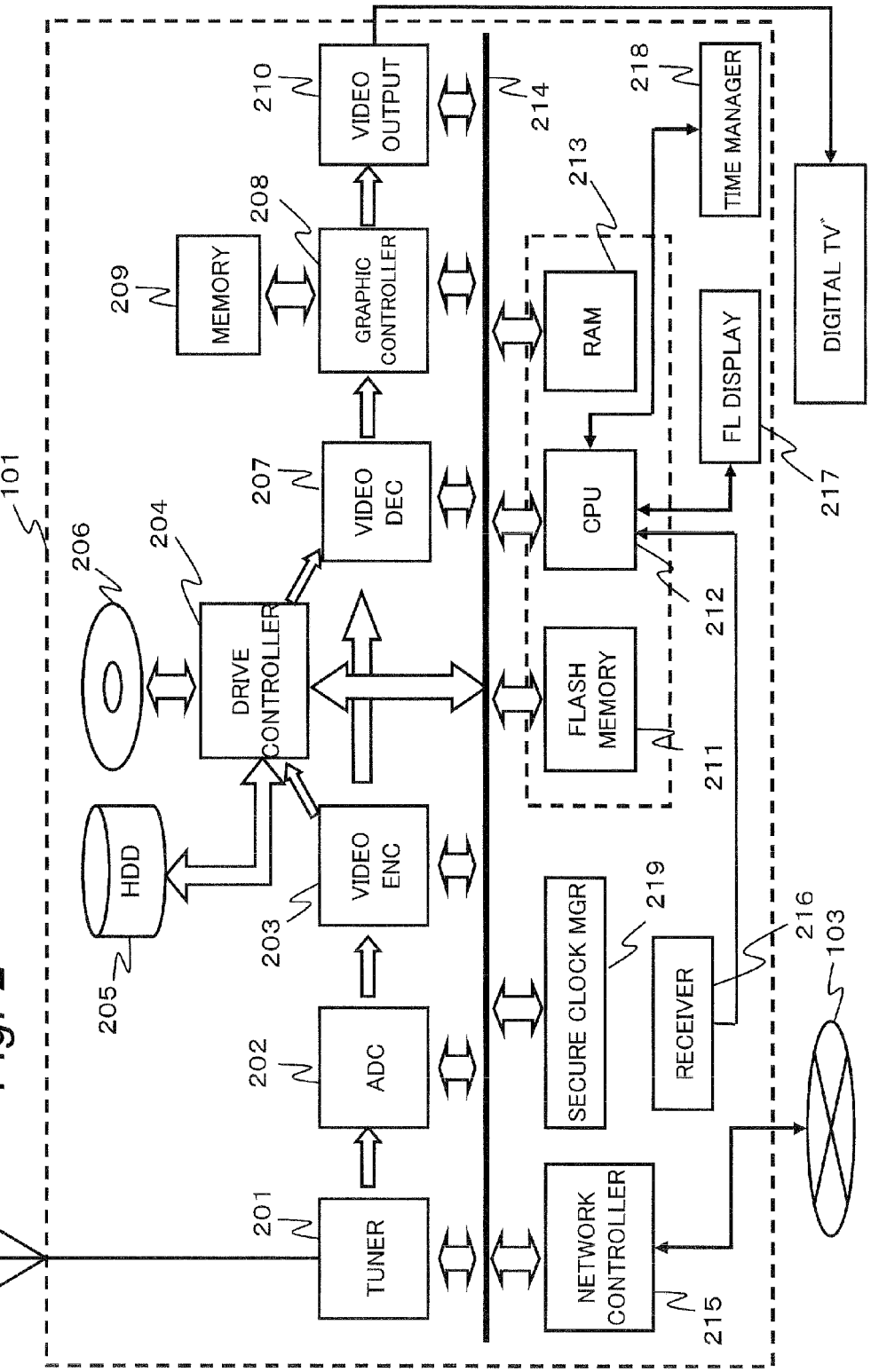
FIG. 2 is a block diagram showing a configuration of a recorder according to the present invention.

A configuration of the recorder 101 according to the embodiment will be described below. FIG. 2 is a block diagram showing a configuration of the recorder 101. The recorder 101 includes a tuner 201, an ADC 202, a video encoder 203, a drive controller 204, an HDD 205, a disk 206, a video decoder 207, a graphic controller 208, a memory 209, a video output unit 210, a flash memory 211, a CPU 212, a RAM 213, a bus 214, a network controller 215, an instruction receiver 216, an FL display unit 217, a time manager 218, and a secure clock manager 219.

The tuner 201 selects one of channel signals in digital broadcasting received through an antenna to output a television signal.

The ADC 202 converts an analog television signal selected by the tuner 201 to a digital signal.

The video encoder 203 compresses and encodes the television signal converted to the digital signal by the ADC 202 to a signal of the MPEG-2 format to generate an MPEG-2 program stream which conforms to the DVD video recording standard. The compression encoding format is not limited to the MPEG-2 format, and another format such as the MPEG-4 format may be used. Regarding the stream format, in addition to the MPEG-2 program stream format, another format such as the MPEG-2 transport stream format may be used.

The drive controller 204 writes the MPEG-2 program stream output from the video encoder 203 in the HDD 205 or the disk 206 as a content. The drive controller 204 reads the content recorded in the HDD 205 or the disk 206 and outputs the read content to the video decoder 207.

The HDD 205 is a recording medium which can store contents. The HDD 205 records and reads contents under the control of the drive controller 204.

The disk 206 is a medium which can store contents, and is, for example, BD (Blu-ray disc) or a DVD (Digital Versatile Disc).

In the present embodiment, except for a copy operation, HDD 205 is used for a recording medium for storing contents. However, the recording medium for storing contents may be the disk 206 or a semiconductor memory such as a SD card. That is, it may be any medium capable of recording contents and a type of recording medium is not limited.

The video decoder 207 decompresses the supplied content and converts the content into non-compressed data to supply the non-compressed data to the graphic controller 208.

The graphic controller 208 synthesizes various menu images with a video image supplied from the video decoder 207 to output the synthesized video image to the video output unit 210. The images to be synthesized are stored in the memory 209. Image data recorded in the RAM 213 is interpreted by the CPU 212 and synthesized by the graphic controller 208.

The memory 209 stores the image data synthesized by the graphic controller 208.

The video output unit 210 outputs the video synthesized by the graphic controller 208. The video output unit 210 is, for example, an HDMI terminal.

The flash memory 211 stores various parameters required to control the recorder 101.

The CPU 212 controls the tuner 201, the ADC 202, the video encoder 203, the drive controller 204, the video decoder 207, the graphic controller 208, the video output unit 210, the flash memory 211, the RAM 213, the network controller 215, the instruction receiver 216, the FL display unit 217, the time manager 218, and the secure clock manager 219 through the bus 214.

The RAM 213 temporarily stores data input from the network controller 215 or data read from the HDD 205 or the disk 206.

The bus 214 is a path for transmitting a signal in the recorder 101. The bus 214 is connected to the tuner 201, the ADC 202, the video encoder 203, the drive controller 204, the video decoder 207, the graphic controller 208, the video output unit 210, the flash memory 211, the CPU 212, the RAM 213, the network controller 215, the time manager 218, and the secure clock manager 219.

The network controller 215 requests the content server 104 to distribute a content or the like through the Internet 103, and receives the content stored in the content server 104 through the Internet 103.

The instruction receiver 216 receives an instruction from a user. The instruction receiver 216 may be, in particular, a light-receiving unit which receives an infrared ray from the remote controller 102 or a button to control the recorder 101 arranged on a housing of the recorder 101.

The FL display unit 217 displays time or an operation state of the recorder 101. The operation state of the recorder 101 is, for example, information indicating if a content is being downloaded.

The time manager 218 stores and manages information related to time displayed on the FL display unit 217. A user can change the time information of the time manager 218 through the instruction receiver 216.

The secure clock manager 219 stores the time information to manage a playback time limit of a content. The time information of the secure clock manager 219 is updated by time information received by the network controller 215. Unlike in the time manager 218, a user cannot change the time information through the instruction receiver 216.

1-3 Information Managed by Content Server

Figure 1B:
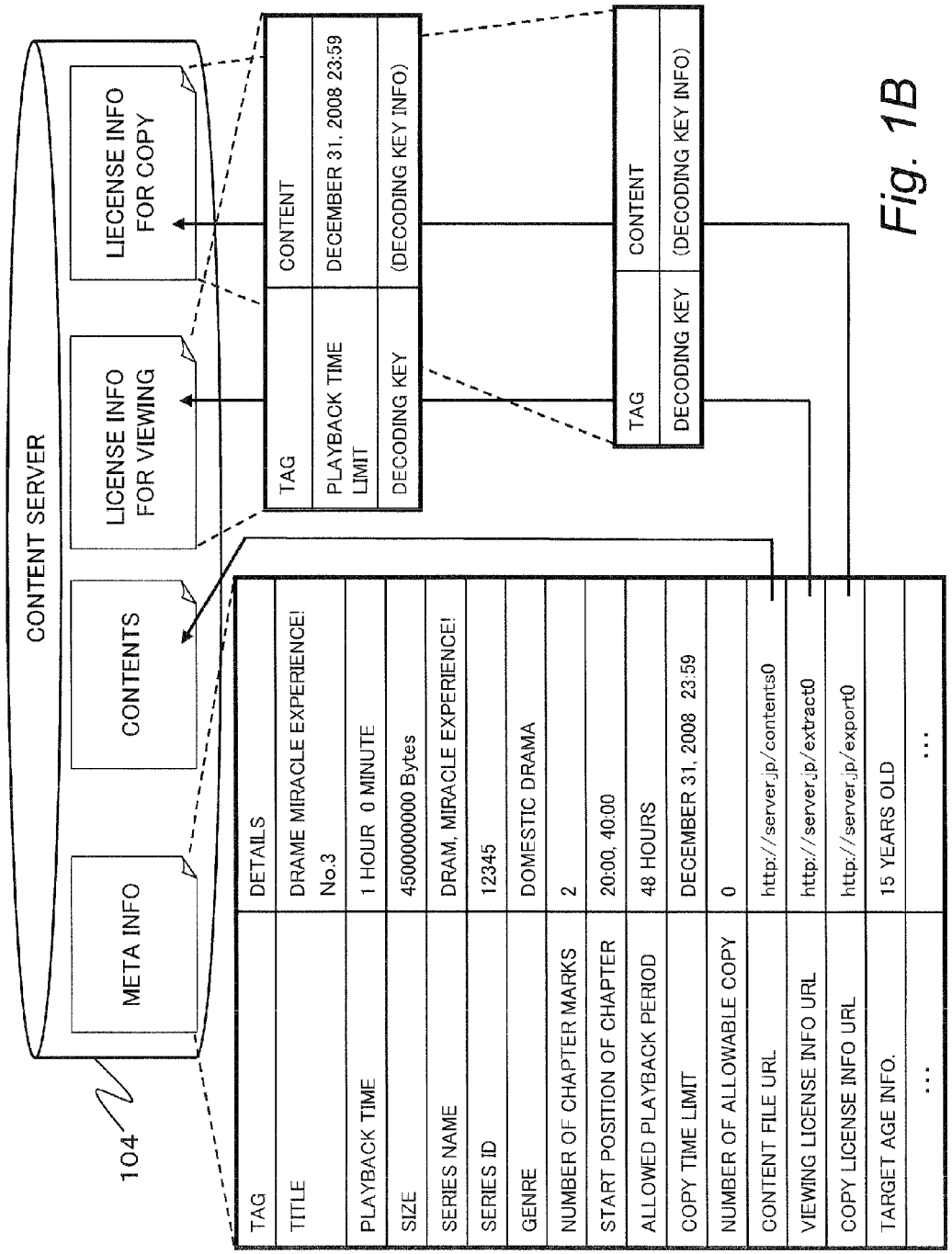
FIG. 1B is a diagram for explaining meta information and license information stored in a content server.

FIG. 1B shows information managed by the content server 104. The content server 104 stores a content and meta information and license information in relation to the content. The meta information is additional information related to a content (details will be described later). The license information is information including a key to decode the content, and includes license information for viewing, used for decoding the content to allow the content to be viewed and license information for copy used when the content is copied.

2. Operations of Recording Broadcast Program and Playback of Recorded Broadcast Program 2-1 Recording of Broadcast Program An operation of recording a broadcast program by the recorder 101 will be described below. The tuner 201 selects and receives a broadcast signal transmitted from a broadcast station and outputs a video signal and an audio signal of the program to the ADC 202. The ADC 202 performs digital-conversion to the input signal to supply the digital signal to the video encoder 203. The video encoder 203 receives an instruction for starting of recording, then compresses and encodes the digital data supplied from the ADC 202, and outputs the compressed and encoded digital data to the drive controller 204. In the compressing and encoding process, for example, the video encoder 203 compresses and encodes data in the MPEG-2 format and generates an MPEG-2 program stream conforming to the DVD video recording standard. This process continues until the video encoder 203 receives an instruction for ending of recording. The video encoder 203 uses the RAM 213 as a buffer for temporarily storing frame data and so on to perform compression and encoding.

When receiving an instruction for starting the recording, the drive controller 204 performs a recording process. Thereafter, the drive controller 204 receives the output from the video encoder 203 to start writing of the output in the HDD 205 or the disk 206. When no program stream is input after the drive controller 204 receives an instruction for ending the recording, the drive controller 204 ends the writing process and performs a recording end process. The embodiment explains that the drive controller 204 controls transfer/receipt of information to/from both the HDD 205 and the disk 206. However, the drive controller 204 may be provided to each of a drive device for the HDD 205 and a drive device for the disk 206.

A broadcast program which is received is called a "broadcast content", and a content which is downloaded is called a "download content".

2-2 Playback of Recorded Broadcast Program

A playback operation of a recorded program by the recorder 101 will be described below. The drive controller 204 reads data recorded in the HDD 205 or the disk 206. The drive controller 204 outputs the read data to the video decoder 207. The video decoder 207 decompresses the supplied data which is compressed and encoded to convert the data into non-compressed data, and then supplies the non-compressed data to the graphic controller 208. The graphic controller 208 is connected to the memory 209 for an internal arithmetic operation, and can realize an On Screen Display (OSD) function. For example, the graphic controller 208 synthesizes various menu images with a video image to output the video image to the video output unit 210. The video output unit 210 supplies the input synthesized video image and audio data to the digital television 100.

3. Download of Content 3-1 Type of Downloaded Content

Kinds of content distribution in the content distribution system include two kinds, i.e., a VOD (Video On Demand) and a download. The VOD is a service in which a content downloaded from the content server 104 is displayed on the digital television 100 without being recorded in a recording medium such as the HDD 205, thereby allowing a user to view the content in almost real time. On the other hand, the download is a service in which the content downloaded from the content server 104 is recorded in the recording medium such as the HDD 205 and the recorded content is played back and displayed on the digital television 100, thereby allowing a user to view the content.

Since the VOD displays the received content in almost real time, a communication environment must be always a wide-band environment to prevent the content from being interrupted during viewing of the content. On the other hand, in the download service, the content is temporarily stored in the recording medium and the recorded content is viewed. For this reason, regardless of a communication environment, the content can be viewed without being interrupted. In the following embodiment, an example in which content distribution is performed by using the download service is described.

The download service is classified into two types, i.e., a rental system and a cell system in terms of management of playback time limit for a content. In the rental system, viewing is prohibited when a predetermined period of time (for example, two weeks) has passed since the content is viewed for the first time. On the other hand, the cell system is a system in which a time limit for viewing is not provided to a downloaded content. More specifically, once the content is downloaded, a user can semipermanently view the content. In the embodiment, when the cell system or the rental system is not described, any one of the systems may be used.

With respect to the downloaded content (download content), when it is played back for the first time, regardless of the cell system or the rental system, it needs to download license information which manages a license of the content from the content server 104. This is because the download content is encrypted and key information (decoding key) to decode (decrypt) the encrypted content and information related to a playback time limit of the content are included in the license information. When the content is to be played back, information related to the playback time limit in the license information is checked. When a time of playback is before the playback time limit, the content is decoded with the key information.

3-2 Initial Setting

An initial setting of the recorder 101 will be described below. In order to take a content distribution service, personal information (name, credit card number, and the like) of a user must be registered in the recorder 101. The user connects a LAN cable or the like to the recorder 101 and connects the recorder 101 to the Internet 103.

When a user presses a button of "content distribution system" on the remote controller 102, the recorder 101 downloads HTML data for user registration recorded in the content server 104 through the Internet 103.

The downloaded HTML data is recorded in the RAM 213 through the network controller 215. The CPU 212 interprets the HTML data recorded in the RAM 213 and outputs the data to the graphic controller 208 as image data. Thereafter, the image data is transmitted to the digital television 100 through the video output unit 210, and the digital television 100 displays an image data video signal.

The user inputs the personal information of the user by using the remote controller 102. The input information is transmitted to the content server 104 and registered. In this manner, the user registration is completed.

3-3 Basic Operation of Download 3-3-1 Selection of Downloaded Contents by User

A download operation of the content by the recorder 101 will be described below. When a user presses the button of "content distribution system" of the remote controller 102, the instruction receiver 216 detects that the button is pressed. The CPU 212 instructs the network controller 215 to receive data of a content list of contents recorded in the content server 104. The content list is described in, for example, HTML.

The network controller 215 requests the content server 104 to transmit the content list data through the Internet 103. The content server 104 which receives the request transmits the content list data to the recorder 101. When the network controller 215 receives the content list data, the network controller 215 records the content list data in the RAM 213 through the bus 214. The CPU 212 interprets the content list data recorded in the RAM 213 and outputs the content list data to the graphic controller 208 as content list image data. The content list image data is transmitted to the digital television 100 through the graphic controller 208 and the video output unit 210. The digital television 100 displays the content list image based on the received image data.

The user refers to the content list image displayed on the digital television 100 to select a content desired to be downloaded by using the remote controller 102.

When the instruction receiver 216 detects the selection of the content by the user, the CPU 212 performs the control so that the content selected by the user is downloaded from the content server 104. The network controller 215 requests the content server 104 to transmit the content to the recorder 101 through the Internet 103. The content server 104 which receives the request starts transmission of the content to the recorder 101.

3-3-2 Download of Meta Information

When a content is to be downloaded from the content server 104, meta information serving as additional information of the content to be downloaded is downloaded first. Thereafter, the content such as audio/video data is downloaded.

Download of meta information will be described below. The meta information is additional information related to a content. As shown in FIG. 1B, the meta information includes a title of the content, a playback time of the content, the number of allowable copy, information (URL) related to a server of a distribution source, and the like. The meta information also includes a thumbnail image of the content and bundle information of the content. The bundle information is information indicating whether the content is an object to be displayed in a bundle (referred to as "bundle display"). Details of the bundle display will be described later.

The network controller 215 temporarily records the downloaded meta information in the RAM 213. The drive controller 204 reads the meta information recorded in the RAM 213 and records the meta information in the HDD 205.

The network controller 215 continuously records to the RAM 213 the meta information being downloaded, in the RAM until the download of the meta information is finished. The drive controller 204 reads the meta information which is recorded by the network controller 215 to the RAM 213 from the RAM 213 to move the meta information to the HDD 205.

With the above operation, the meta information of the content recorded in the content server 104 can be recorded in the HDD 205.

Since the content is not downloaded during the download of the meta information, playback of the content is impossible. Therefore, even though the instruction receiver 216 receives an instruction for playback of the content being downloaded, the CPU 212 does not play back the content.

3-3-3 Download of Content

Download of a content will be described below. When finishing reception of the meta information, the network controller 215 continuously starts reception of the content. The network controller 215 temporarily records the content being downloaded in the RAM 213. The drive controller 204 reads the downloaded content recorded in the RAM 213, and moves the read content to the HDD 205.

The network controller 215 continuously records the downloaded content in the RAM 213 until the download of the content is completed. The drive controller 204 continuously moves the downloaded content from the RAM 213 to the HDD 205 until the network controller 215 ends writing of the downloaded content in the RAM 213.

With the above operation, the contents recorded in the content server 104 can be recorded in the HDD 205.

The download content may also be set to be prohibited from being erased when the downloaded content is recorded in the HDD 205, as an initial setting. More specifically, in the meta information of the content recorded in the HDD 205, information indicating "erasing prohibition" may be described as an attribute related to erasure. When the instruction receiver 216 receives an erasing instruction of the downloaded content from a user, the CPU 212 may refer to an attribute related to erasure of the content recorded in the HDD 205. When information indicating the "prohibition of erasure" is described, the CPU 212 may prohibit an erasing operation of the content from being performed.

That is, the recorder 101 of the embodiment is a recorder capable of recording in the HDD 205 a content which is downloaded from the content server 104 and playing back the content. The recorder 101 includes the drive controller 204 and network controller 215 which are configured to download a content stored in the content server 104 and record it in the HDD 205 as a download content, and the tuner 201, ADC 202, video encoder 203, and the drive controller 204 which are configured to record a broadcast program received via a broadcast wave in the HDD 205 as broadcast content, and the CPU 212 and drive controller 204 which are configured to erase the download content or broadcast content recorded in the HDD 205. The CPU 212 and drive controller 204 determine whether the content can be erased based on the attribute of the content related to erasure. The drive controller 204 and network controller 215 set the attribute related to erasure to a value indicating "prohibition of erasure" when the downloaded content is recorded in the HDD 205. The tuner 201, ADC 202, video encoder 203, and drive controller 204 set the attribute related to erasing to a value indicating "allowance of erasure" when the broadcast content is recorded in the HDD 205.

After receiving an instruction for playback instruction of the content, the CPU 212 may erase the content when receiving an instruction for the erasure instruction from the user. Alternatively, after playback of the content is completed, the CPU 212 may erase the content when receiving the instruction for erasure instruction from the user. More specifically, when receiving the playback instruction of the content, or when playback of the content is completed, the CPU 212 may update an attribute related to erasure of the content from "prohibition of erasure" to "allowance of erasure".

When the instruction receiver 216 receives an instruction for switching the attribute related to erasure of the content from "prohibition of erasure" to "allowance of erasure", the CPU 212 changes attribute related to erasure of the meta information recorded in the HDD 205. More specifically, the content of the information described in the meta information that indicates "prohibition of erasure" is updated to "allowance of erasure". In this manner, the content of which meta information is updated becomes erasable. More specifically, when the instruction receiver 216 receives the erasure instruction to the downloaded content from a user, the CPU 212 instructs the drive controller 204 to erase the content, so that the drive controller 204 erases the content. The attribute related to erasure of the content may be configured to be changed from "prohibition of erasure" to "allowance of erasure" based on a user's instruction.

As described above, it is configured that when attribute information indicating whether "erasure" is possible is included in the meta information, so that a downloaded content can be prevented from being erroneously erased by a user.

In contrast to this, the broadcast content is preferably set to be erasable as an initial setting when a broadcast content is recorded in the HDD 205. More specifically, information indicating "allowance of erasure" may be described in the meta information of the broadcast content recorded in the HDD 205. This is because usability becomes bad since an operation of canceling the "prohibition of erasure" frequently occurs when frequency of recording the broadcast content is high and "prohibition of erasure" is set as the initial setting.

As described above, the CPU 212 can erase a download content or broadcast content recorded in the HDD 205. The CPU 212 can also prohibit the download content or the broadcast content from being erased. The CPU 212, immediately after a download content is recorded in the HDD 205 (i.e., as an initial setting), prohibits erasure of the download content, while immediately after a broadcast content is recorded in the HDD 205, the CPU 212 may not prohibit erasure of the broadcast content.

In this manner, initial settings of erasure prohibition is different depending on contents, it can be prevented to accidentally erase a downloaded content and an operation of erasing a broadcast content can be efficiently performed.

4. Display of Recording List and Playback of Content 4-1 Display of Recording List The recorder 101 can display a list (to be referred to as a "recording list" hereinafter) of contents recorded in the HDD 205. A user selects a desired content from the recording list to make it possible to instruct the recorder 101 to play back the desired content. An operation of displaying a recording list will be described below.

When a user presses a button of "recording list" on the remote controller 102, the instruction receiver 216 detects that the user presses the button. The CPU 212 instructs the drive controller 204 to read meta information of all or part of the contents recorded in the HDD 205. The drive controller 204 reads the meta information of all or part of the contents recorded in the HDD 205 and records the read meta information in the RAM 213. The contents from which the meta information is read may include both or either one of a content obtained by recording broadcast program and a downloaded content. The CPU 212 interprets the meta information recorded in the RAM 213 to create an image of a recording list which is a list of contents recorded in the HDD 205. The recording list image is transmitted to the digital television 100 through the graphic controller 208 and the video output unit 210 and is displayed.

Figure 3B:
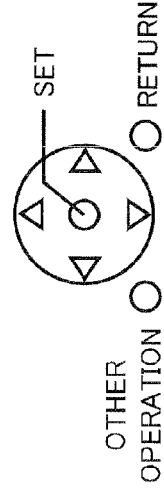
FIG. 3B is a diagram showing an example of a list of a plurality of contents which are displayed in a bundle.

FIG. 3A is a diagram showing an example of the recording list image. With respect to the content recorded in the HDD 205, a thumbnail image 31 related to the content, a content status 32, a recording date 33, information 34 about a source such as a channel, and a title information 35 are displayed. These pieces of information are stored in the meta information. Here, "N/V" of the content status 32 indicates that a recorded content is a content which has not been viewed yet. Similarly, "NEW" indicates that the recorded content is a content of a new program. The circle symbol indicates that the content is being recorded, and "BUNDLE" indicates that contents are displayed in a manner of bundle display. The "bundle display" is a function which manages and displays a plurality of contents having the same attribute on the recording list as one content. The contents having the same attribute are, for example, a series of dramas, a series of movies, the same television program, and the like. In the example in FIG. 3, contents of "Drama, Miracle Experience!" are displayed in a bundle. For example, when contents including No. 1 to No. 3 of "Drama, Miracle Experience!" are displayed in a bundle and further a row of "Drama, Miracle Experience!" is selected on the recording list, a list of the contents displayed in a bundle is displayed as shown in FIG. 3B.

A user can enlarge a display of a content interested by the user on the recording list by pressing an up/down key on the remote controller 102. FIG. 3A shows an example in which a display of "Hyper Beijing Olympic" is enlarged and displayed. In a content detail display area 300, content detail information such as number of times of allowable copy, allowable playback period, a playback time of a content is displayed. A content image display area 301 is an area for displaying a thumbnail image or a reduced moving image. In particular, the content image display area 301 of the selected content is enlarged and displayed. A reduced moving image may be displayed on the enlarged content image display area 301. Display of the reduced moving image is realized as follows. As normal content playback, the drive controller 204 reads the content, decodes the content read by the video decoder 207, and outputs the decoded content to the graphic controller 208. The graphic controller 208 creates a recording list such that the decoded content is displayed in the enlarged content detail display area 300. In this manner, the user can view a preview of a video of the content which is selected and enlarged to be displayed.

That is, the recorder 101 of the embodiment is a recorder capable of downloading a content from the content server 104, recording the content in the HDD 205, and playing back the content. The recorder 101 includes the drive controller 204 configured to download a content stored in the content server 104 and having additional information, the drive controller 204 and video decoder 207 which are configured to play back the content stored in the HDD 205 by the download, and the CPU 212 and graphic controller 208 which are configured to create data of a recording list displaying a list of information for all or part of contents stored in the HDD 205. The CPU 212 and graphic controller 208 obtains a thumbnail image from additional information of the content and video decoder 207, and create the data of the list image including the obtained thumbnail image, before playback of the content by the drive controller 204 and video decoder 207. After playback of the content by the drive controller 204 and video decoder 207, the CPU 212 and graphic controller 208 creates a reduced moving image based on the content, and creates the data of the list image including the reduced moving image.

License information is required to play back a download content. When the recorder 101 does not download license information of the content from the content server 104, the recorder 101 displays a thumbnail image (reduced still image). In the content image display area 301 which is not enlarged and displayed, an image for the thumbnail included in the meta information is displayed.

More specifically, before the drive controller 204 and the video decoder 207 play back a content recorded in the HDD 205 and added with the meta information, the CPU 212 acquires the thumbnail image from the meta information and controls the graphic controller 208 to create display data including the acquired thumbnail image. Then, after the drive controller 204 and the video decoder 207 play back the content (that is, after acquisition of the license information), the CPU 212 generates a reduced moving image based on the content and controls the graphic controller 208 to create display data including the generated reduced moving image.

In this manner, displaying the reduced moving image makes it easy to recognize the content. In addition, even though the reduced image cannot be generated, the thumbnail image is displayed so that the content can be easily recognized.

After selecting a content to be enlarged and displayed, a user presses a set button on the remote controller 102 to play back the selected content. A playback operation of the content will be described later.

In a recording list image shown in FIG. 3, as the information 34 related to a source of a content such as a channel, "Terrestrial Digital 010" or "TATSUYA TV" is described. The former indicates the number of channels of terrestrial digital broadcasting, and the latter is information indicating a download source of a content. As shown in FIGS. 3A-3B, in the present embodiment, a broadcast content and a downloaded content can be displayed together on one recording list image. More specifically, the graphic controller 208 creates data for a recording list which includes information indicating both the download content and the broadcast content which are recorded in the HDD 205.

In short, the recorder 101 of the present embodiment is a recorder capable of downloading a content from the content server 104, recording the content in the HDD 205 and playing back the content. The recorder 101 includes the drive controller 204 and network controller 215 which are configured to download a content stored in the content server 104, recording the content in the HDD 205 as download content, the tuner 201, ADC 202, video encoder 203, and the drive controller 204 which are configured to record a broadcast program received via a broadcast wave in the HDD 205 as broadcast content, and the CPU 212 and graphic controller 208 which are configured to create data of a recording list indicating a list of information for all or part of contents stored in the HDD 205. The CPU 212 and graphic controller 208 create a recording list in which information indicating download content and information indicating broadcast content are displayed together.

In the recording list, tabs 302 to classify an display contents under predetermined conditions are provided. A user selects any one of the tabs to make it possible to display a recording list which is desirably filtered. In FIGS. 3A-3B, for example, an "ALL" tab is a tab to display all contents. A "NOT VIEWED" tab is a tab to display contents which have not been viewed yet.

An operation performed when a user selects a "DOWNLOAD" tab 302 will be described below. When the instruction receiver 216 receives selection of the "DOWNLOAD" tab 302 by a user operation, the CPU 212 instructs the drive controller 204 to read the meta information of the content recorded in the HDD 205. The drive controller 204 reads meta information of a content recorded in the HDD 205 and related to download so as to record the meta information in the RAM 213. The CPU 212 interprets the meta information recorded in the RAM 213, extracts only the meta information of the downloaded content, not the broadcast content, and creates a recording list image as a list of the download content recorded in the HDD 205. The recording list image is transmitted to the digital television 100 through the graphic controller 208 and the video output unit 210.

More specifically, regarding attributes of the download content and the broadcast content recorded in the HDD 205, the CPU 212 receives a selection instruction through the tab 302 and groups the contents recorded in the HDD 205 depending on the accepted selection instruction.

With the above method, filtering is performed based on attribute information selected by a user so that it becomes possible to display the recording list. The attribute information of the filtering may include "NOT VIEWED" indicating content which has not been viewed yet, "AUTOMATIC" indicating automatic recording of a new program, "DRAMA", "MOVIE", or "SPORT" indicating a category of a content, "RECORDED VIDEO" indicating a content captured by a video camcorder, and the like.

4-2 Playback of Download Content

Figure 4:
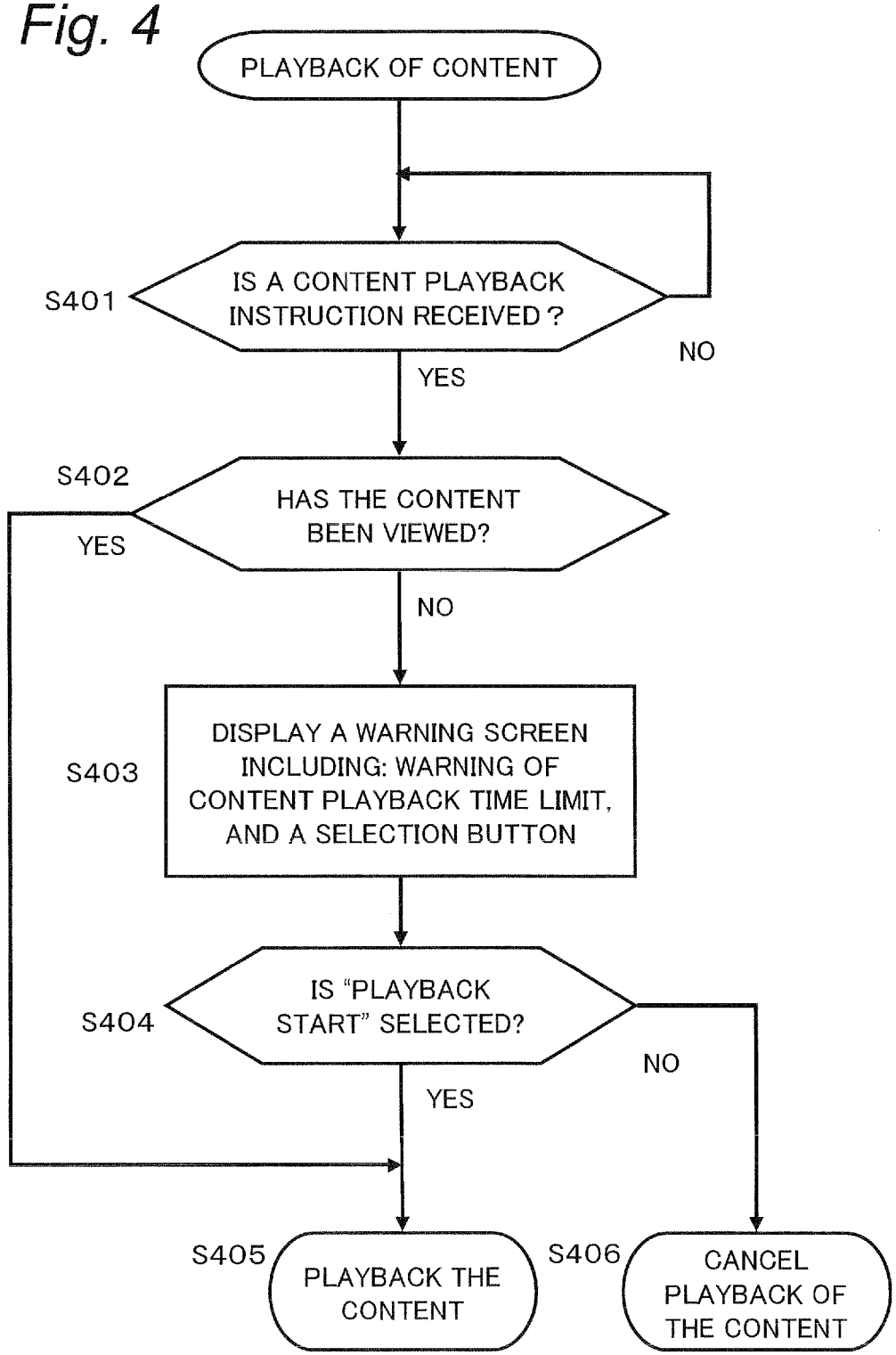
FIG. 4 is a flow chart showing a playback operation of a content.

A playback operation of a content (content of a rental system) with a playback time limit, recorded in the HDD 205 will be described below with reference to the flow chart in FIG. 4.

When a user selects a content which is desired to be played back by using the remote controller 102 on a content list image displayed on the digital television 100, the instruction receiver 216 receives a playback instruction of the content (S401). When the selected content is a broadcast content, a playback operation is executed as described in Section 2-2. "Playback of recorded broadcast program". On the other hand, when the selected content is a downloaded content, the content must be decoded by using key information included in license information.

When the selected content is a download content, the CPU 212 determines whether the content has been viewed at least once or has not been viewed yet (S402). This determination is made by checking whether the license information of the content is recorded in the HDD 205. When the content has been viewed, the content is played back (S405).

On the other hand, the content has not been viewed yet, the CPU 212 instructs the graphic controller 208 to display a warning screen. The warning screen includes a warning message related to a playback time limit of the content and a selection button by which a user watching the warning message selects whether to execute or to stop playback of the content. The graphic controller 208 reads image data of the warning screen from the memory 209, superposes the image data on the recording list, and outputs the recording list via the video output unit 210 (S403).

FIG. 5A is a diagram showing an example in which the warning screen is displayed on the recording list. A warning message related to a playback time limit and a button by which a user selects whether to start or to cancel playback of the content are displayed.

When the user selects "CANCEL" on the warning screen shown in FIG. 5A through the remote controller 102 (S404), the CPU 212 stops playback of the content (S406). On the other hand, the user selects "START" (S404), the CPU 212 downloads license information of the content from the content server 104, and then plays back the content (S405). A playback period of the content starts from a moment the license information is completely downloaded. More specifically, when the user selects "START", the content server 104 writes a playback time limit in the license information to transmit the license information to the recorder 101. The playback of the content in the recorder 101 is limited to the playback time limit written in the license information.

Before playback of the download content is started, i.e., before the license information is acquired, information indicating an allowable playback period of the content is displayed in the content detail display area 300. For example, in the example shown in FIG. 3, "Possible to view for 48 hours" is displayed as the allowable playback period of "Hyper Beijing Olympic". This is because, at that time, the playback time limit is not fixed. However, once the download content is temporarily played back, i.e., the license information is acquired, the playback time limit of the content is fixed. Therefore, after the download content is played back, i.e., the license information is acquired, the playback time limit (viewing time limit) of the content is displayed. For example, as shown in FIG. 5B, as a playback time limit of "Hyper Beijing Olympic", "Possible to view until 12:34 on Feb. 19, 2008" is displayed. In this manner, it is determined whether to display an allowable playback period or a playback time limit based on acquisition/not-acquisition of the license information.

4-2-1 Download of License Information

A download operation of license information will be described below in detail. When no license information of a content is recorded in the HDD 205, the CPU 212 instructs the network controller 215 to download license information of a content selected to be played back by a user from the content server 104. The network controller 215 requests the content server 104 to transmit the license information of the content through the Internet 103. The content server 104 which receives the request starts transmission of the license information to the recorder 101.

The network controller 215 receives the license information from the content server 104, and temporarily records the received license information in the RAM 213. The drive controller 204 reads the license information recorded in the RAM 213 and records the license information in the HDD 205.

With respect to a content (content of a cell system) having no playback time limit, in cases where the license information is not downloaded, when the instruction receiver 216 receives a playback instruction of the content from a user, the network controller 215 may download the license information without displaying of warning information.

When the network controller 215 cannot acquire the license information due to an error on a communication path or the like, the network controller 215 requests to transmit the license information again. However, if the license information cannot be received even after a predetermined period of time (for example, 15 seconds) has passed, a transmission request of the license information is stopped.

4-2-2 Content Playback Operation After License Information is Received

A playback operation of a content after license information is received will be described below. The downloaded content is decoded based on the license information and then is played back. The drive controller 204 reads the license information from the HDD 205 and records the license information in the RAM 213. Subsequently, the drive controller 204 reads the content in the HDD 205. The drive controller 204 decodes the content based on key information included in the license information recorded in the HDD 205 and supplies the decoded content to the video decoder 207. The video decoder 207 is connected to the graphic controller 208 for an internal arithmetic operation, so that an On Screen Display (OSD) function can be realized. For example, the graphic controller 208 synthesizes various menu images with a video image to output the synthesized image to the video output unit 210. In this manner, the contents can be played back.

In the embodiment, various warning images to be superposed on a recording list image are stored in the memory 209, and the graphic controller 208 superposes the various warning images on the recording list image so as to display the superposed image on the digital television 100.

As a playback time limit included in the license information, allowable playback start time may be set. In general, for most of new movies, a content provider usually instructs timing of delivery to the user. However, if a user is not permitted to download the content until the delivery timing, the user must download the content for a long time after the delivery timing comes, and the user cannot play back the content immediately after the delivery timing comes. Furthermore, a large number of accesses to the content server may occur immediately after the delivery timing. Distributing the content in advance with the allowable playback start time described in the license information allows a content distribution system to be easy-to-use for a user and the right of the content provider to be protected. In this case, when playback of the content is selected before the allowable playback start time, a warning screen shown in FIG. 6 can also be displayed.

4-3 Recording List and Operational Constraints During Download

4-3-1 Recording list and Operational Constraints During Download of Meta Information A recording list during download of meta information and operational constraints of the recorder 101 during the download of the meta information will be described below.

Figure 7:
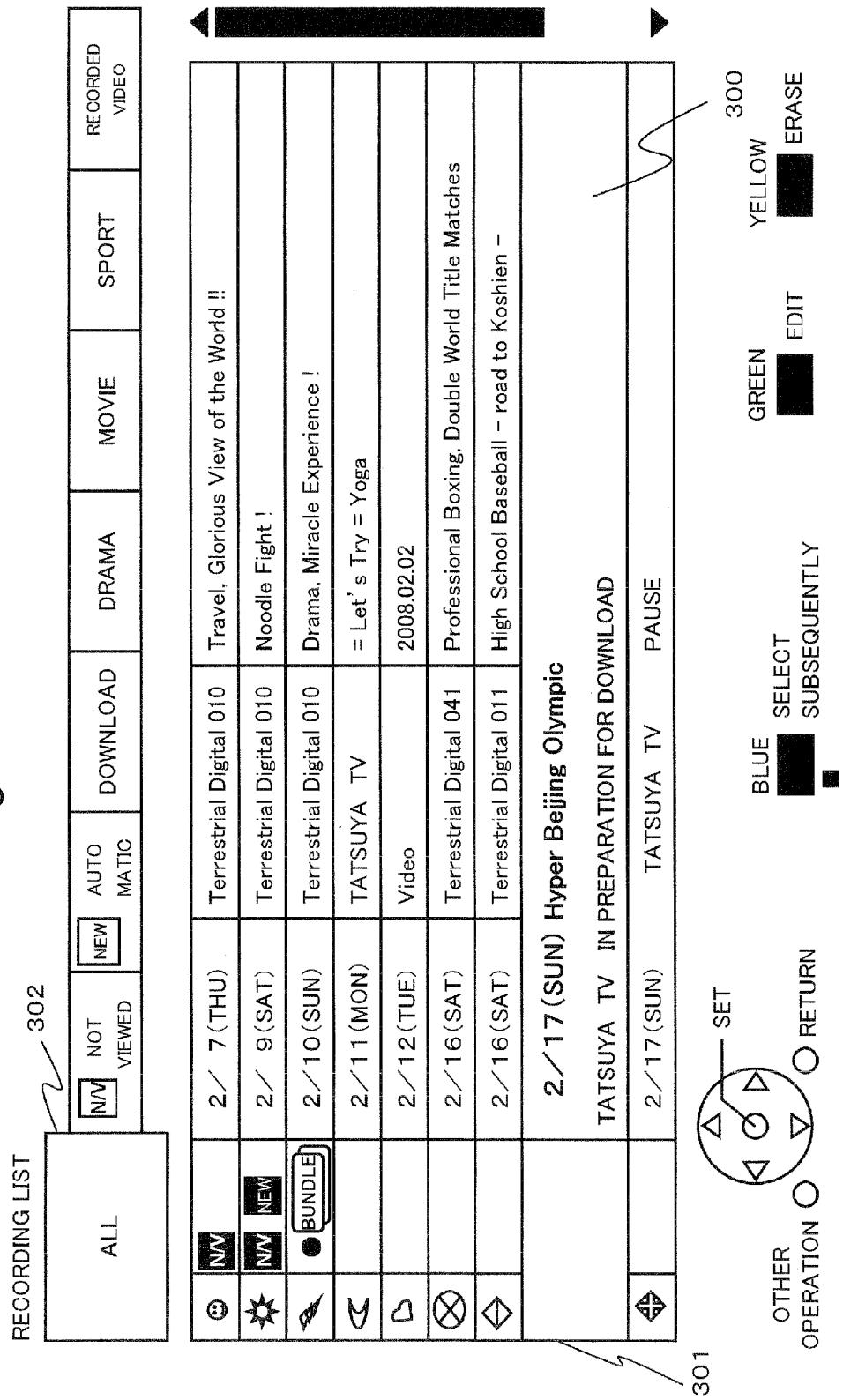
FIG. 7 is a diagram showing an example of a recording list while meta information is downloaded.

FIG. 7 is a diagram showing an example of a recording list during download of meta information. While the meta information is being downloaded, the content itself cannot be downloaded and thus a moving image cannot be displayed. Furthermore, it may not be possible to display a thumbnail image included in the meta information because the download of the meta information is not completed. Therefore, the content image display area 301 is set to a blank region displaying no moving image. During the download of the meta information, "IN PREPARATION FOR DOWNLOAD" is displayed in the content detail display area 300. Since the download of the meta information is a preparatory stage of the download of the content, "IN PREPARATION FOR DOWNLOAD" is displayed while the meta information is downloaded.

Figure 8:
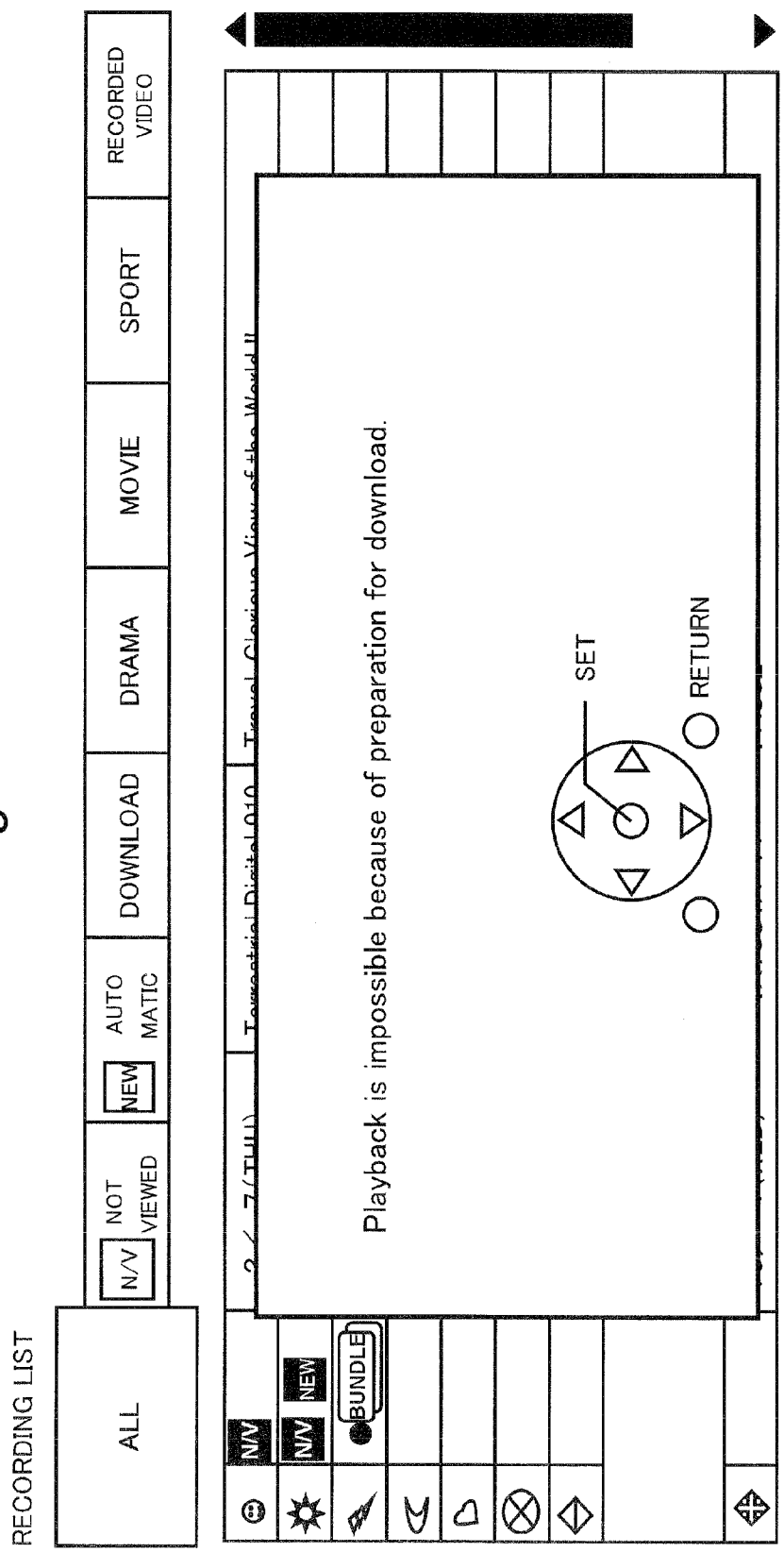
FIG. 8 is a diagram showing an example of a warning screen indicating that playback of a content is impossible.

When playback is selected during the download of the meta data, a warning screen as shown in FIG. 8 indicating that a playback operation cannot be executed is displayed on the digital television 100. More specifically, the graphic controller 208 reads data of a warning screen recorded in the memory 209 and superposes the warning screen on the recording list screen so that a warning screen can be displayed on the digital television 100.

More specifically, the network controller 215 and the drive controller 204 download a content with meta information stored in the content server 104 and records the content in the HDD 205. The drive controller 204 and the video decoder 207 reproduce the content that has meta information and is recorded in the HDD 205 by the download. The CPU 212 and the graphic controller 208 create display data to display content information related to at least one of contents recorded in the HDD 205. The CPU 212 and the graphic controller 208 cause the network controller 215 and the drive controller 204 to start download of the content with meta information. When download of the meta information added to the content is started, the CPU 212 and the graphic controller 208 create display data to display content information related to the content. On the other hand, when download of a content to be played back by the drive controller 204 and the video decoder 207 is not started, the CPU 212 and the graphic controller 208 create display data including warning information indicating that the content cannot be played back.

4-3-2 Recording List and Operational Constraints During Download of Content A recording list during download of a content and operational constraints of the recorder 101 during the download of the content will be described below. FIG. 9A is an example of a recording list displayed on the digital television 100 during download of a content. The recording list in FIG. 9A is different from the recording list during the download of the meta information shown in FIG. 7 in that an image is displayed in the content image display area 301 and that a progress of download of the content, for example, "downloading, 20%" is described in the content detail display area 300. An image displayed in the content image display area

301 will be described below. When the content is viewed in advance and has license information which is acquired, the content can be decoded by the license information. For this reason, a reduced moving image of the content is displayed in the content image display area 301. On the other hand, when the license information is not acquired, the content cannot be decoded and played back. For this reason, a still image included in meta information is displayed in the content image display area 301. Progress information of download, for example, "downloading, 20%" is displayed as detailed information of the content.

FIG. 9B is a diagram showing another example of a recording list displayed during download of a content, in which no information of the content being downloaded is displayed on a recording list. In order to check the details of the download, a predetermined button (a red button 40 in FIG. 9B) is depressed. In this manner, a list of the contents being downloaded as shown in FIG. 9C is displayed, so that the details of the download can be checked. FIGS. 9B and 9C show an example in which meta information of another content ("Drama, Miracle Experience! No. 4") is being downloaded together with a certain content ("Drama, Miracle Experience! No. 3").

In the embodiment, during the download of the content, editing of the content is prohibited. The editing mentioned here includes, in particular, an operation of dividing a content (program), an operation of connecting contents (programs), and an operation of erasing content (program).

Figure 10:
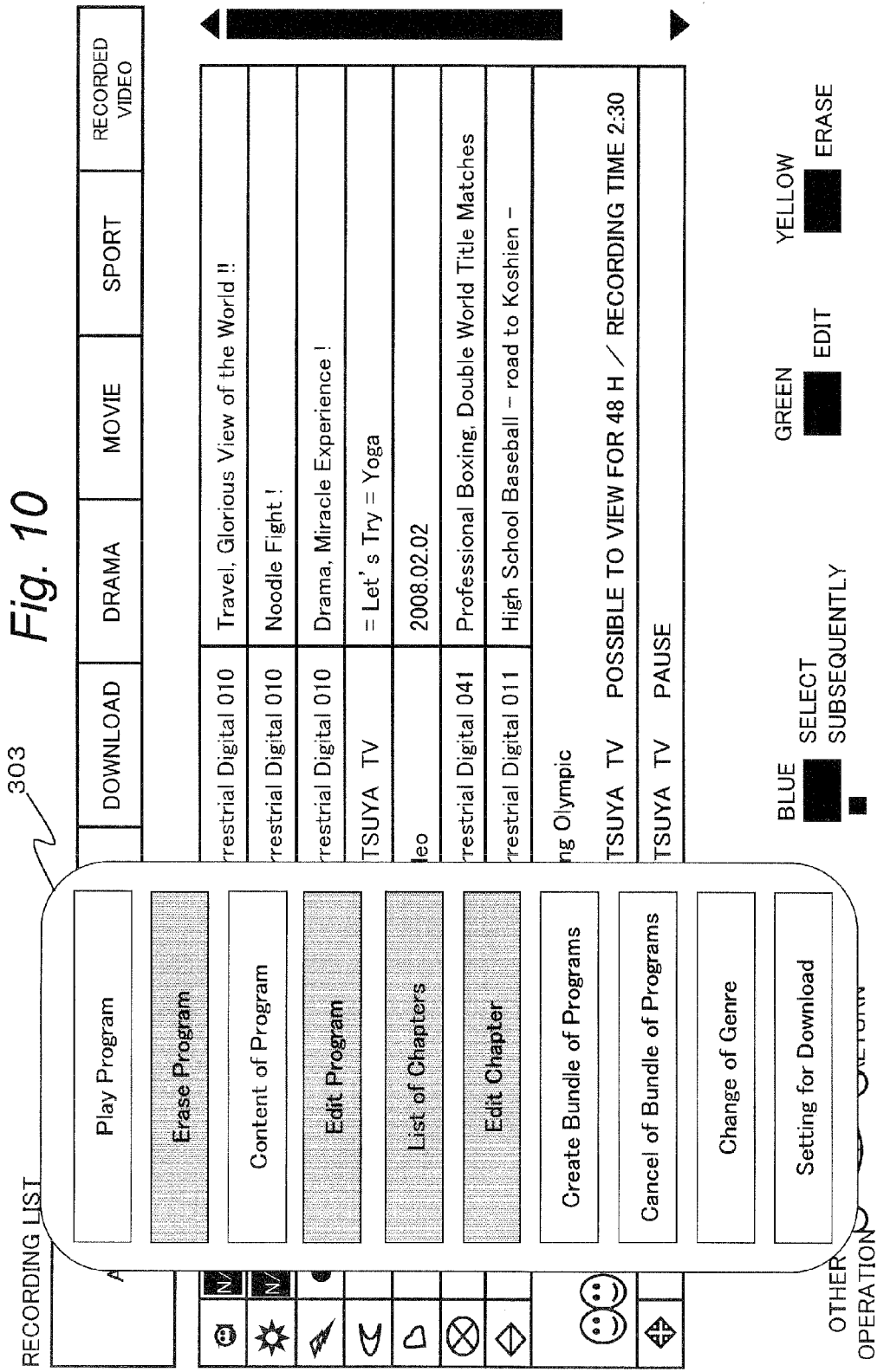
FIG. 10 is a diagram showing an example of a list of editing items.
Figure 11:
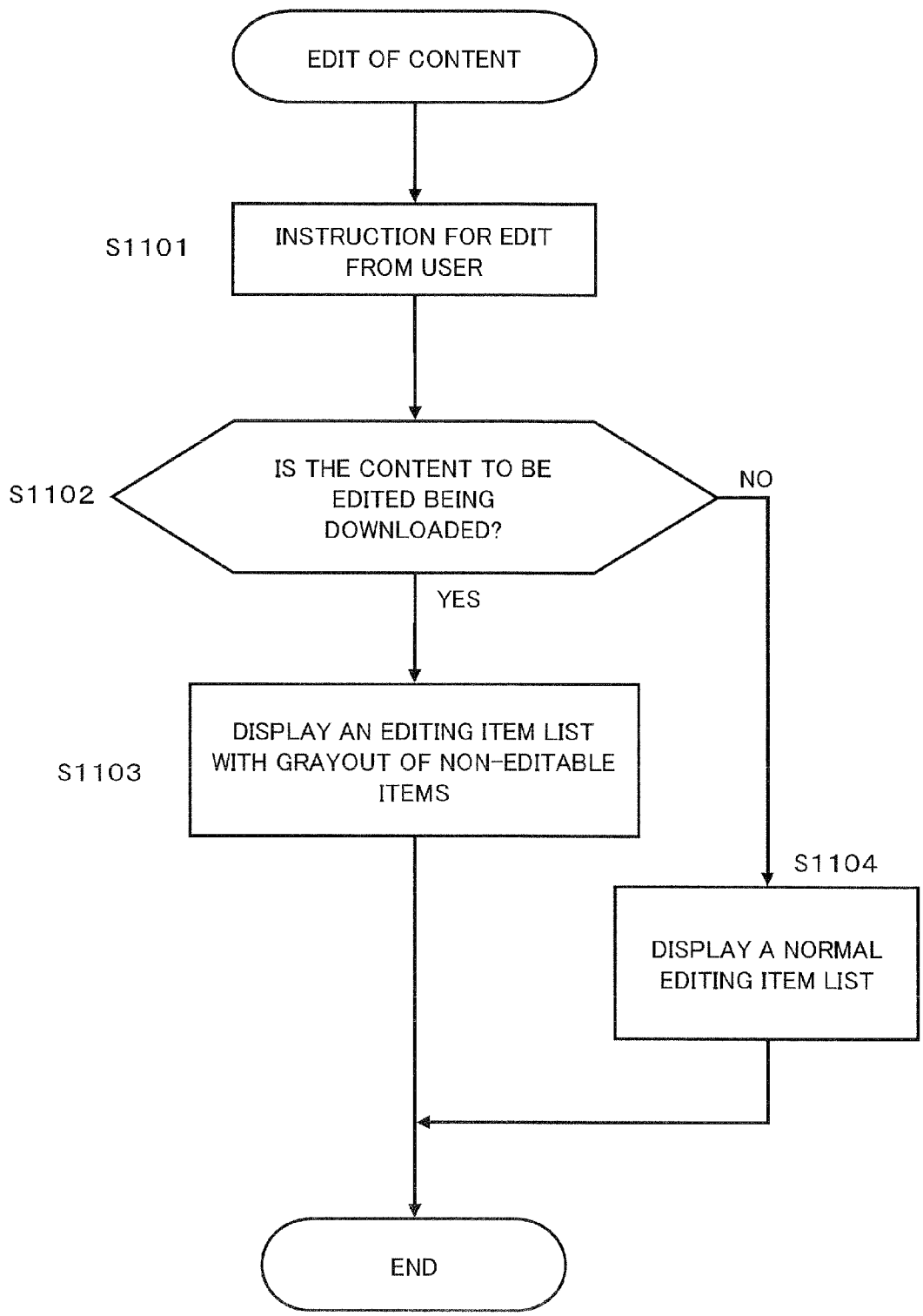
FIG. 11 is a flow chart showing an operation of generating the list of editing items.

FIG. 10 shows an example of a screen (editing item list) displayed when a user provides an editing instruction of a content. An editing item list 303 includes a plurality of items corresponding to editing operations. A background color of an item which cannot be edited is set to gray. An operation of creating the editing item list 303 shown in FIG. 10 will be described below with reference to a flow chart in FIG. 11.

A user selects edit of the content in a recording list, and the instruction receiver 216 receives the selection (S1101). Then, the CPU 212 determines whether the edit is made to a content which is being downloaded or to another kind of content (S1102). When the edit is made to the content which is being downloaded, the CPU 212 instructs the graphic controller 208 to create an editing item list image with a background color for an item ("non-editable item") which can not be edited set to gray. The graphic controller 208 changes the background color of the non-editable item into gray with reference to image data of the memory 209 and generates the editing item list 303 to superpose the editing item list 303 on the recording list image (S1103). For example, in FIG. 10, background colors of items of program erasing, program editing, a chapter list, and chapter editing are changed into gray. The editing item list 303 with the background colors of the non-editable items changed into gray is superposed on the recording list image to transmit the superposed image to the digital television 100 through the video output unit 210. In this manner, the digital television 100 displays the image on which the editing item list image with the background colors of the non-editable items changed into gray is superposed.

On the other hand, when the edit is not made to the content which is being downloaded, the CPU 212 instructs the graphic controller 208 to create a usual editing item list image (S1104).

More specifically, when the instruction receiver 216 receives a request related to editing of a download content and made by a user, the CPU 212 edits the content recorded in the HDD 205 based on the editing request. At this time, the CPU 212 does not receive the editing request to the content regardless of a user operation, as long as the network controller 215 is downloading the content.

That is, the recorder 101 of the embodiment is a recorder capable of recording in the HDD 205 a content which is downloaded from the content server 104 and playing back the content. The recorder 101 includes the drive controller 204 configured to download the content stored in the content server 104 to record the downloaded content in the HDD 205, the instruction receiver 216 configured to receive user request for editing the downloaded content, and the CPU 212 configured to edit the content stored in the HDD 205 according to the request. The instruction receiver 216 does not accept the request for editing the content while the drive controller 204 is downloading the content. Hence, it is possible to prevent the user from accidentally editing the content which is being downloaded.

The CPU 212 and the graphic controller 208 create data of a content list which includes all or part of the contents recorded in the HDD 205 and displays a list of the all or part of the contents. When the CPU 212 displays a list of editing items to a content being downloaded, the CPU 212 changes display methods for non-editable editing items.

That is, the recorder 101 of the embodiment further includes the CPU 212 and graphic controller 208 configured to create data of a recording list to display a list of content information for all or part of contents recorded in the HDD 205. The CPU 212 and graphic controller 208 further create image data of a list of editing items for a content being downloaded, in which a displaying method of an editing item which is not editable is different from that of an editing item which is editable in the list of editing items. This allows the user to easily discriminate editing operations that the user can do from editing operations that the user can not do.

In this manner, during the download of the content, the content is prohibited from being edited, and a user can determine whether editing is prohibited by only looking at the editing item list image.

The recorder 101 of the embodiment is a recorder capable of downloading a content from the content server 104, recording the downloaded content in the HDD 205, and playing back the content. In the recorder 101, the network controller 215 and the drive controller 204 acquire meta information of the content, stored in the content server 104, and prepare for start of download of the content. After the preparation is completed, the content is downloaded from the server and recorded in the HDD 205. The CPU 212 and the graphic controller 208 create content list data for displaying a list of at least part of contents recorded the HDD 205. Especially, the CPU 212 and the graphic controller 208 create the content list data such that a list displayed when the network controller 215 and the drive controller 204 perform the preparing operation for download is different from a list displayed when the network controller 215 and the drive controller 204 performs download.

Even though the download of the content is not completed, when the download of the content is stopped, editing of the content may be permitted. More specifically, even though the network controller 215 does not complete download of the content, while the download of the content is stopped, the CPU 212 may accept an editing request to the content.

While the content is downloaded, the bundle display can also be prohibited. The bundle display is a function of displaying contents having the same type in a recording list as one content. For example, in the example in FIG. 9, "Drama, Miracle Experience!" is displayed in bundle display method.

More specifically, the instruction receiver 216 receives a selection instruction for attributes of a download content and a broadcast content recorded in the HDD 205. The CPU 212 groups the contents recorded in the HDD 205 according to the selection instruction accepted by the instruction receiver 216. The CPU 212 and the graphic controller 208 create the content list data.

However, when a content being downloaded is displayed in a bundle, progress of the download cannot be easily checked. Therefore, when a content to be displayed in bundle display manner is being downloaded, the content may not be displayed in bundle display manner and a progress of the download may be displayed in another area on the recording list. The CPU 212 and the graphic controller 208 create a recording list so that information for a content of which additional information is being downloaded is not included in the recording list.

Figure 12A:
FIG. 12A is a diagram showing an example of a recording list while a content is being downloaded.

A concrete operation performed when a content being downloaded is displayed in another area on a recording list without the bundle display of the content being downloaded will be explained below. FIG. 12A is a diagram showing an example of a recording list during download of a content according to such an operation. When creating a recording list from meta information recorded in the RAM 213, the CPU 212 refers to information related to bundle display to determine whether there are contents to be displayed in a bundle. When there are contents to be displayed in a bundle, the CPU 212 further determines whether there is a content which is being downloaded in the contents to be displayed in a bundle. When there is no content which is being downloaded, the CPU 212 displays a recording list which displaying those contents in a bundle. When there is a content being downloaded, the CPU 212 does not display the content being downloaded in a bundle but displays it in an area (lowermost row) other than the area (third row) for the bundle display on the recording list, as shown in FIG. 12. When the area of "Drama, Miracle Experience!" which is being downloaded is enlarged and displayed, as shown in FIG. 12B, details of a progress of the download are displayed. In this manner, a user can check the progress.

That is, the recorder 101 of the embodiment is a recorder capable of downloading a content from the content server 104, recording the content in the HDD 205, and playing back the content. The recorder 101 includes the drive controller 204 configured to download a content including attribute data stored in the content server 104 to record the content in the HDD 205, the CPU 218 and graphic controller 208 which are configured to create a list image data to display a list of content information for all or part of contents stored in the HDD 205. The CPU 218 and graphic controller 208 handle in one bundle a plurality of contents having the same attribute data, as one content, to create the list image data of the contents. The content which is being downloaded and has the same attribute is handled separately from the one bundle in creating the list image data.

According to the display method, since a progress of download of a content which is being downloaded can be checked with reference to a recording list, the progress of download can be easily checked.

FIG. 12C is a diagram showing a recording list obtained upon completion of the download. The content which the download is completed is displayed in a bundle upon completion of the download. Therefore, during the download, as shown in FIG. 12B, the number of contents in bundle display "Drama, Miracle Experience!" is 2. In contrast to this, upon completion of the download, as shown in FIG. 12C, the number of contents increases to 3. In this state, when a row of "Drama, Miracle Experience!" in bundle display on the recording list is selected, a list of contents in bundle display is displayed as shown in FIG. 12D.

4-4 Display of Recording List of Age-limited Content and Playback of Age-Limited Content 4-4-1 Recording of User Age Information Contents such as contents including a scene of violence which adversely affects children must be restricted to be played back depending on the age. With respect to these contents, display of only titles or thumbnail images in the recording list may be sometimes harmful to children. Therefore, the recorder 101 according to the embodiment can regulate display or playback of a recording list depending on user age information. First, a method of recording user age information to regulate display or playback of a recording list will be explained. By an operation performed by a user by using the remote controller 102, the recorder 101 displays a screen for inputting an age on the digital television 100. The user age information is input to the recorder 101 by an operation by the user through the remote controller 102. The user age information is age information of a user who uses the recorder 101, and can be arbitrarily registered by the user. When the instruction receiver 216 receives an input from the user, the CPU 212 records the user age information on the flash memory 211.

4-4-2 Recording List of Age-limited Content

A method of displaying an age-limited content on a recording list will be explained. For a content recorded in the HDD 205, an age limit level is set depending on the degree of harmfulness of the content. Age-limit levels are classified into, for example, the following three levels:

Level 1) A content itself is not harmful. A title or a thumbnail image of the content can be displayed on a recording list without harmful effects, or the content can be played back without harmful effects. The content is called a "non-harmful content".;

Level 2) A title or a thumbnail image of a content can displayed on a recording list without harmful effects, but the content itself includes harmful information. The content is called a "low-harmful content.; and Level 3) A title or a thumbnail image of a content includes harmful information, and the content itself includes harmful information. The content is called a "high-harmful content".

Figure 13:
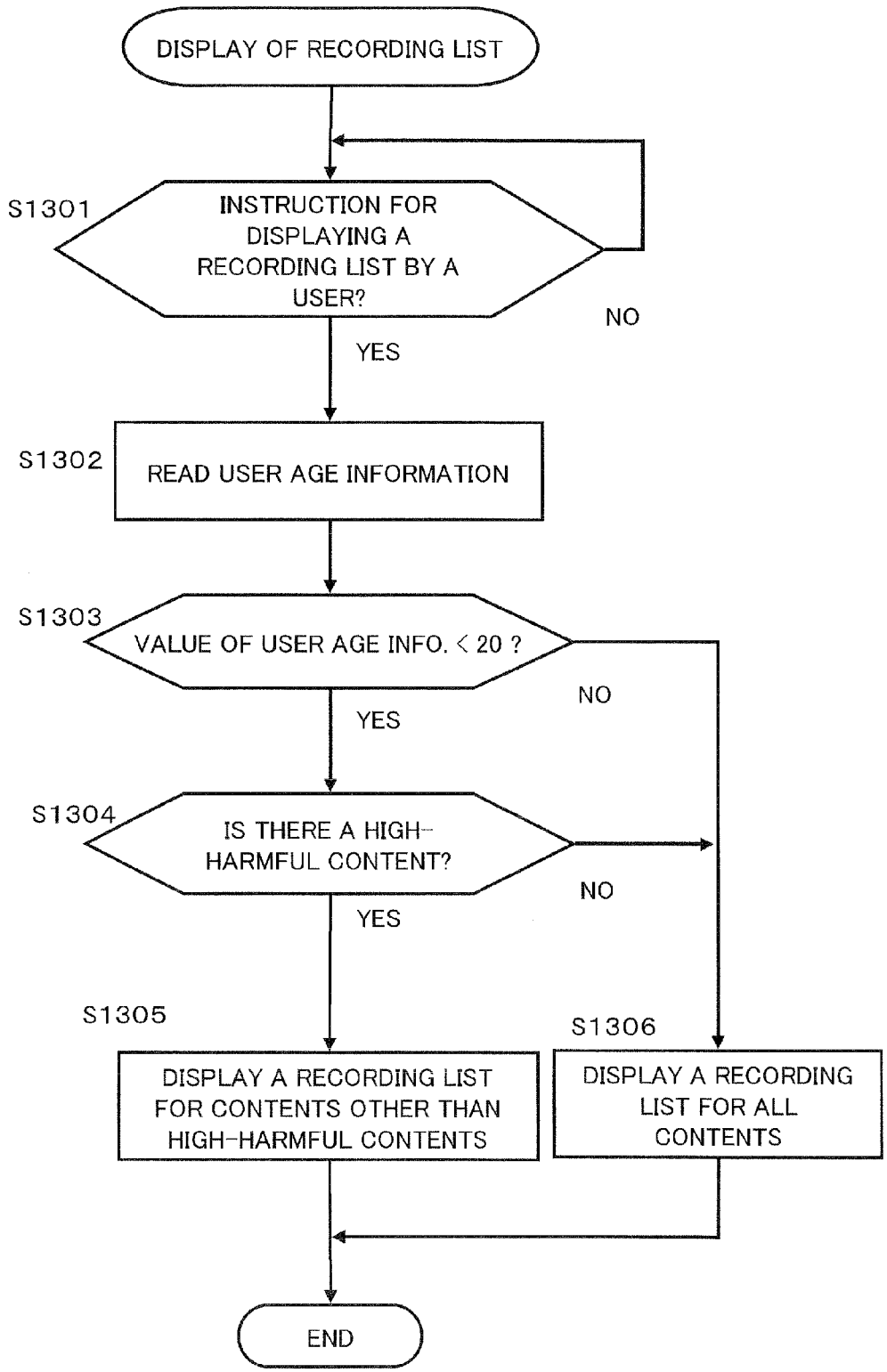
FIG. 13 is a flow chart showing an operation of displaying a recording list.

In the embodiment, information (to be referred to as "degree-of-harmfulness information" hereinafter) indicating that a content is any one of an "non-harmful content", a "low-harmfulness content", and a "high-harmful content" is provided. The degree-of-harmfulness information is stored in meta information. Information which defines an age serving as a reference age for determining whether playback of a content is permitted is described in the meta information. The information will be called "target age information" hereinafter. For example, for a low-harmful content, information indicating any one of ages ranging from 12 to 19 is described in the meta information as the target age information. The low-harmful content is controlled such that the content can always be displayed on a recording list but the content can be played back only when a value of user age information input by a user is equal to or higher than a value of the target age information of the content. For a high-harmful content, for example, "20" is set to the target age information. With respect to the high-harmful content, when user age information represents 20 or more, the content is controlled to be displayed on a recording list and to be played back. On the other hand, the user age information indicates a value lower than 20, the content is controlled to be prohibited from being displayed on a recording list and from being played back. An operation performed when a recording list is displayed by an instruction from a user will be explained by using a flow chart in FIG. 13. When the user presses a button of "recording list" on the remote controller 102, the instruction receiver 216 detects that the button is pressed (S1301). Then the CPU 212 instructs the drive controller 204 to read meta information of all or part of the contents recorded in the HDD 205. The drive controller 204 reads the meta information of all or part of the contents recorded in the HDD 205 and records the meta information in the RAM 213. The CPU 212 interprets the meta information recorded in the RAM 213. In the following explanation, it is assumed that, for example, contents shown in FIG. 14 is recorded in the HDD 205. In this case, a content having a title of "R20 PROGRAM" corresponds to a "high-harmful content". The CPU 212 refers to user age information recorded in the flash memory 211 (S1302). When the user age information recorded in the flash memory 211 indicates 20 or more (S1303), a recording list image which displays all contents, as shown in FIG. 14, is created (S1306). The created recording list image is transmitted to and displayed on the digital television 100 through the graphic controller 208 and the video output unit 210. In the recording list shown in FIG. 14, "R20 PROGRAM" which is a "high-harmful content" is displayed on the recording list.

Figure 15:
FIG. 15 is a diagram showing an example of a recording list image which does not display the content having an age limit.

On the other hand, when the user age information recorded in the flash memory 211 indicates a value lower than 20 (S1303), an age limit is not cleared. For this reason, the CPU 212 determines whether a "high-harmful content" is recorded in the HDD 205 based on the meta information (degree-of-harmfulness information) recorded in the RAM 213 (S1304). Contents other than the high-harmful content are displayed on the recording list (S1305). More specifically, as shown in FIG. 15, a recording list image is created including no "R20 program".

The created recording list image is transmitted through the graphic controller 208 and the video output unit 210 to the digital television 100 and displayed thereon. In FIG. 15, the "R20 program" as a "high-harmful content" is not displayed on the recording list screen.

In short, with respect to a content to be included in a list out of the contents recorded in the HDD 205, when the content includes target age information, the CPU 212 and the graphic controller 208 determines whether content information indicating the content is included in the list based on the target age information and user age information stored in the flash memory 211. In this manner, harmful information can be prevented from being presented to young users.

4-4-3 Playback of Age-limited Content

Figure 16:
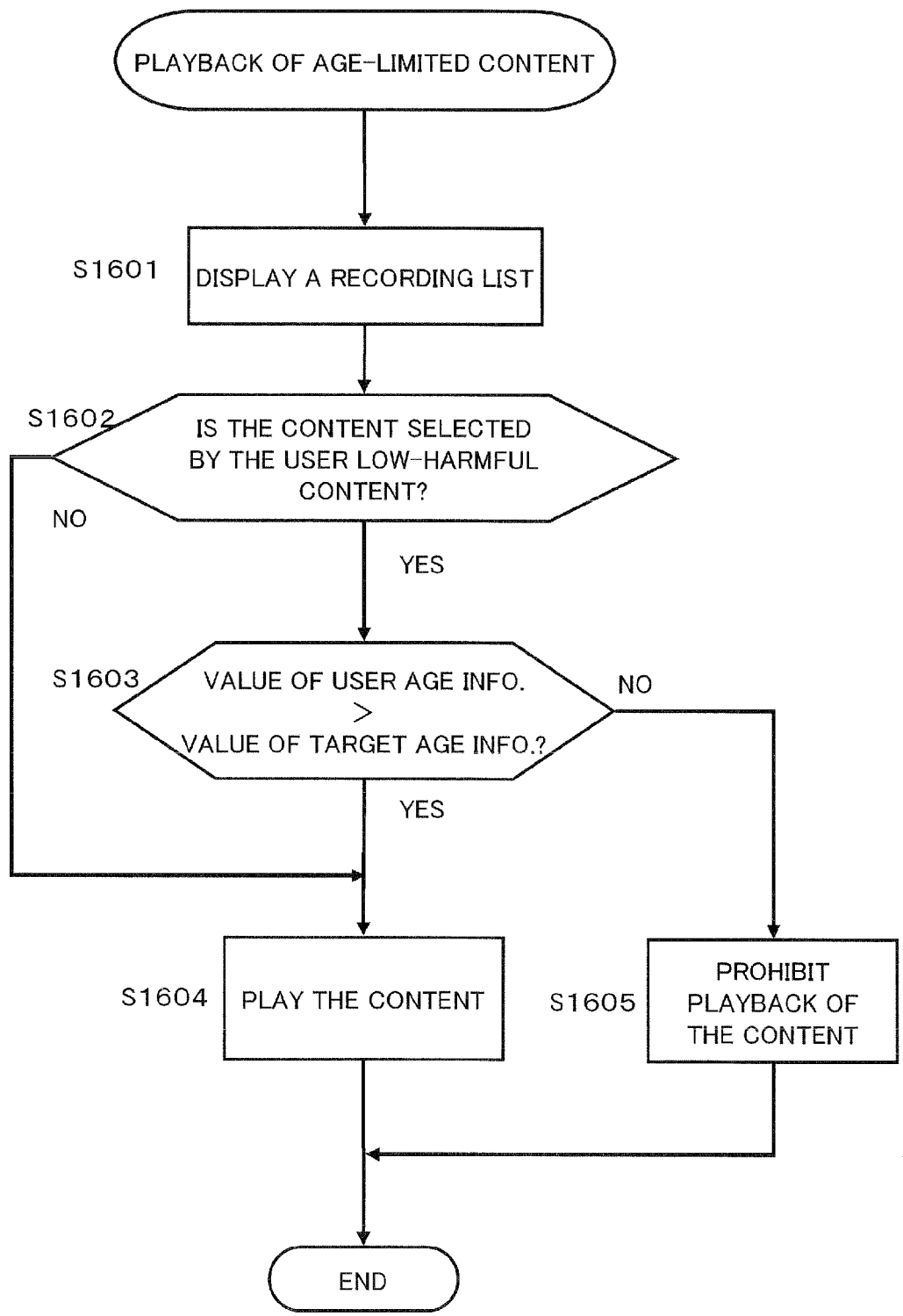
FIG. 16 is a flow chart showing a playback operation of an age-limited content.

A method of playback of an age-limited content will be explained by using a flow chart in FIG. 16.

A user selects a content to be played back with a recording list (S1601) displayed on the digital television 100. When user age information represents a value less than 20, "high-harmful content" is not displayed in the recording list, and only an "non-harmful content" and a "low-harmful content" are displayed in the recording list.

When the instruction receiver 216 detects selection of a content, the CPU 212 refers to degree-of-harmfulness information of the selected content. The selected content is an "non-harmful content" (S1602), the content is normally played back (S1604).

On the other hand, when the selected content is a "low-harmful content" (S1602), the CPU 212 refers to user age information recorded in the flash memory 211 and target age information stored in meta information of the content. When a value represented by the user age information is larger than a value represented by the target age information (S1603), the content is normally played back (S1604). On the other hand, when an age represented by the user age information is smaller than an age represented by the target age information (S1603), the content is prohibited from being played back (S1605).

More specifically, with respect to a content to be played back among the contents recorded in the HDD 205, when the content includes target age information, the drive controller 204 and the video decoder 207 determines permission/prohibition of playback of the content based on the target age information and the user age information stored in the flash memory 211. With the above description, depending on the user age information recorded in the flash memory 211, it can be determined whether playback of a content is possible.

The target age information may include first age limit data used by the CPU 212 and the graphic controller 208 for determining whether content information is included in the list and a second age limit data used by the drive controller 204 and the video decoder 207 for determining whether the content is played back. In this case, a target age of the recording list can be handled separately from a target age of playback of the content.

4-4-4 Cancellation of Age Limit by inputting Password

The recorder 101 records a predetermined password. A user can cancel an age limit of a content by inputting the password. When the age limit of the content is designed to be able to be canceled, an age limit for playback of an age-limited content and display of the content in a recording list can be eliminated.

Figure 17:
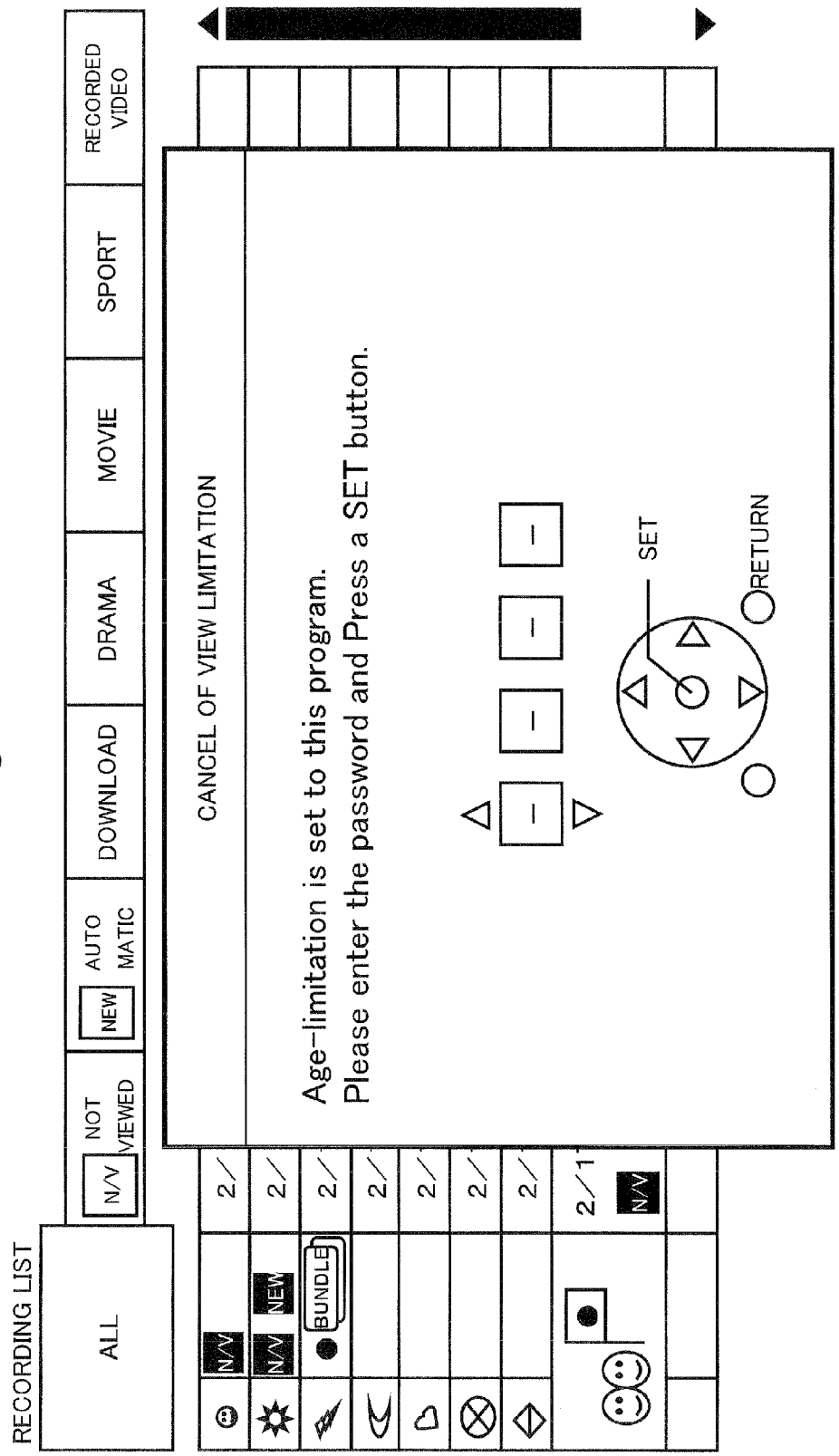
FIG. 17 is a diagram showing an example of an input screen for entering a password.

Password information is pre-installed in the flash memory 211. When a user cancels the age limit of the content, an input screen to input a password is displayed by the user with the remote controller 102. FIG. 17 shows an example of an input screen to input a password.

The user inputs a password in the recorder 101 by using the remote controller 102. When the instruction receiver 216 detects the input password, the CPU 212 compares a password stored in the flash memory 211 with the password input by the user.

When the passwords are matched, the CPU 212 cancels the age limit of the content. In this case, the CPU 212 creates a recording list again, allowing a content which cannot be displayed because of the age limit to be displayed. The CPU 212 permits playback of a content which is not permitted to be played back because of the age limit. On the other hand, the passwords are not matched, control related to the age limit of the content is maintained.

Once the age limit of the content is canceled, cancellation of the age limit of the content is maintained until the power supply of the recorder 101 is turned off. Therefore, the user does not need to repeatedly input the password.

More specifically, even when the CPU 212 and the graphic controller 208 determine that content information indicating the content is not included in the list, the CPU 212 cancels the determination and controls the graphic controller 208 to cause the list to include the content information.

With the above description, the user can cancel the age limit of displaying the content in the recording list by inputting the password.

Even though the drive controller 204 and the video decoder 207 determine not to play back the content, the CPU 212 cancels the determination and controls the drive controller 204 and the video decoder 207 to play back the content.

With the above description, the user can cancel the age limit related to playback of the content by inputting the password.

Playback of an age-limited content and display of the content in a recording list can be permitted simultaneously with the same password.

More specifically, even though the CPU 212 determines that content information indicating a content is not included in the list with the same operation by the user, the CPU 212 can control the graphic controller 208 to display the list. Even though the CPU 212 determines that playback of the content is prohibited, the CPU 212 can control the drive controller 204 and the video decoder 207 to perform a playback operation. The same operation by the user may be an operation of inputting the same password.

The canceling function of an age limit is set as described above. For this reason, when the recorder 101 is used in a home, by recording user age information depending on ages of children, it is possible to prevent the children from viewing a harmful content. Furthermore, when an adult user uses the recorder 101, once the user inputs a password, the user can freely view the content thereafter.

5. Special Operation During Download
5-1 Follow-up Playback During Download

Figure 18:
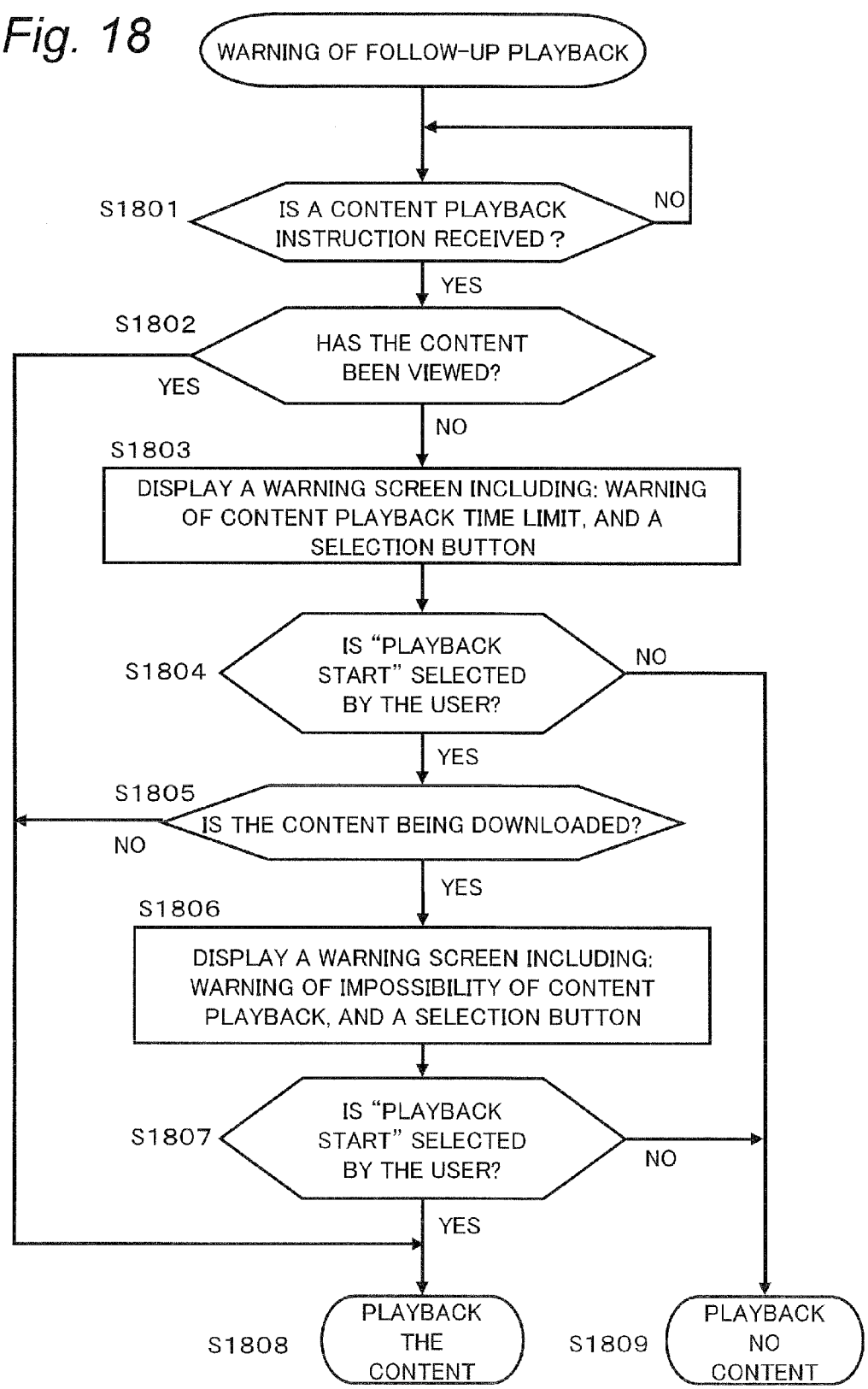
FIG. 18 is a flow chart showing an operation of playing back a content being downloaded.

An operation of playback of a content with a playback time limit (content of a rental system) during download of the content will be explained by using a flow chart in FIG. 18. This playback operation is called "follow-up playback" hereinafter.

When a user selects on a recording list a content which the follow-up playback is to be executed and the instruction receiver 216 receives the selection (S1801), the drive controller 204 determines whether the selected content has not been viewed yet (S1802). This determination is performed by checking the presence/absence of the license information in the HDD 205.

When the content is a content which has already been viewed, the content is played back (S1808). On the other hand, the content is a content which has not been viewed yet, a warning screen including a warning message related to a playback time limit of the content and a selection button for a user to select playback of the content or stop of the playback in response to the warning is displayed on the recording list screen, as shown in FIG. 5A (S1803).

Figure 19:
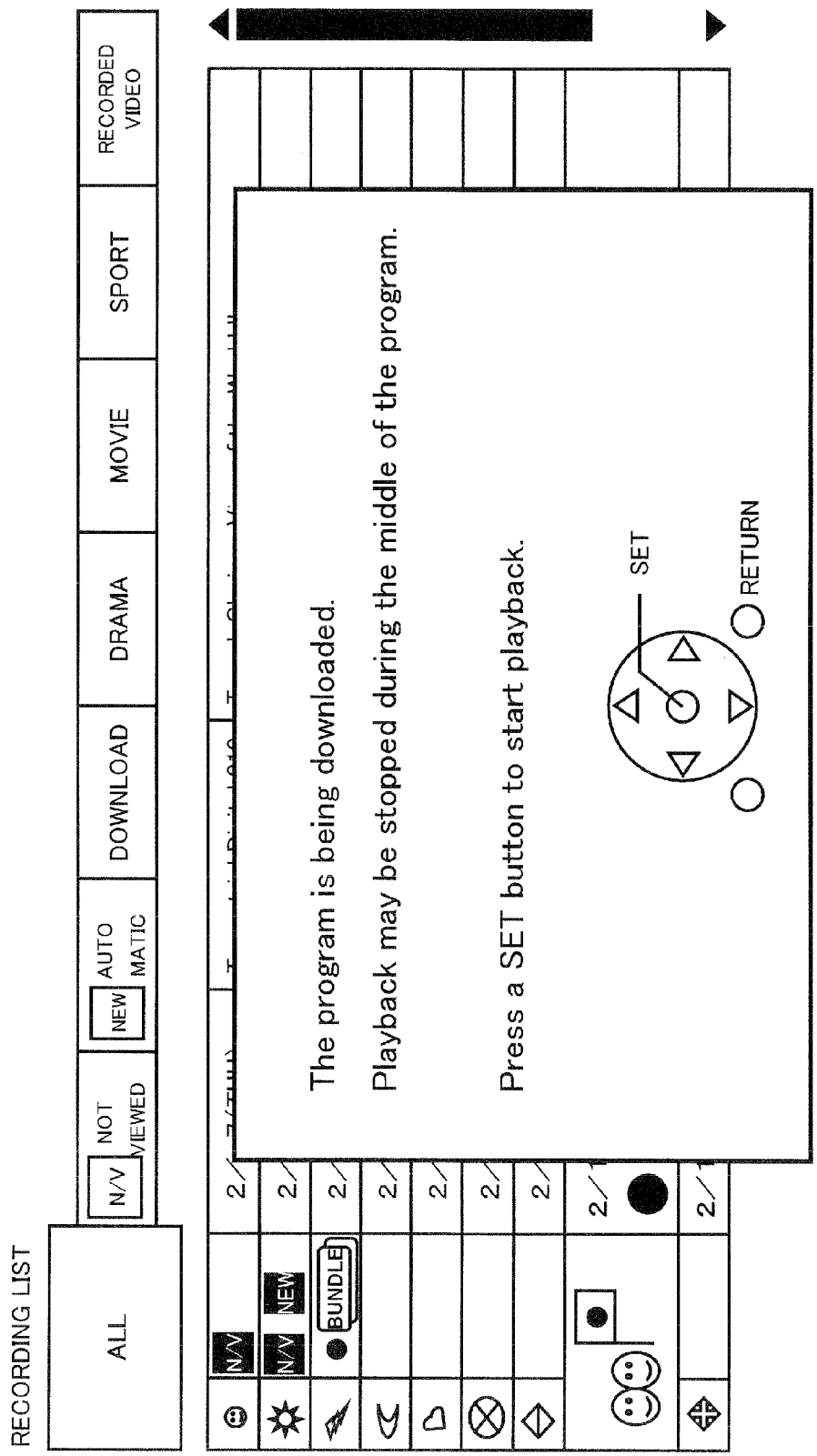
FIG. 19 is a diagram showing an example of a warning screen indicating that playback of a content is stopped on the way.

A warning screen related to the playback time limit of the content is explained here. When a content to be played back is a content of a cell system, it may be warned that playback of the content is stopped on the way. For example, a warning screen as shown in FIG. 19 may be superposed.

When a user selects cancel of playback (S1804), the CPU 212 cancels playback of the content (S1809).

On the other hand, when the user selects playback (S1804), the CPU 212 determines whether the content is being downloaded (S1805). When the content is not being downloaded, the CPU 212 reproduces the content (S1808). On the other hand, when the content is being downloaded, the CPU 212 displays, over the recording list, a warning screen including a warning message indicating that playback of the content may possibly be stopped and a selection button by which a user can select playback of content or stop of the playback in response to the warning (S1806).

Figure 20:
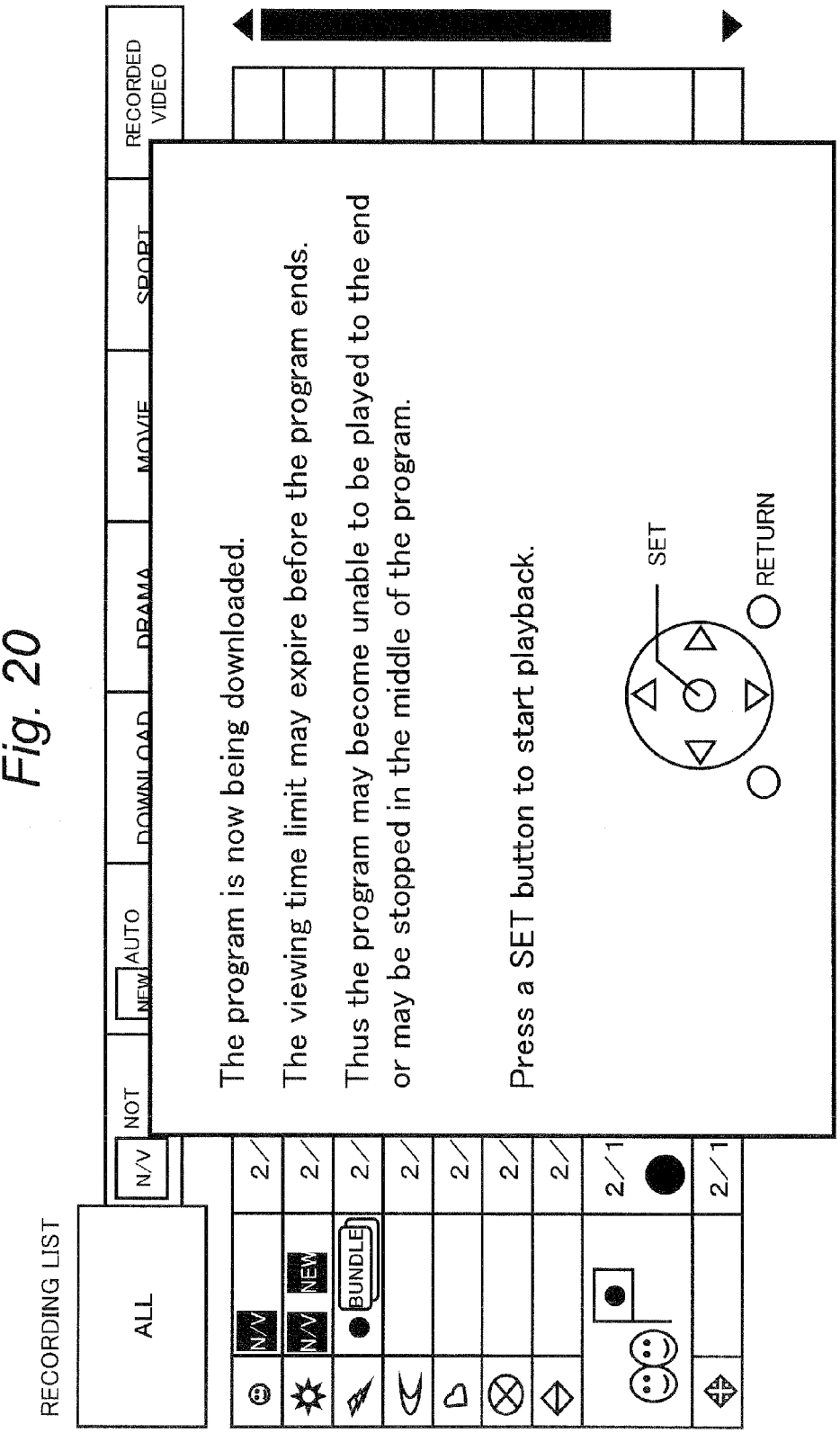
FIG. 20 is a diagram showing an example of a warning screen indicating that it may be impossible to view an overall of content.

The warning screen indicating that playback of content may possibly be stopped is explained here. A playback time limit is started by starting the playback of the content. Therefore, when a download rate is low, the playback time limit in executing follow-up playback may possibly expire before the download of the content is completed. In this case, a problem occurs in that the content cannot be played back completely to the end. Therefore, when the follow-up playback is performed, it is preferable to warn to a user in advance that playback of the entire content may be impossible. For example, the warning screen as shown in FIG. 20 is displayed.

After the warning screen is displayed on the recording list screen, the CPU 212 determines whether the user selects playback or cancel of the playback (S1807).

When the cancel of the playback is selected by the user, the CPU 212 cancels the playback of the content (S1809). On the other hand, when the user selects the playback, the CPU 212 plays back the content (S1808).

In this manner, the recorder 101 of the embodiment is a recorder capable of recording in the HDD 205 a content which is downloaded from the content server 104 and playing back the content. The recorder 101 includes the drive controller 204 configured to download a content with playback time limit, stored in the content server 104 and record it in the HDD 205, the instruction receiver 216 configured to receive an instruction for starting playback of a content, the drive controller 204 and video decoder 207 which are configured to play back the content recorded in the HDD 205 according to the instruction received by the instruction receiver 216, and the CPU 212 and graphic controller 208 which are configured to output an warning information related to playback time limit of the content before the drive controller 204 and video decoder 207 starts the playback of the content, when the instruction receiver 216 receives the instruction for starting playback of the content during download of the content.

In short, when the instruction receiver 216 receives a playback start instruction for a content during download of the content, the CPU 212 and the graphic controller 208 output warning information related to the playback time limit before the drive controller 204 and the video decoder 207 plays back the content.

According to the above operation, when a license is to be acquired and played back during the download of the content, the user is warned in advance that the playback time limit may expire before the download of the content is completed (see FIG. 19) so that it becomes possible to suppress occurrence of the drawback.

The warning information related to playback time limit includes selecting means for selecting execution or cancel of playback of the content by the user. This allows the user to select execution or cancel of playback of the content in a situation that the warning information for the playback time limit is displayed.

When the instruction receiver 216 receives a follow-up playback start instruction for the content during download of the content, the CPU 212 and the graphic controller 208 output warning information for a stop of playback caused by a download rate of the content before the content is played back by the video decoder 207 (see FIG. 20). Also in this manner, occurrence of a drawback in which playback becomes impossible during the download can be suppressed.

When the follow-up playback is executed during download of the content, the following drawback may occur. More specifically, when the follow-up playback is executed in the case where a download rate of the content is low, the playback of the content may possibly catch up with the download of the content. In this case, the playback of the content becomes impossible and the playback of the content is stopped. In this case, a position where the playback of the content is stopped may be recorded in the HDD 205 as a "resume point". The resume point indicates a start position of the content when the playback of the content is restarted. A concrete operation will be described below.

The CPU 212 monitors whether the playback of the content catches up with the download of the content. When the playback of the content catches up with the download of the content and the playback of the content stops, playback time of the stopped content is recognized as a resume point. The CPU 212 instructs the drive controller 204 to record the resume point in the HDD 205. The drive controller 204 records the resume point in the HDD 205.

More specifically, while the content is played back during the download of the content, the CPU 212 compares the recording point of the content with the playback point of the content. When the recording point and the playback point are matched, the CPU 212 performs control to record the matching point in the HDD 205 as a resume point.

That is, the recorder 101 of the embodiment is a recorder capable of recording in the HDD 205 a content which is downloaded from the content server 104 and playing back the content. The recorder 101 includes the drive controller 204 configured to download a content stored in the content server 104 and record it in the HDD 205, the drive controller 204 and video decoder 207 which are configured to play back the content recorded in the HDD 205, and the CPU 212 configured to perform the control such that in cases where the content is played back during the download of the content, when the recording position of the content and the playback position are matched, the matched position is recorded in the HDD 205 as a restart position.

An operation of restarting the playback of the content will be described below. When the instruction receiver 216 receives an instruction to restart the playback of the content, the CPU 212 controls the drive controller 204 plays back the content which playback is restarted from a point pointed by the resume point, with reference to the resume point stored in the HDD 205. The drive controller 204 reads the content from the HDD 205 at the point pointed by the resume point.

In short, the recorder 101 of the embodiment further includes the instruction receiver 216 for receiving the instruction for restarting the playback of the content. When the recording position of the content and the playback position are matched, the CPU 212 performs the control so that the matched position is recorded in a recording medium as a restart position, and the playback of the content is stopped. After the stop of the playback of the content, the CPU 212 performs the control so that the playback of the content is restarted from the restart position when the instruction receiver 216 receives a playback instruction of the content.

In this manner, when the playback of the content is restarted, the playback is executed from the resume point so that it becomes possible to view the content from a position where the playback of the content is stopped.

When the playback of the content catches up with the download of the content, the playback of the content becomes impossible to stop the playback of the content. In order to prevent this drawback, it can also be determined based on the download rate of the content whether follow-up playback is possible.

Figure 21:
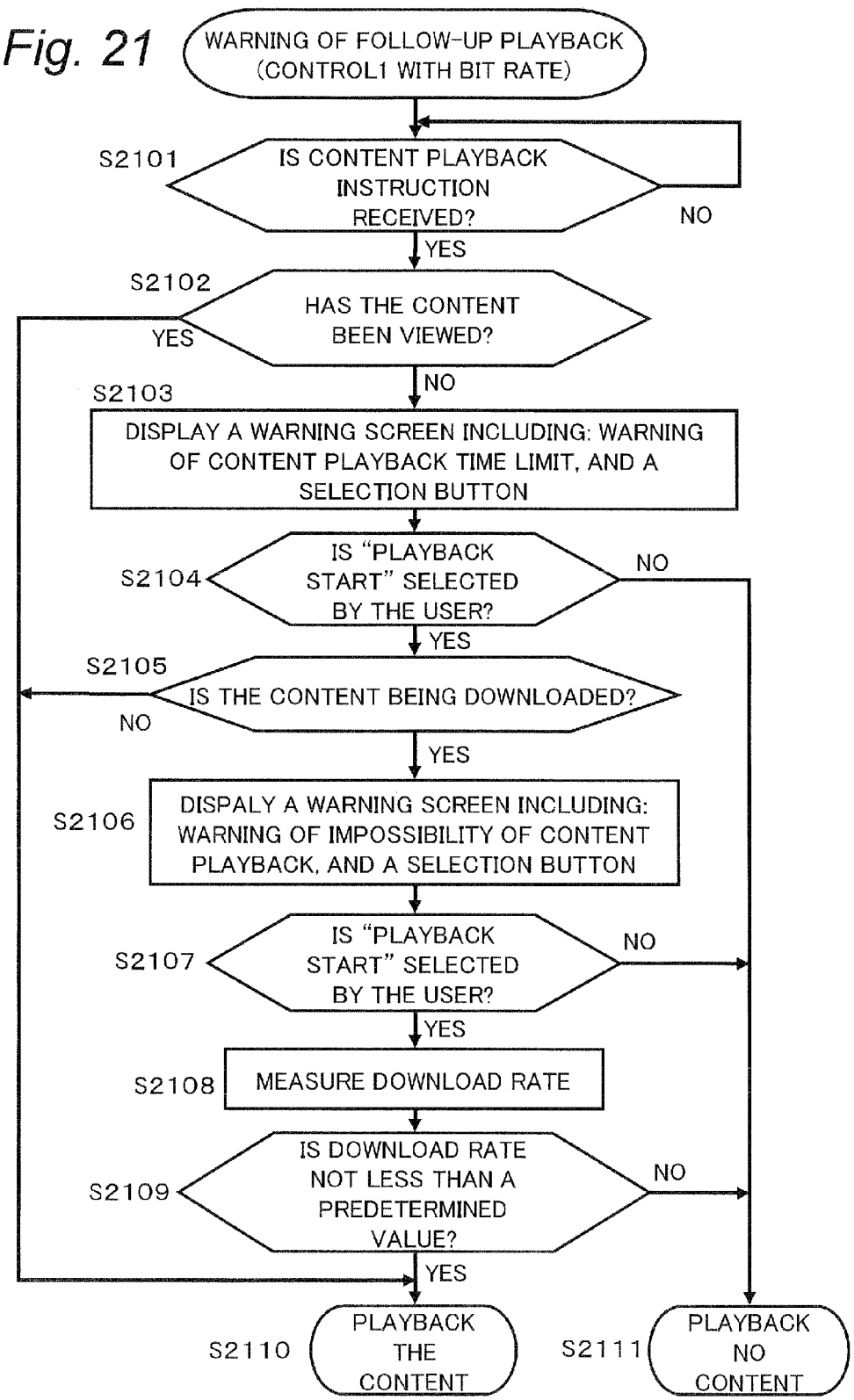
FIG. 21 is a flow chart showing an operation of determining if follow-up playback is possible.

An operation of determining whether follow-up playback is possible will be explained by using a flow chart in FIG. 21. Explanation of the same operations as those in the flow chart in FIG. 18 will be omitted. More specifically, since steps S2101 to S2106 in the flow chart in FIG. 21 are the same as steps S1801 to S1806 in the flow chart in FIG. 18, the explanation of the operations will be omitted.

In step S2106, a warning screen including a warning message indicating that playback of a content may possibly become impossible and a selection button which allows a user to select playback of the content or cancel of the playback in response to the warning is displayed on a recording list screen. When playback is selected by the user on the warning screen (S2107), the CPU 212 measures a download rate of the content of the network controller 215 (S2108) and compares the measured download rate with a predetermined threshold value (S2109). When the download rate of the content of the network controller 215 is smaller than the predetermined threshold value, the CPU 212 stops the playback of the content (S2111). On the other hand, the download rate of the content of the network controller 215 is equal to or larger than the predetermined threshold value, the CPU 212 plays back the content (S2110).

More specifically, when the instruction receiver 216 receives a playback start instruction for the content during download of the content, the CPU 212 determines whether the playback of the content which is being recorded is prohibited based on the download rate of the network controller 215 before the content is played back by the drive controller 204 and the video decoder 207.

In this manner, when the content is played back during the download of the content, the possibility that the playback of the content catches up with the download can be reduced.

The download rate (bit rate) may be obtained by calculating an average of download rates in a period from a time the download of the content starts to a time the download rate is measured. Alternatively, an average of download rates in a period from a predetermined time before the start of measurement of the download rate to a time the measurement ends may be calculate to obtain a download rate.

Figure 22:
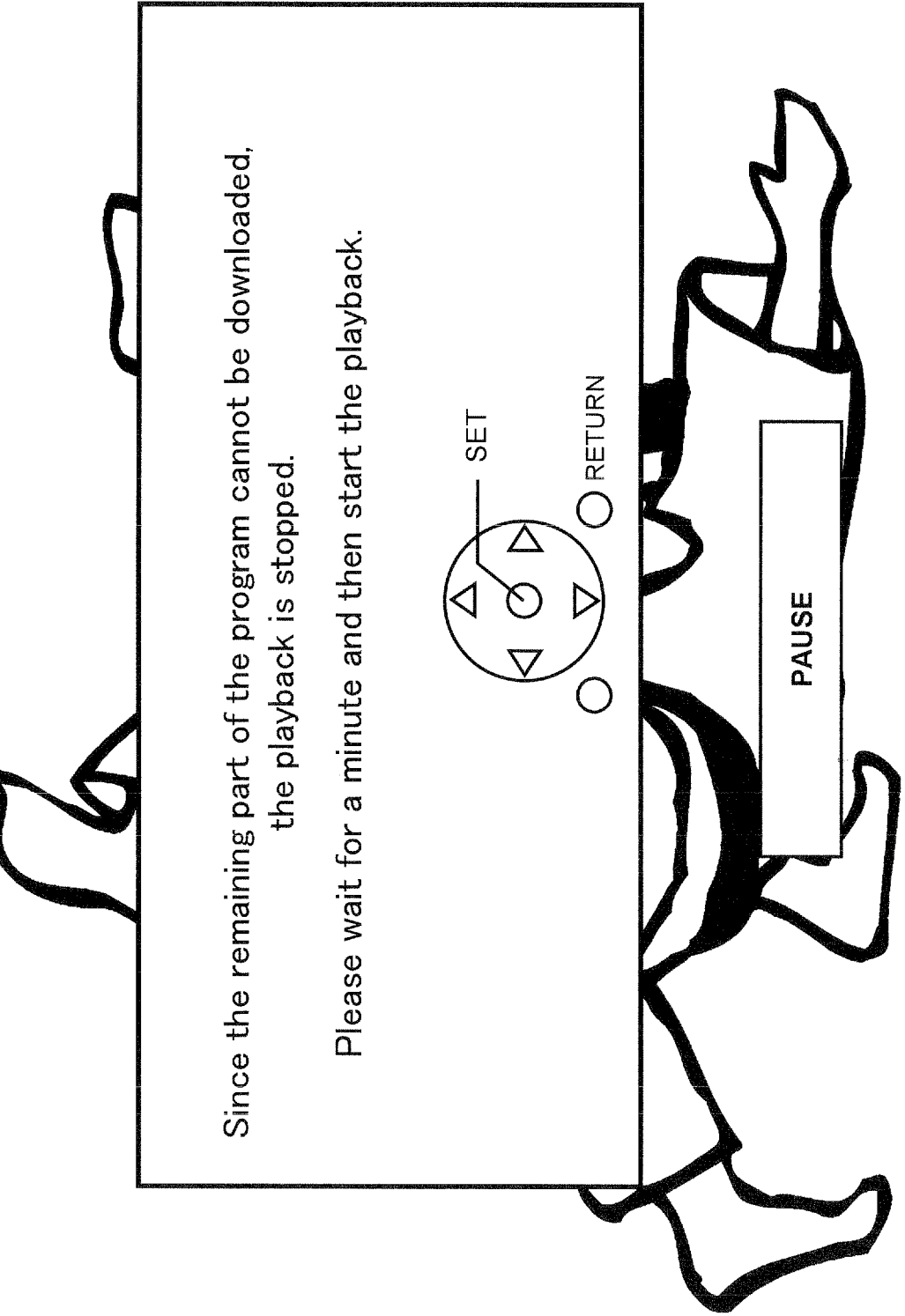
FIG. 22 is a diagram showing an example of a warning screen indicating that playback of a content catches up with download of the content.

When the playback of the content catches up with the download of the content, the playback of the content may be temporarily stopped, and a warning screen indicating that the playback of the content catches up with the download of the content may be displayed as shown in FIG. 22. In this case, the user can easily recognize the reason why the playback of the content is stopped, and thus convenience for the user is improved.

Figure 23:
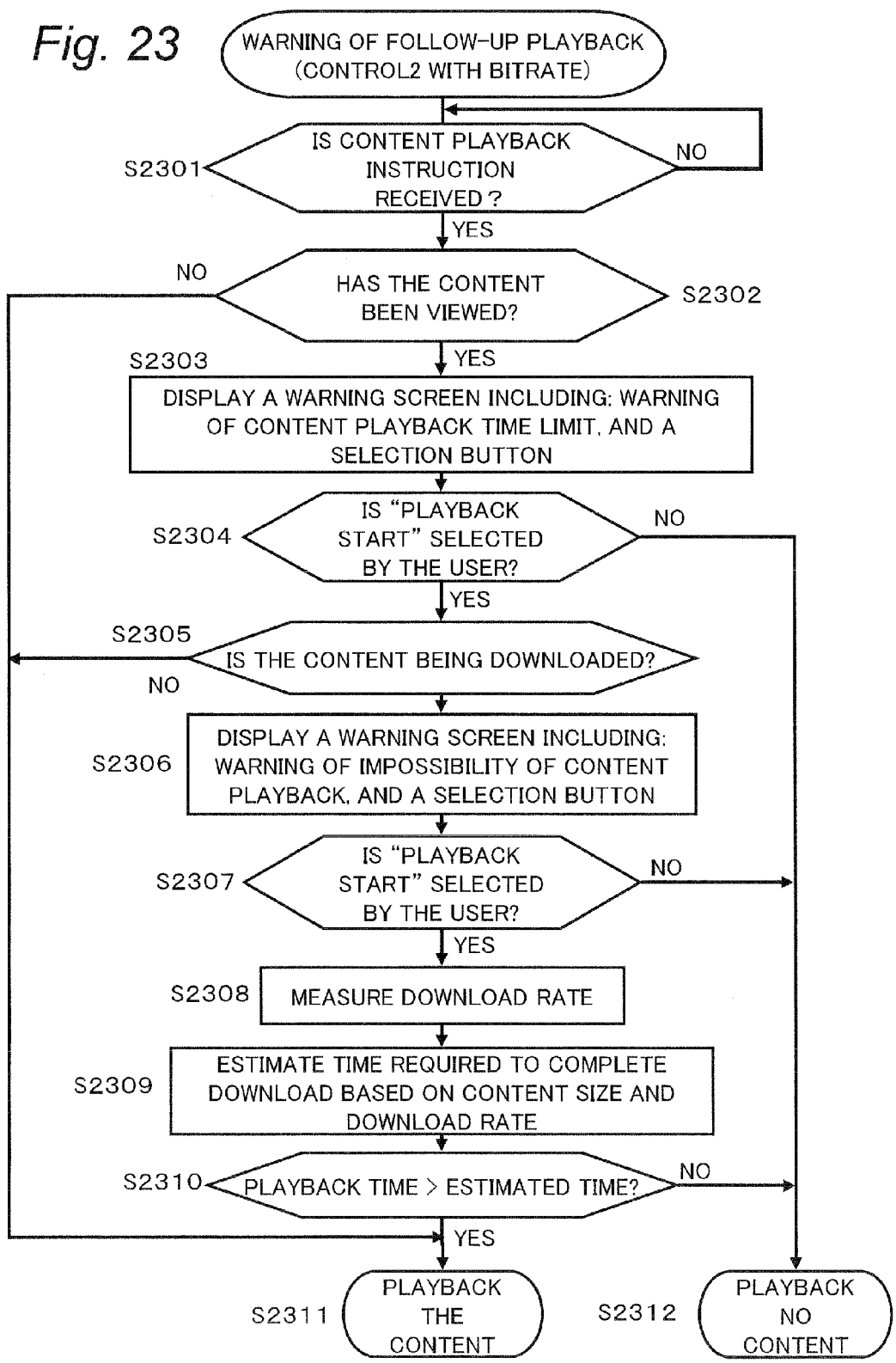
FIG. 23 is a flow chart showing an operation of determining if follow-up playback is possible.

Whether the follow-up playback is possible may be determined not only by the download rate of the content but also by information of a file size of a downloaded content and a file size of the entire content. For example, a time required to download the content can be estimated from the download rate and the size of a part of the content which has not been downloaded yet. This operation will be explained by using a flow chart in FIG. 23. Explanation of the same operations as those of the flow chart in FIG. 18 will be omitted. More specifically, since steps S2301 to S2306 in the flow chart in FIG. 23 are the same as steps S1801 to S1806 in the flow chart in FIG. 18, the explanation of the operations will be omitted.

In step S2306, a warning screen including a warning message indicating that playback of a content may become impossible and a selection button which allows a user to select playback of a content or cancel of the playback is displayed on a recording list screen. When playback is selected by the user on the warning screen (S2307), the CPU 212 measures a download rate of the content of the network controller 215 (S2308). The CPU 212 estimates a time required to complete the download of the content from the file size of a not-downloaded part of the content being downloaded and the measured download rate (S2309). The CPU 212 compares the estimated time required for the download and a playback time (viewing time) of the content (S2301). When the playback time of the content is longer than the estimated time, the playback is permitted (S2311). When the estimated time is longer than the playback time, the playback is prohibited (S2312).

More specifically, the recorder 101 of the embodiment is a recorder capable of recording in the HDD 205 a content which is downloaded from the content server 104 and playing back the content. The recorder 101 includes the drive controller 204 configured to download a content stored in the content server 104 and record it in the HDD 205, the instruction receiver 216 configured to receive an instruction for starting playback of a content, the drive controller 204 and video decoder 207 which are configured to play back the content recorded in the HDD 205 according to the instruction received by the instruction receiver 216, and the CPU 212 configured to determine whether playback of the content is prohibited based on download rate of the drive controller 204 and the network controller 215, data amount of recorded portion of the content, and data amount of unrecorded portion of the content, before the drive controller 204 and video decoder 207 starts the playback of the content, when the instruction receiver 216 receives the instruction for starting playback of the content during download of the content.

According to this configuration, when the follow-up playback is executed, it is possible to determine more exactly whether the playback of the content catches up with the download, and thus the recorder 101 can select permission or prohibition of the playback of the content more appropriately.

Furthermore, more specifically, the CPU 212 compares a viewing time of a recorded part of the content being recorded with a estimated receiving time calculated from the data amount of the entire content being recorded and the download rate. When the estimated receiving time is longer than the viewing time (playback time), the playback of the content being recorded is prohibited.

In this manner, when the follow-up playback is executed, it is possible to determine more exactly whether the playback of the content catches up with the download, and thus the recorder 101 can select permission or prohibition of the playback of the content more appropriately.

5-2 Operation in Download Request for Plurality of Contents

Figure 24:
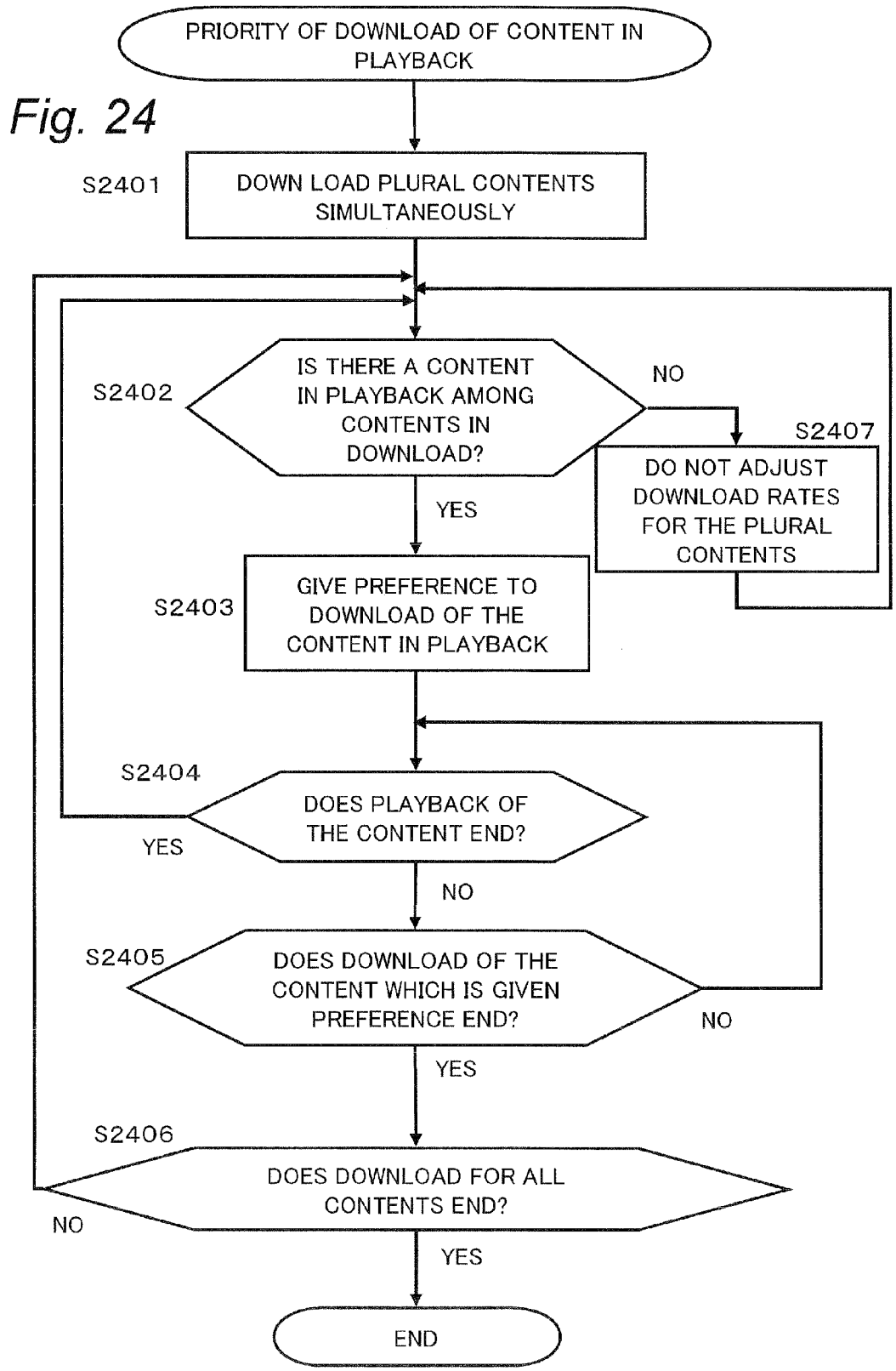
FIG. 24 is a flow chart showing an operation of downloading content when download is requested.

An operation of downloading of contents when the content server 104 is requested to download a plurality of contents will be explained by using a flow chart in FIG. 24.

When a user instructs download of a plurality of contents by using the remote controller 102, the instruction receiver 216 transmits the instruction to the CPU 212. The CPU 212 instructs the network controller 215 to download the plurality of contents at the same time. In this manner, the network controller 215 downloads the plurality of contents at the same time (S2401).

When the plurality of contents being downloaded include a content which is being played back, a priority for download is given to the content which is being played back. A preferential process of the download of the content which is being played back will be explained below.

The CPU 212 monitors whether the plurality of contents which are being downloaded include a content matched with a content which is being played back in the plurality of contents being downloaded (S2402). When the plurality of contents which are being downloaded do not match with the content which is being played back, the CPU 212 downloads the contents without adjusting download rates of the plurality of contents (S2407).

On the other hand, when the plurality of contents which are being downloaded include a content matched with the content which is being played back, the CPU 212 controls the network controller 215 to give a priority in download to the content matched with the content which is being played back (S2403).

More specifically, the CPU 212 controls the network controller 215 to cause a download rate of the matched content to be higher than that of the other contents being downloaded. The CPU 212 may control the network controller 215 to stop the download of the other contents being downloaded and download only the matched content.

During the download of the content being played back, the CPU 212 determines whether the playback of the content is stopped (S2404).

When the playback is stopped, the content being downloaded is not played back (S2402), the plurality of contents are downloaded at the same rate (S2407).

On the other hand, when the download continues, the CPU 212 determines whether the download of the content being played back continues (S2405). When the download of the content being played back is ended, the CPU 212 determines whether the download of all the contents is completed (S2406).

When the download of all the contents is not completed, the CPU 212 monitors whether the content being downloaded is played back again (S2402). When the download of all the contents is completed, the download of the contents is ended.

More specifically, when at least one content of the plurality of contents, indicated by an instruction received by the instruction receiver 216 is being downloaded, and when the instruction receiver 216 receives a playback instruction for any one of the plurality of contents, the CPU 212 controls the network controller 215 and the drive controller 204 such that the content indicated by the playback instruction is downloaded in preference to the other contents.

In this manner, the download rate of the content which is being downloaded can be increased. Therefore, when the content which is being downloaded is simultaneously played back, it is possible to reduce the possibility that the playback of the content is stopped caused by catch-up of the playback of the content with the download of the content.

The number of contents which can be simultaneously received by the network controller 215 is preferably one. In this case, the possibility that playback of the content catches up with download of the content to stop the playback of the content can be more reduced.

5-3 Automatic Stop and Forcible Restart of Download 5-3-1 Automatic Stop of Download During download of a content, the download of the content can also be automatically stopped depending on an operation status of the recorder 101.

For example, a VOD requires a predetermined network band to display a content received from a network in real time. Therefore, when a VOD is viewed during download of the content, the CPU 212 instructs the network controller 215 to stop the download of the content when detecting a start of viewing the VOD. The network controller 215 stops the download of the content. In this manner, reliability of the viewing of the content of the VOD can be improved.

5-3-2 Forcible Restart of Download

A content which is being downloaded can be stopped by user's instruction, or the like. In this case, if it is configured that after the stop of the download the download is not restarted unless a user instructs download, a drawback in which the user cannot complete download of the content may occur although the user purchases the content. To prevent this drawback, the recorder 101 according to the embodiment forcibly restarts the download of the content when the download of the content is stopped.

Figure 25:
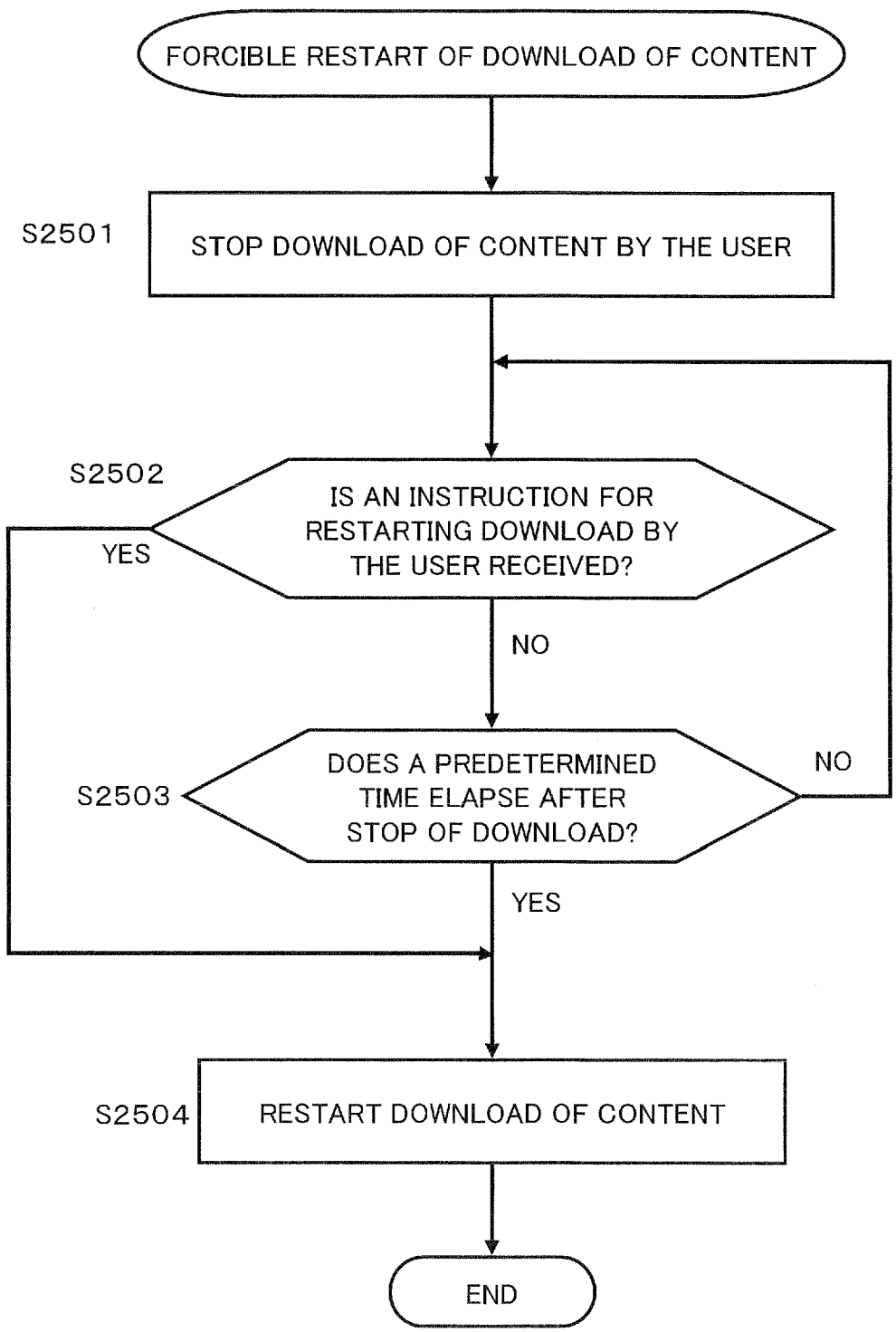
FIG. 25 is a flow chart showing an operation of forcibly restarting the download.

An operation of forcibly-restarting download will be explained by using a flow chart in FIG. 25. During the download, a user instructs a stop of the download through the remote controller 102. The CPU 212 which obtains an instruction from the instruction receiver 216 instructs the network controller 215 to stop the download. In this manner, the network controller 215 stops the download of the content (S2501).

After the stop of the download, the CPU 212 monitors whether an instruction of restarting the download by the user is received (S2502). When the instruction of restarting the download by the user is received, the CPU 212 restarts the download of the content (S2504). On the other hand, when the instruction of restarting the download is not received, the CPU 212 determines whether a predetermined time has passed since the stop of the download (S2503). When the predetermined time has passed since the stop of the download, the download of the content is restarted (S2504).

More specifically, when the instruction receiver 216 receives a stop instruction of the download of the content, the CPU 212 stops the download of the content. Thereafter, when the predetermined time has passed in the stop state, the CPU 212 controls the network controller 215 to restart the download of the content which is stopped. In other words, the recorder 101 of the embodiment is a recorder capable of recording in the HDD 205 a content which is downloaded from the content server 104 and playing back the content. The recorder 101 includes the drive controller 204 configured to download the content stored in the content server 104 and to record the downloaded content in the HDD 205, the drive controller 204 and video decoder 207 which are configured to play back the content recorded in the HDD 205, the instruction receiver 216 configured to receive a stop instruction for stopping the download of the content done by the drive controller 204, the CPU 212 configured to control the drive controller 204. When the instruction receiver 216 receives the stop instruction of the download of the content, the CPU 212 stops the download of the content. Thereafter, when the predetermined time has passed in the stop state, the CPU 212 controls the drive controller 204 to restart the download of the content. In this case, it is more preferable to stop download of all the contents which are being downloaded and then restart the download of all the contents which is stopped.

In this manner, even when the user forgets to restart download after the user stops the download, the download of the content can be forcibly restarted. For this reason, the content can be reliably downloaded.

At the restart of the download, a usage state of a communication line may be checked, a content of which download is to be restarted may be selected depending on the usage state. For example, while playback on the VOD is performed, it may be prohibited to automatically restart the stopped download. Alternatively, it may be configured to prevent the stopped download from being forcibly restarted when a content different from the content of which download is stopped is being played back. More specifically, it may be configured to prevent a content A of which download is stopped from being forcibly restarted, during the follow-up playback of a content B. In short, while a content different from the content of which download is stopped is being played back, the stopped download from being forcibly restarted. Further, during follow-up playback of a second content different from a first content of which download is stopped, it may be configured to prevent the first content from being forcibly restarted. This is because, a band of a communication line is preferentially allocated to download of a content which is being played back so as to reduce adverse affect to viewing of the content being played back.

5-4 Power-off of Power Supply During Download

When the power supply of the recorder 101 is turned off during download of a content, the download of the content can be continued. When a user instructs the recorder 101 to turn off the power supply through the remote controller 102 during download, the CPU 212 obtains an instruction from the instruction receiver 216, determines whether the content is being downloaded in the network controller 215. When the content is being downloaded, the CPU 212 continues the download of the content without turning off the power supply. At this time, the CPU 212 causes the FL display unit 217 to display that the content is being downloaded.

The CPU 212 determines whether the download of the content is ended. When the download of the content is ended, the CPU 212 turns off the power supply of the recorder 101.

More specifically, when the instruction receiver 216 receives an instruction of turning off the power supply during the download of the content by the network controller 215, the CPU 212 stops the power supply after the download of the content is completed. In other words, the recorder 101 of the embodiment is a recorder capable of recording in the HDD 205 a content which is downloaded from the content server 104 and playing back the content. The recorder 101 includes the drive controller 204 configured to download the content stored in the content server 104 to record the downloaded content in the HDD 205, the instruction receiver 216 configured to receive a power-off instruction for turning off the power supply of the recorder 1010, and the CPU 212 configured to control power supply to the recorder 101 based on the instruction received by the instruction receiver 216. When the instruction receiver 216 receives the power-off instruction during the download of the content by the drive controller 204, the CPU 212 turns off the power supply of the recorder 101 after the download of the content is completed, that is, waits until the download of the content is completed to stop the power supply of the recorder 101.

In this manner, even though the power supply of the recorder 101 is turned off during the download of the content, the download is stopped after the download of the content is completed. For this reason, the content can be reliably downloaded.

In this case, it can be displayed on the FL display unit 217 that the content is being downloaded although the power supply is turned off.

In short, the FL display unit 217 which displays an operation state of the recorder 101 is arranged, and the FL display unit 217 displays predetermined indication until the download is completed after the instruction receiver 216 receives an instruction of turning off the power supply during the download of the content. The predetermined indication is a display indicating that, for example, the content is being downloaded. In this manner, the user can recognize the reason why the power supply is not turned off although the user instructs the power supply to be turned off.

6. Management of Time Information

In a content distribution system, when a playback time limit of a content having it is managed, it is important to improve reliability of a timer to manage the playback time limit. This is because, if the timer can be easily changed by a user, a content provider cannot manage the playback time limit of the content.

For this reason, the recorder 101 according to the embodiment includes the secure clock manager 219 in addition to the time manager 218 which measures time for displaying time information on the FL display unit 217. The time manager 218 can change the time information by an instruction input by a user through the instruction receiver 216. In contrast to this, the secure clock manager 219 can change time information by information other than user's instruction such as time information downloaded from the time server 105. A time updating operation in the secure clock manager 219 will be explained below.

The CPU 212 instructs the network controller 215 in a predetermined cycle (for example, every 10 days) to download the time information from the time server 105. The network controller 215 requires the time server 105 to transmit time information through the Internet 103. The time server 105 transmits the time information to the recorder 101 in response to the request. The network controller 215 receives the time information and records the time information in the RAM 213. The CPU 212 updates the time information of the secure clock manager 219 based on the time information recorded in the RAM 213.

More specifically, when the network controller 215 and the drive controller 204 download a content with a playback time limit stored in the content server 104 and record the content in the HDD 205, the network controller 215 and the drive controller 204 download time information from the time server 105 which manages the time to which the network system including the content server 104 and the recorder 101 must conform. The CPU 212 manages the playback time limit of the content having it based on the downloaded time information. The instruction receiver 216 receives a time setting in a method different from a time setting method performed by the network controller 215 and the drive controller 204. The CPU 212 manages time based on the received time setting, for operations of the recorder 101 other than an operation for a playback expiration.

The network controller 215 and the drive controller 204 download the time information from the time server 105 in a predetermined cycle.

In this manner, in the secure clock manager 219, the time information is updated not by an instruction from a user but by the time information downloaded from the time server 105. Therefore, the time information is not illegally changed by a user, and thus the playback time limit of the content can be managed without being illegally changed. When the recorder 101 cannot access the time server 105 and cannot obtain correct time information, accuracy of the time information of the secure clock manager 219 is not secured and the playback time limit of the content may not be correctly kept. Therefore, when the network controller 215 cannot access the time server 105 for a predetermined period, the recorder 101 may prohibit the playback of the content.

More specifically, while the network controller 215 does not download the time information used to manage the playback time limit of the content, the CPU 212 controls the drive controller 204 and the video decoder 207 to prohibit the content from being played back. When the time information cannot be downloaded by the time server 105, a warning that the time information cannot be downloaded may be output.

More specifically, when the network controller 215 cannot download the time information from the time server 105, the CPU 212 and the video decoder 207 output a warning indicating that the network controller 215 cannot download the time information.

Thereafter, when the time server 105 can be accessed, the recorder 101 may permit playback of the content.

More specifically, the network controller 215 downloads a content with a playback time limit from the content server 104 and records the content in the HDD 205. The network controller 215 and the drive controller 204 download time information from the time server 105 which manages time to which the system including the content server 104 and the recorder 101 must conform. The CPU 212 manages the playback time limit of the content with a playback time limit based on the downloaded time information. When the CPU 212 cannot manage the playback time limit, the network controller 215 and the drive controller 204 newly download the time information from the time server 105.

Figure 26:
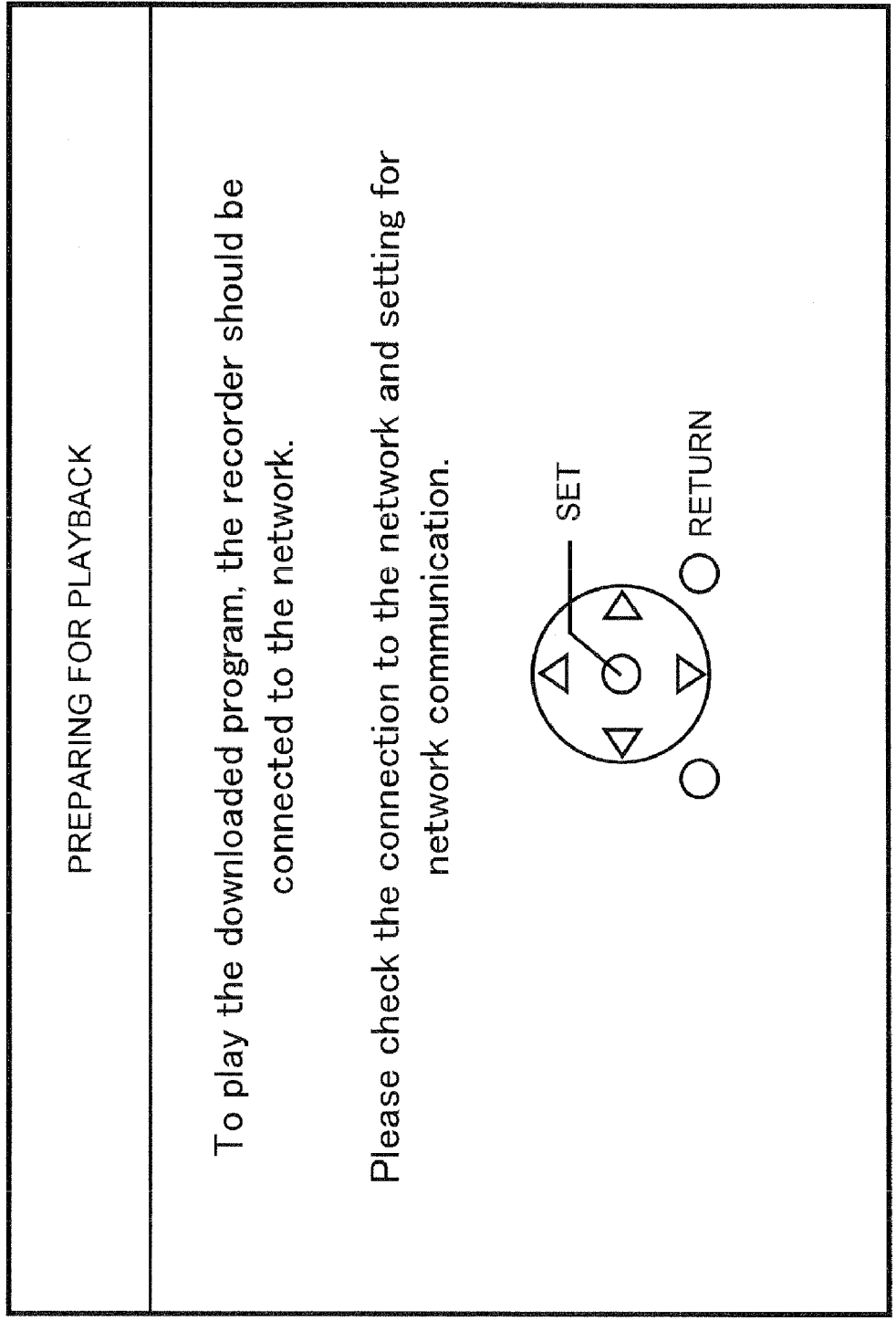
FIG. 26 is a diagram showing an example of a warning screen indicating that a content cannot be played back.

When the recorder 101 is not connected to the network when the time information is downloaded, the time server 105 cannot be accessed. When the time server 105 cannot be accessed, a warning screen indicating that the recorder 101 must be connected to the network may be displayed when the instruction receiver 216 receives the playback start instruction of the content, as shown in FIG. 26.

That is, a predetermined timing at which it is determined whether the recorder 101 is connected to the Internet 103 is a timing of playback of the content in the recorder 101. Hence, in the recorder 101, the accuracy of the time information of the secure clock manager 219 can be reliably secured upon playback, and it is possible to confirm whether the playback time limit of the content can be kept accurately.

More specifically, if a connection between the recorder 101 and the network system including the content server 104 is not confirmed when the instruction receiver 216 receives a playback start instruction for the content, the CPU 212 and the graphic controller 208 output a warning indicating (see FIG. 27) that the recorder 101 must be connected to the network to play back the content by the drive controller 204 and the video decoder 207.

In short, the recorder 101 of the embodiment is a recorder capable of recording in the HDD 205 a content which is downloaded from the content server 104 and playing back the content. The recorder 101 includes the drive controller 204 configured to record the content downloaded from the content server 104 in the HDD 205, the instruction receiver 216 configured to receive a playback start instruction for the content, the drive controller 204 and video decoder 207 which are configured to a content recorded in the HDD 205 according to the instruction received by the instruction receiver 216, the CPU 212 and network controller 215 which are configured to determine whether the recorder 101 is connected to the Internet 103 including the content server 104 at a predetermined timing, and the CPU 212 and graphic controller 208 which are configured to output a warning that the recorder 101 must be connected to the Internet 103, if the result determined by the CPU212 and network controller 215 indicates that the recorder 101 is not connected to the Internet 103 when the instruction receiver 216 receives the playback start instruction for the content.

According to this configuration, the accuracy of the time information of the secure clock manager 219 can be secured, and the playback time limit of the content can be kept accurately.

The CPU 212 may confirm in a predetermined cycle (for example, every 10 days) the connection between the recorder 101 and the network system when the power supply of the recorder 101 is turned on or a recording list is displayed for the first time after the power supply is turned on. When the connection between the recorder 101 and the network system is not confirmed when the instruction receiver 216 receives a playback start instruction for the content, a warning indicating that the recorder 101 must be connected to the network may be displayed, as shown in FIG. 26. A predetermined timing at which whether the recorder 101 is connected to the Internet 103 is determined is a timing the power supply of the recorder 101 is turned on. This configuration allows the recorder 101 to confirm the connection at a timing which provides less adverse affect on the operation of the recorder 101. The CPU 212 may be configured not to display the warning before a predetermined time (for example, 10 days)

passes since the last access to the time server 105 even though the connection to the network is not confirmed.

In short, when a predetermined period has not passed since the connection between the recorder 101 and the Internet 103 is confirmed last, the CPU 212 and graphic controller 208 does not output an warning even though the result determined by the CPU212 and network controller 215 indicates that the recorder 101 is not connected to the Internet 103. The drive controller 204 and video decoder 207 start playback of the content according to the instruction received by the instruction receiver 216. According to this configuration, even though the recorder 101 is not connected to the Internet 103, the content can be played back if the accuracy of the time information of the secure clock manger 219 is secured.

When the power supply of the recorder 101 is turned off, the time server 105 may be accessed so that time information is downloaded from the time server 105. More specifically, the instruction receiver 216 receives an instruction of turning off the power supply, the network controller 215 downloads the time information from the time server 105. Accessing the time server 105 at power-off of the recorder 101 allows the access to the time server 105 to be executed at a timing at which an influence on other operations is minimum.

7. Operation in Erasure of Content 7-1 Basic Operation of Content Erasure

Figure 27:
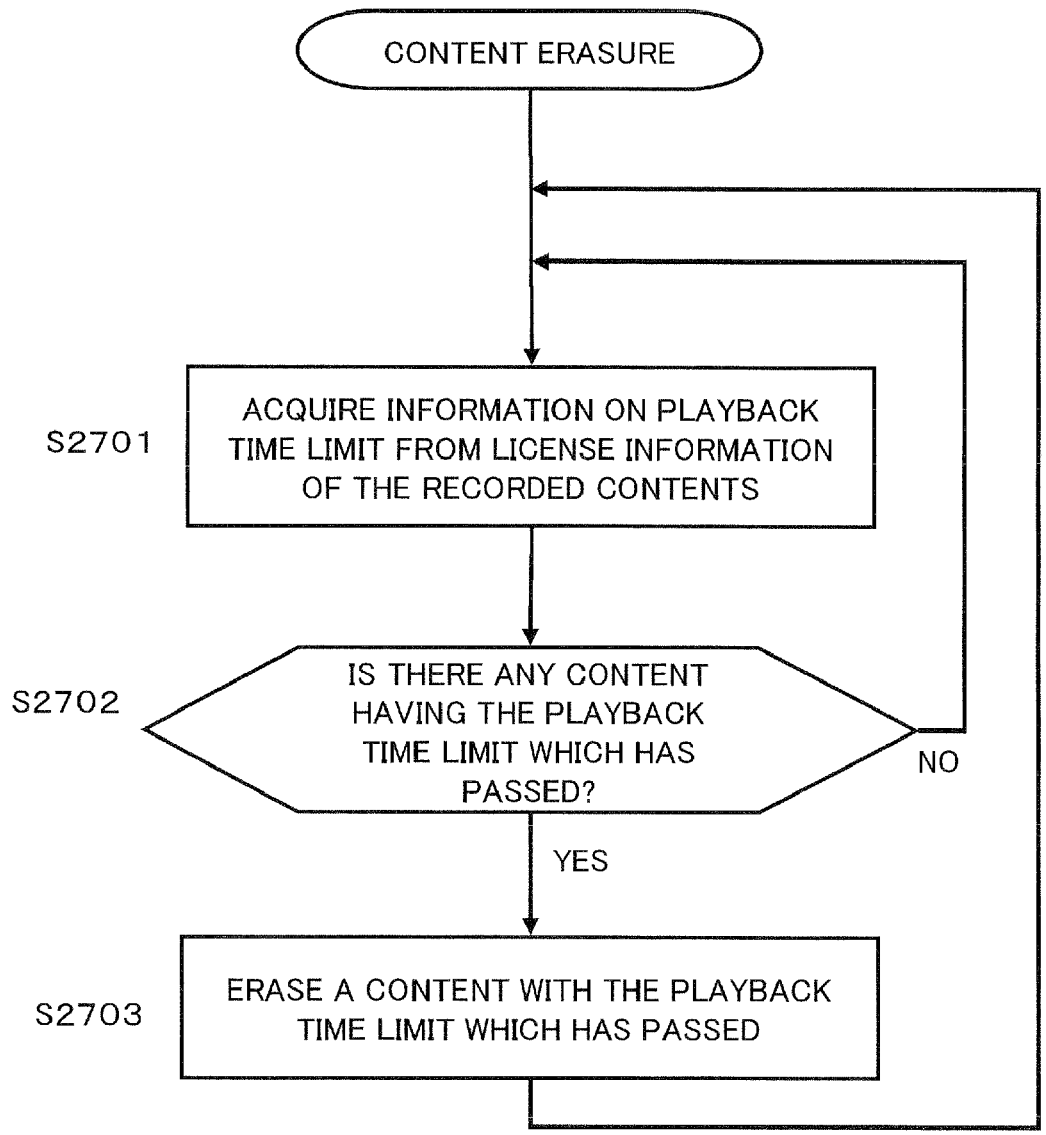
FIG. 27 is a flow chart showing an operation of erasing a content of which a playback time limit expires.

An operation of erasing a content of which playback time limit has passed will be explained here by using a flow chart in FIG. 27. A timing at which the CPU 212 starts erasing of a content will be described later.

The CPU 212 instructs the drive controller 204 to record license information of a content recorded in the HDD 205 in the RAM 213. The drive controller 204 records the license information of the content recorded in the HDD 205 in the RAM 213. The CPU 212 refers to the license information recorded in the RAM 213 to acquire information of a playback time limit (S2701).

The CPU 212 compares the playback time limit included in the license information with time information of the secure clock manager 219 to determine whether there is a content of which playback time limit has passed (S2702). When there is a content of which playback time limit has passed, the CPU 212 erases the content (S2703). More specifically, the CPU 212 instructs the drive controller 204 to erase the content of which playback time limit has passed. The drive controller 204 erases the content recorded in the HDD 205 in response to the instruction.

On the other hand, there is no content of which playback time limit has passed, the CPU 212 do not erase the content.

Figure 28:
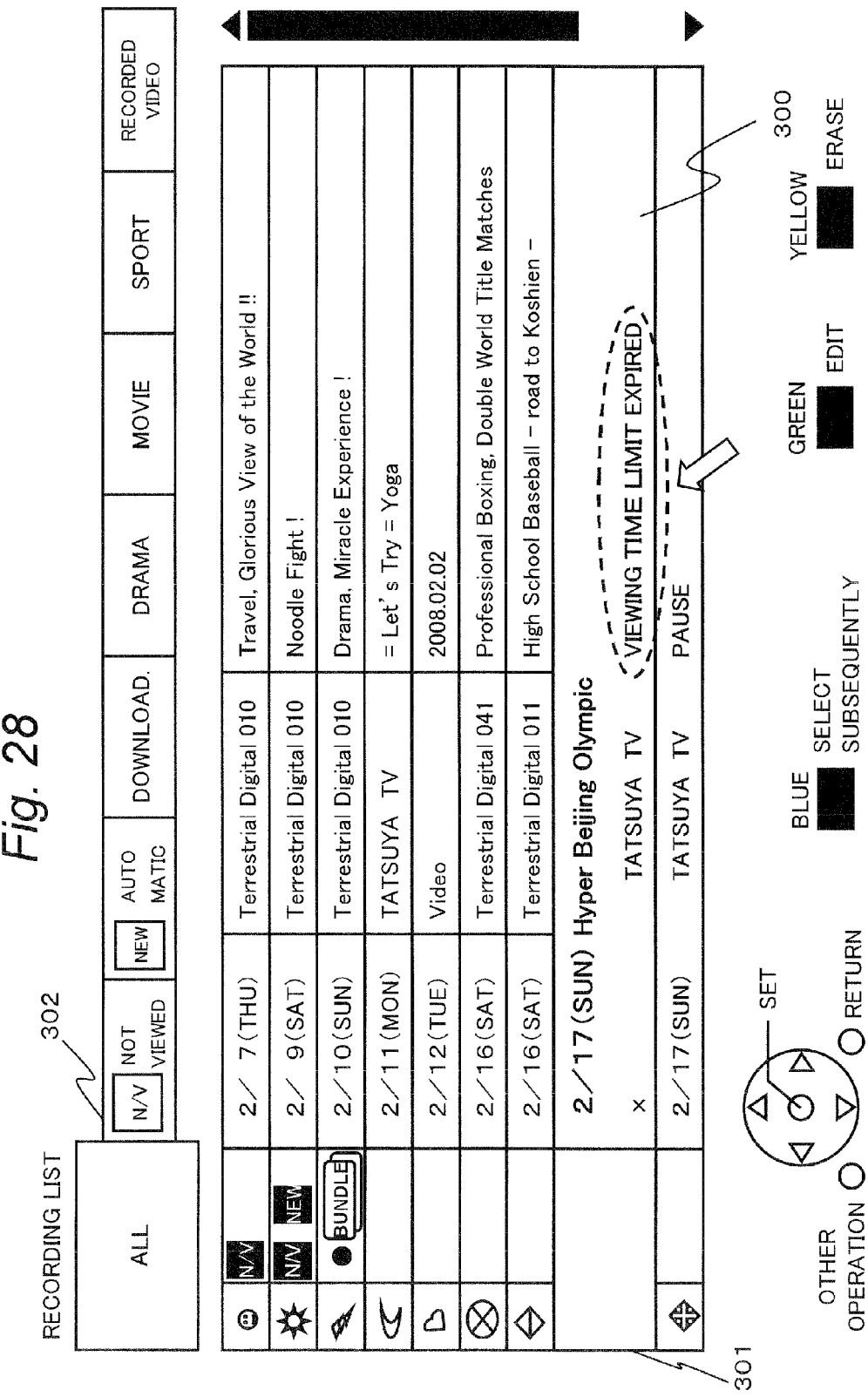
FIG. 28 is a diagram showing an example of a recording list including the content of which viewing time limit expires.
Figure 29:
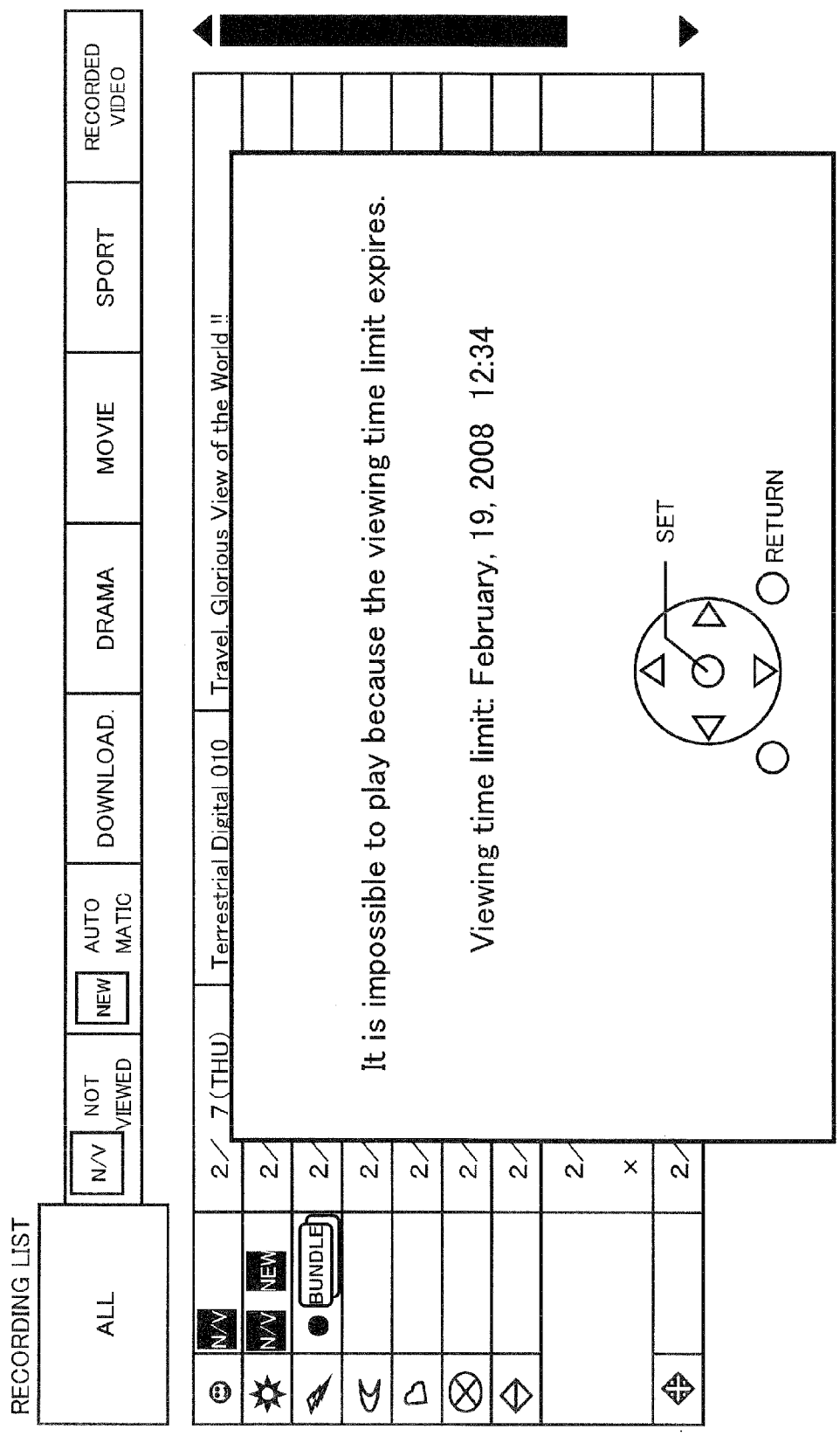
FIG. 29 is a diagram showing an example of a warning screen indicating that playback is impossible because the playback time limit has passed.

Until the playback time limit has passed, the content and meta information of the content are recorded in the HDD 205. When the content of which playback time limit has passed is not erased, the content and the meta information thereof are still recorded in the HDD 205. In this case, a recording list is displayed as shown in FIG. 28. In FIG. 28, "Hyper-Beijing Olympic" is a content of which playback time limit has passed. It is displayed in the content detail display area 300 that the viewing period has expired. In this state, when playback of the content is selected, since the playback time limit has passed, a warning indicating that the content cannot be played back is displayed, as shown in FIG. 29.

The content is not erased immediately after the playback time limit passed. This is because it is prevented to make a situation in which the playback of the content is stopped and the user cannot view the content although the user is still viewing the content when the playback time limit comes while a user is viewing the content. Details of the reason will be described later.

7-2 Operation Performed When Playback Time Limit Passes During Playback of Content An operation performed when a playback time limit passes during playback of a content will be described below. If the content is erased when the playback time limit comes while a user is playing back the content, the user cannot continuously view the content.

Therefore, the recorder 101 according to the embodiment permits the user to play back the content of which playback time limit passes as long as the user does not stop the playback of the content, when the playback time limit comes during the playback of the content.

A concrete operation will be explained below by using a flow chart in FIG. 30.

Even though the playback time limit has come during playback of the content, the playback of the content is continued (S3001). Thereafter, an end of the playback of the content is determined (S3002). When the playback is ended, the playback of the content is stopped (S3006).

Figure 31:
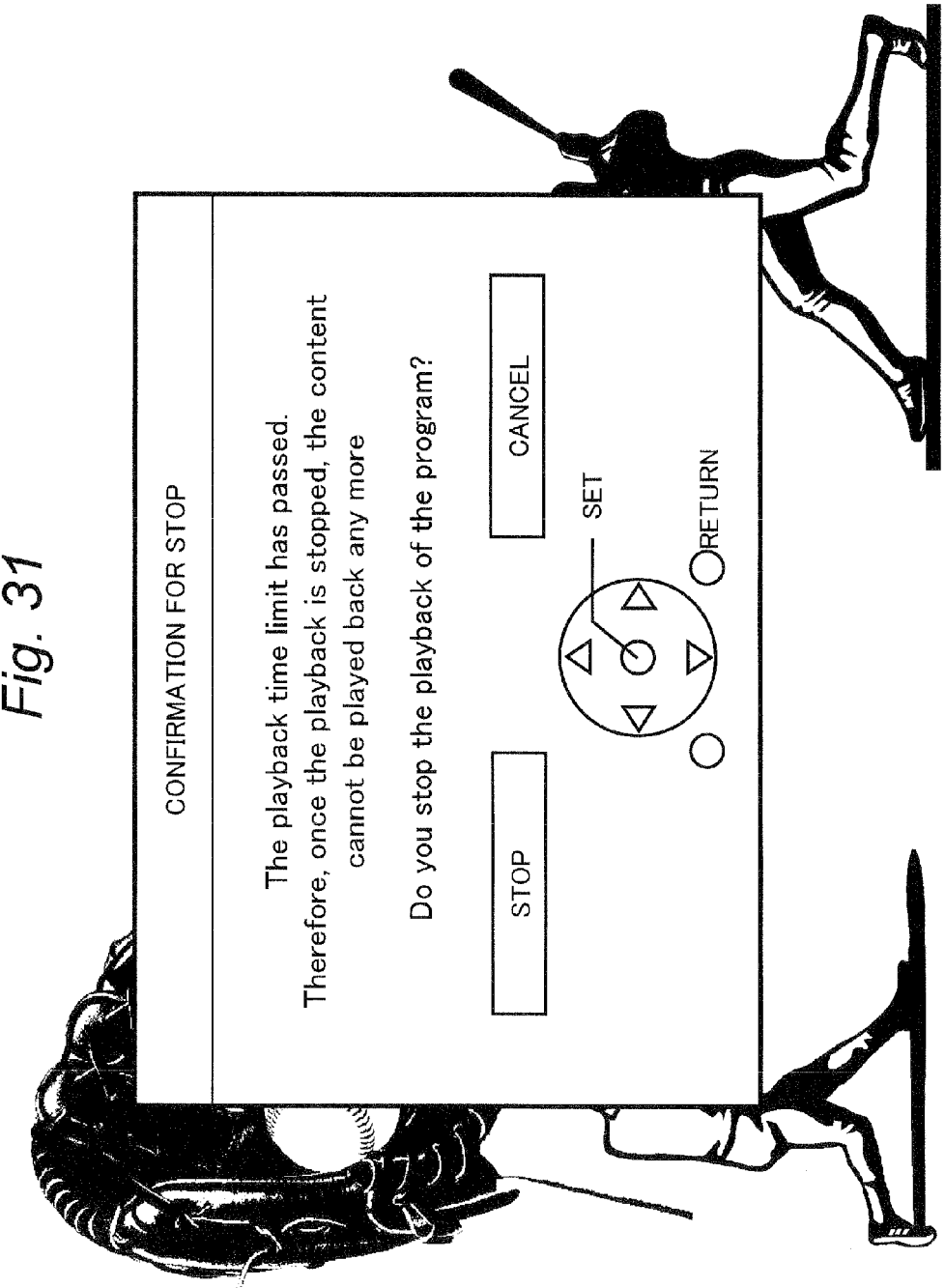
FIG. 31 is a diagram showing an example of a warning screen indicating that playback of a content cannot be performed when the playback of the content is stopped.

When the playback of the content continues, the CPU 212 monitors whether user's instruction for stopping the content is received (S3003). When the user's instruction for stopping the content is received, the CPU 212 temporarily stops the playback of the content, and displays a warning screen including a warning message indicating "The playback time limit has passed. Therefore, once the playback is stopped, the content cannot be played back any more" and a selection button to select execution/cancel of the playback stop (S3004). FIG. 31 shows an example of the warning screen. A still image of the content being played back may be displayed on a background of the warning screen.

The user selects whether the playback of a content is stopped on the warning screen (S3005). When the user instructs the playback of the content to be stopped, the playback of the content is stopped (S3006). On the other hand, when the instruction for stopping the playback of the content is canceled, playback of the content is continued (S3001).

More specifically, when the playback time limit of the content passes after the instruction receiver 216 receives the instruction of starting of the playback, the CPU 212 and the video decoder 207 continue the playback of the content even after the playback time limit passes. However, when the playback of the content is stopped after the playback time limit passes, the CPU 212 and the video decoder 207 performs the control not to play back the content even though the instruction receiver 216 receives the instruction of starting the playback. For this reason, when the instruction receiver 216 receives an instruction for stopping the playback of the content after the instruction receiver 216 receives the instruction of starting the playback and after the playback time limit passes, the CPU 212 and the graphic controller 208 display a warning screen indicating that the content cannot be played back again once the playback of the content is stopped.

The display of the warning screen as described above can inform the user of the possibility that the content cannot be played back due to expiration of the playback time limit. Thus unpredictable circumstances for the user can be avoided and convenience can be improved.

It is noted that a still picture of the content may be displayed at the output of the warning information.

After the warning screen is output by the CPU 212 and the graphic controller 208, when the instruction receiver 216 receives an instruction of stopping playback of the content, the drive controller 204 and the video decoder 207 stops the playback of the content. In this manner, even though the playback time limit has passed, the user can stop the playback of the content.

When the instruction receiver 216 does not receive a playback instruction for a predetermined time in a condition that the stop of the content is instructed and the warning information is output, a playback instruction may not be executed even though the instruction receiver 216 receives the playback instruction. More specifically, in cases where a warning information is output when the instruction receiver receives an instruction for stopping the playback of the content after the playback time limit passes during playback of the content having the playback time limit, the drive controller 204 and video decoder 207 do not execute the playback of the content even though the instruction receiver 216 receives the playback instruction of the content, when a predetermined time passes after the instruction for stopping is received.

Hence, even though the warning is output, the playback is prohibited when the predetermined time passes.

When the playback of the content is stopped, the content may be erased. In this case, on the warning screen indicating that the content cannot be played back again once the playback of the content is stopped, it may be also warned that the content is erased when the playback of the content is stopped.

A pause state may be regarded as a playback state so that the playback of the content may be allowed. In this case, it is configured that, when play back of the content in pause is instructed, the content is played back normally.

7-3 Forcible Ending of Playback of Content After Playback Time Limit Has Passed

Figure 30:
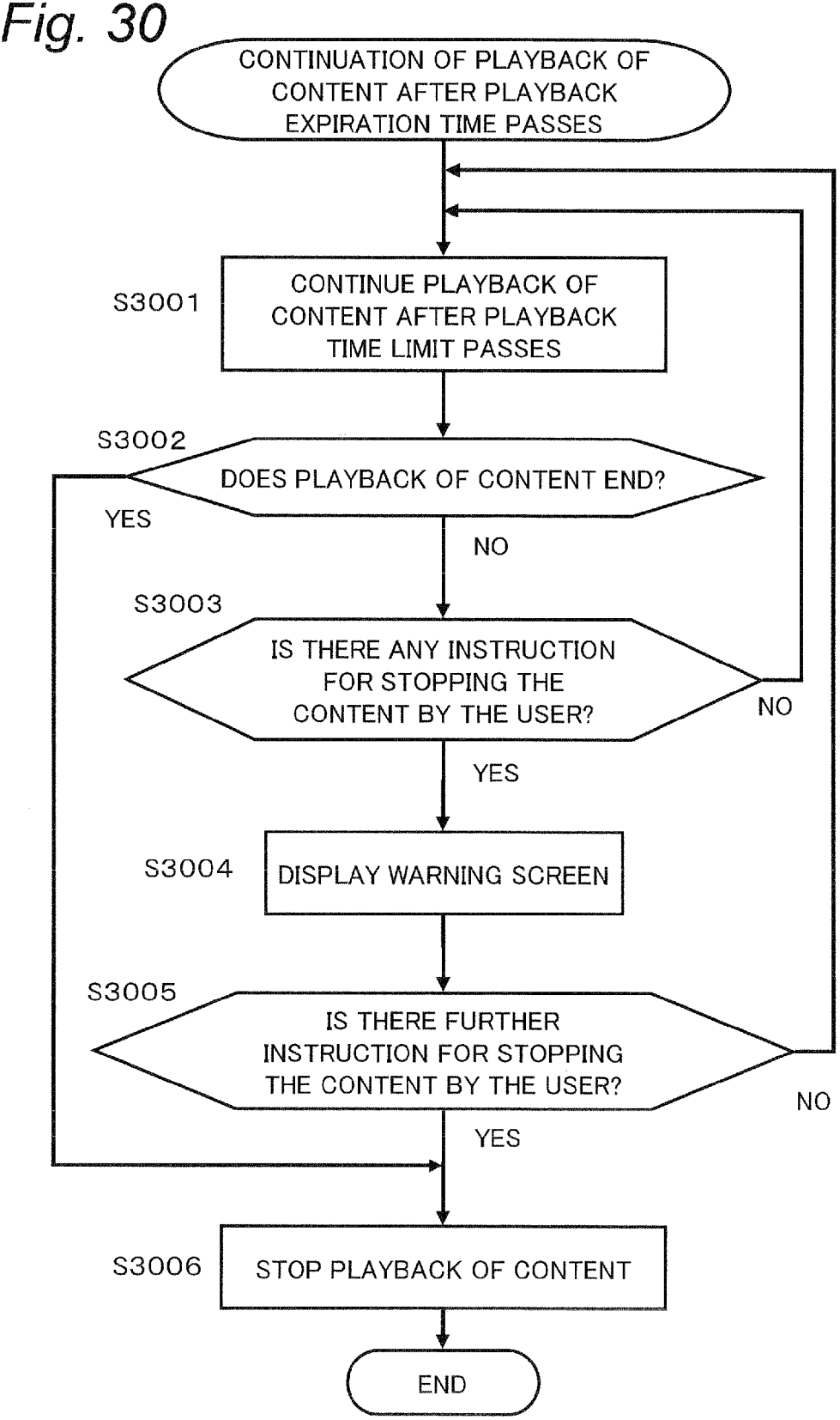
FIG. 30 is a flow chart showing a playback operation of a content after the playback time limit of the content is expired.

Only under the control of the flow chart shown in FIG. 30, even though a playback time limit has come during playback of a content, the content can be semipermanently played back unless the playback of the content is stopped. More specifically, it is possible to continue to play back the content regardless of the playback time limit by bringing the content to a pause with an instruction from a user and canceling the pause. However, if such semipermanent playback is permitted, playback time limits of contents cannot be managed. Therefore, the recorder 101 according to the embodiment further includes a function of forcibly ending playback of a content and a function of preventing a content from being newly played back when a predetermined time (for example, 4 hours) passes from the playback time limit.

Figure 32:
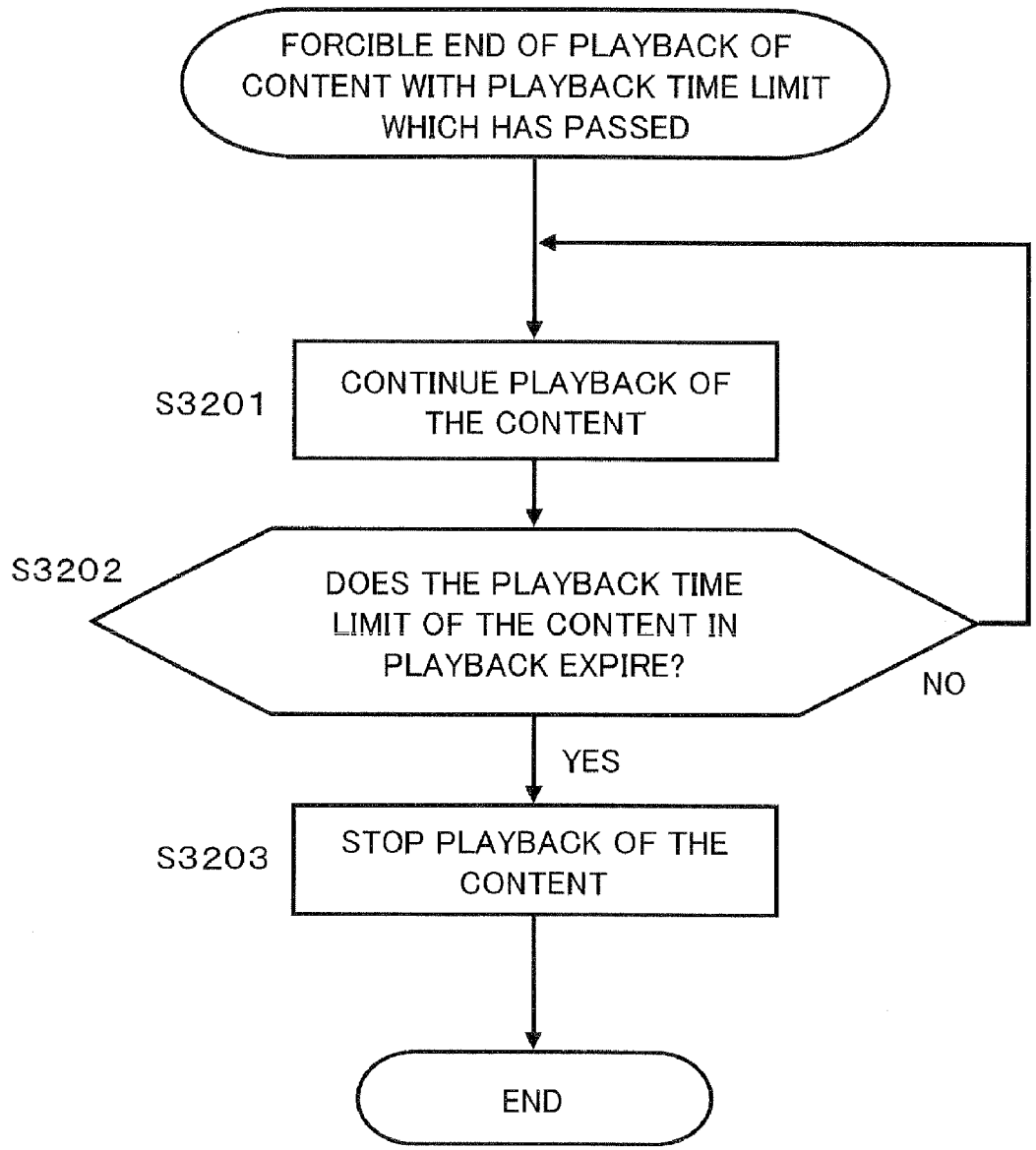
FIG. 32 is a flow chart showing an operation of forcibly ending playback of a content after expiration of the playback time limit.

An operation of forcibly ending playback of a content after the playback time limit elapses will be explained below by using a flow chart in FIG. 32.

When playback of a content is continued after the playback time limit of the content elapses (S3201), the CPU 212 determines whether the playback time limit of the content being played back has passed (S3202). This determination is performed by comparing information related to a playback time limit of license information with time information of the secure clock manager 219, in a predetermined cycle. When there is a content of which playback time limit has passed for a predetermined time (for example, 4 hours) or more, the CPU 212 causes the drive controller 204 to stop the playback of the content (S3203). Even though the CPU 212 receives an instruction for playback of the content from a user, the CPU 212 does not newly execute playback of the content. On the other hand, when the predetermined time or more has not elapsed from the playback time limit of the content being played back, the CPU 212 does not prohibit the content from being played back.

Figure 33:
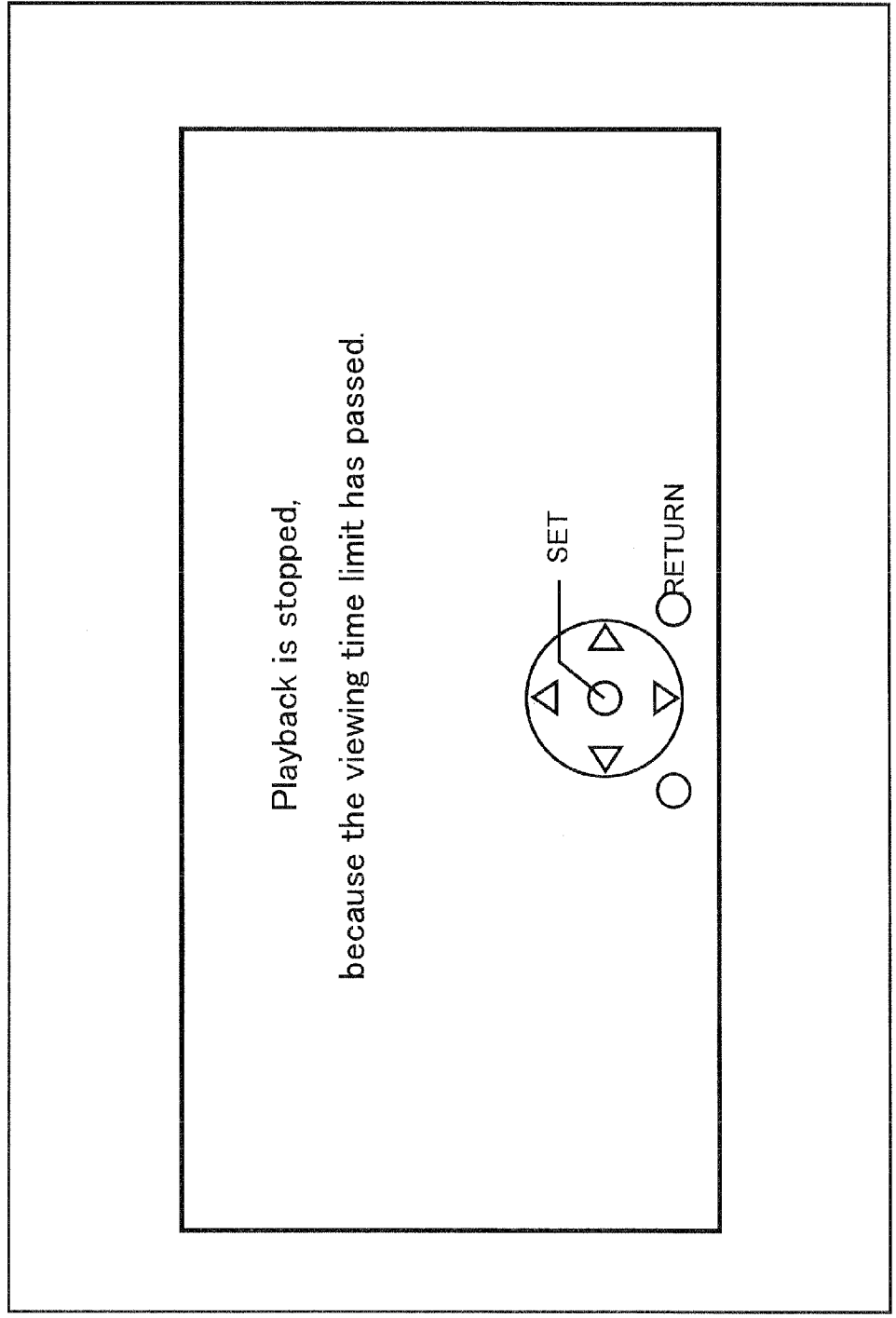
FIG. 33 is a diagram showing an example of a warning screen for a stop of playback of a content.

When the playback of the content is stopped because the predetermined time has elapsed from the playback time limit, a warning screen as shown in FIG. 33 is displayed. When the playback of the content is stopped, the content may be erased.

More specifically, the drive controller 204 and the video decoder 207 continue the playback of the content, even after the instruction receiver 216 receives an instruction for starting the playback and after the playback time limit of the content with a playback time limit passes. On the other hand, even though the playback is continued, when the predetermined time elapses after the playback time limit, the playback of the content is stopped.

In this manner, even though the content of which playback time limit has passed is permitted to be played back, the content can be prevented from being semipermanently played back. Therefore, the content being played back can be prevented from being erased, and a playback time limit can be given to the content.

In the above operation, when the playback of the content is stopped, a waning indicating the playback time limit has passed may be displayed.

More specifically, when the drive controller 204 and the video decoder 207 stop the playback of the content after a predetermined time elapses, the CPU 212 and the graphic controller 208 output warning information related to the playback time limit of the content.

In the embodiment, the predetermined time which is an overtime limit is not limited to 4 hours, but may be arbitrarily set.

7-4 Warning Before Content Playback Time Limit Passes

A warning operation related to a playback time limit before a playback time limit of a content passes will be explained. As explained in Section 7-2 "Operation performed when playback time limit passes during playback of content", when a content is played back around the playback time limit of the content, the playback time limit of the content may have passed during the playback of the content. When the playback time limit of the content being played back passes, if a user erroneously instructs stop of the playback, the user cannot play back the content thereafter. Therefore, when a content is played back around the playback time limit of the content, a warning screen indicating that when playback of the content is stopped, the content can not possibly be played back is displayed, so that the possibility that the user erroneously instructs the playback to be stopped can be reduced.

Figure 35:
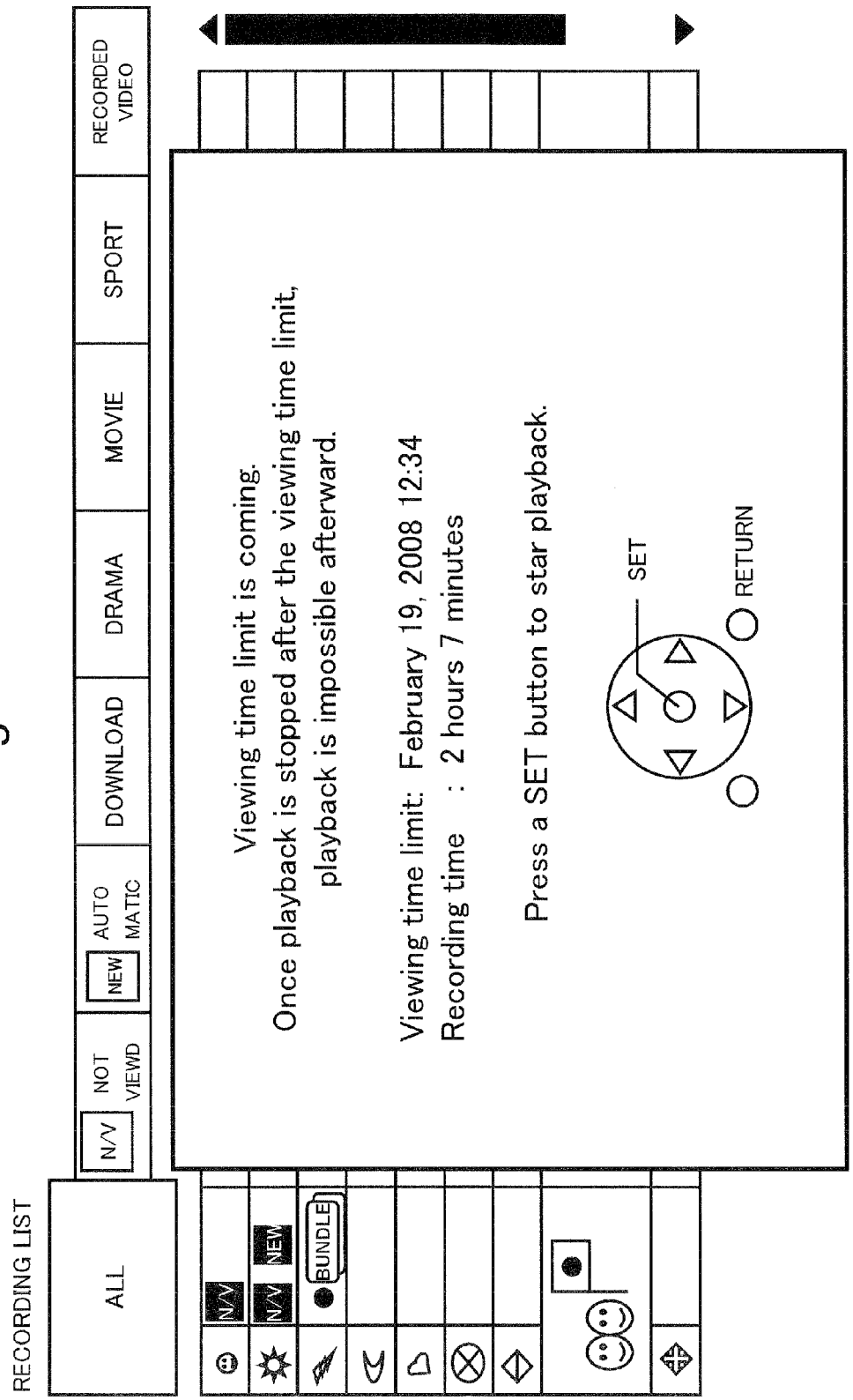
FIG. 35 is a diagram showing an example of a warning screen indicating that a content may not be re-started when playback of the content is stopped in the case where the content is played back just before the playback time limit.

FIG. 35 shows an example of such a warning screen. A playback time limit of a content to be played back is 12:34 on Feb. 19, 2008, and a recording time is 2 hours and 7 minutes. Therefore, when the playback is started after 10:27 on Feb. 19, 2008, the warning screen must be displayed.

The recorder 101 according to the embodiment displays a warning screen before a content is played back when a playback time limit possibly comes during the playback of the content. By this configuration, the possibility that the user erroneously instructs the stop of the playback is reduced. In the example described above, when the content is played back after 10:27 on Feb. 19, 2008, the warning screen is displayed.

Figure 34:
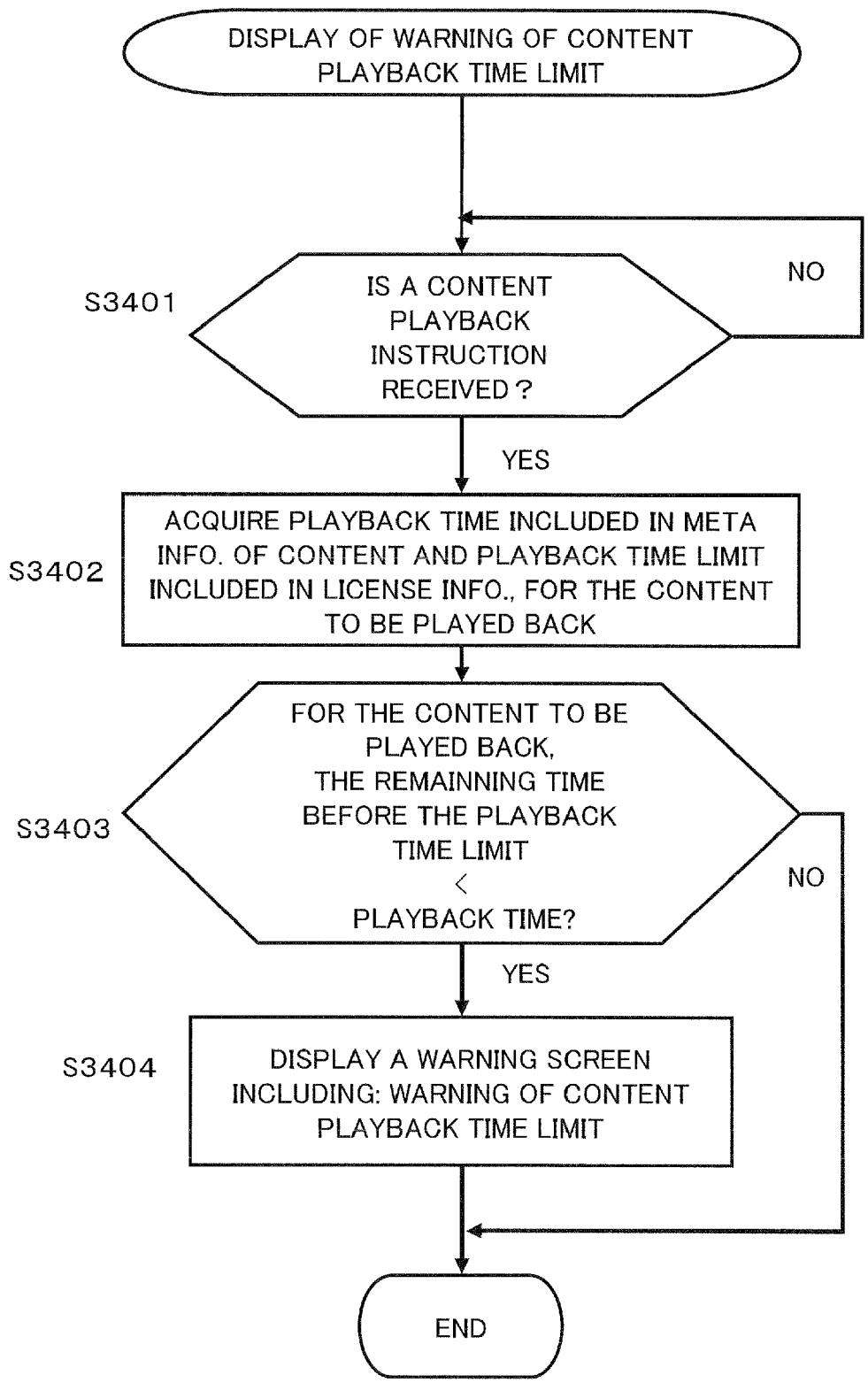
FIG. 34 is a flow chart showing an operation of warning related to playback time limit of a content before expiration of the playback time limit.

This operation will be concretely explained below by using a flow chart in FIG. 34. When receiving from the instruction receiver 216 an instruction for playback of a content (S3401), the CPU 212 instructs the drive controller 204 to record, in the RAM 213, license information and meta information of a content which is recorded in the HDD 205 and is about to be played back. In response to this instruction, the drive controller 204 records the license information and the meta information of the content recorded in the HDD 205, in the RAM 213. A playback time limit of the content is described in the license information, and the playback time limit and a playback time of the content are described in the meta information. For this reason, the CPU 212 acquires the playback time limit and the playback time of the content (S3402). The CPU 212 determines whether the warning screen is required to be displayed based on the playback time limit included in the meta information, the information of the playback time of the content, and the time information of the secure clock manager 219 (S3403). More specifically, when a remaining time until the playback time limit is shorter than the playback time of the content, the CPU 212 instructs the graphic controller 208 to display a warning screen related to the playback time limit. In response to this instruction, the graphic controller 208 acquires image data of a warning screen related to a viewing time limit from the memory 209, superposes the image data on a recording list image, and displays the recording list image on the digital television 100 through the video output unit 210 (S3404).

FIG. 35 is an example of the warning screen related to the viewing time limit displayed on the digital television 100. When a user presses the set button on the remote controller 102 when the warning screen is displayed, playback of the content is started.

More specifically, when receiving an instruction of playback a content with a playback time limit recorded in the HDD 205, the CPU 212 detects a playback time which is a time required to complete the playback of the content. The CPU 212 and the graphic controller 208 output warning information related to the playback time limit based on the playback time limit of the content and the playback time detected by the CPU 212 for the content.

In this manner, since the warning screen is displayed on the digital television 100 before a content of which playback time limit passes during playback is played back, the possibility that a user erroneously instructs the stop of the playback can be reduced.

The CPU 212 detects whether the playback of the content in the HDD 205 is completed. When the playback is not completed, the CPU 212 may output a warning. More specifically, with respect to a content of which playback time limit comes within a predetermined period in the contents recorded in the HDD 205, the CPU 212 detects whether the drive controller 204 and the video decoder 207 complete the playback of the content. When the playback of the content is not completed, the CPU 212 and the graphic controller 208 output warning information related to the playback time limit.

More specifically, the recorder 101 of the embodiment is a recorder capable of recording and playing back a content which is downloaded from the content server 104. The recorder 101 includes the HDD 205 configured to store a content having playback time limit, downloaded from the content server 104, the instruction receiver 216 configured to receive an instruction for starting playback of a content, the drive controller 204 and video decoder 207 which are configured to play back the content stored in the HDD 205 according to the instruction received by the instruction receiver 216, the CPU 212 configured to detect whether playback of a specific content is completed by the drive controller 204 and video decoder 207, the specific content being stored in the HDD 205 and having a playback time limit which comes within a predetermined period after the instruction receiver receives the instruction, and the CPU 212 and graphic controller 208 configured to output a warning information related to the playback time limit based on the detection result of the CPU 212.

In this manner, the warning screen is displayed on the digital television 100 before a playback time limit of a content which is not completely viewed by a user comes. Therefore, regarding the content which is not completely viewed, the possibility that the playback time limit comes in a condition that the content is not completely viewed can be reduced.

The CPU 212 and graphic controller 208 display the warning information when the remaining time before the playback time limit with respect to a time the instruction receiver 216 receives an instruction is smaller than the playback time of the content. In this manner, since a warning information is displayed when the remaining time before the playback time limit is smaller than the playback time of the content, the possibility that the playback time limit for the content which is not completely viewed comes in a condition that the content is not completely viewed can be reduced.

The warning information to be displayed may include means for instructing the drive controller 204 and video decoder 207 to play back the content, as shown in FIG. 35. By this configuration, the user can easily restart the playback of the content.

After a predetermined period elapses after the warning screen is displayed, playback of a content may be automatically started. This configuration allows the content to be automatically played back even though the user forgets to start the playback of the content with the warning screen being displayed.

The warning screen may be superposed on a recording list and displayed as shown in FIG. 35. That is, the warning screen is displayed on the digital television 100, and at the background of the warning information the image indicating the list of contents stored in the HDD 205 is displayed. The warning screen may be superposed on a playback screen of a content. At this time, the content may be displayed at the background of the warning information. That is, the warning screen is displayed on the digital television 100, and the content is displayed at the background of the warning information. Further, the warning screen may be displayed in pause at the first frame after the playback of the content starts. Then, after a predetermined time elapses, the display of the warning screen may be stopped and the playback of the content may be started.

That is, the warning information is displayed in pause at the first frame of the content to be displayed at the background of the warning information, and then after a predetermined time elapses, the display of the warning screen is stopped and the pause of the content is cancelled.

The content may be erased when the content is stopped. More specifically, regarding a content with a playback time limit among the contents recorded in the HDD 205, the drive controller 204 and the video decoder 207 cannot play back the content at a predetermined timing and after the playback time limit passes. The CPU 212 erases the content at a timing the drive controller 204 and video decoder 207 becomes unable to play back the content.

At a background of the warning screen, the recording list may be displayed or the content may be played back.

In the embodiment, the timing at which the warning screen is displayed is set as a timing at which "the remaining time before playback time limit <the playback time". However, this is not strictly applied, and the warning screen may be output slightly early or belatedly within a range which the effect of the present invention can be expected.

The embodiment shows the example in which, when the playback time limit comes during the playback of the content, the warning screen is displayed in advance. However, not only when the playback time limit comes during the playback of the content, but also when the playback time limit comes within a predetermined time after a playback start instruction is received, the warning screen may be similarly displayed.

7-5 Erasing of Content After Playback Time Limit Passes

An operation of erasing a content of which playback time limit has passed will be explained. Any one of the following three timings can be set to a timing at which the content is erased:

1) A timing in a sequence of power-off of the recorder 101;
2) A timing of displaying a recording list (i.e., timing of creating a recording list); and
3) A timing based on a relation between a playback time limit and a playback timing, regardless of an operation state of the recorder 101.

Erasing operations at the three timings will be concretely explained below.

7-5-1 Erasing in Sequence of Power-off

Figure 36:
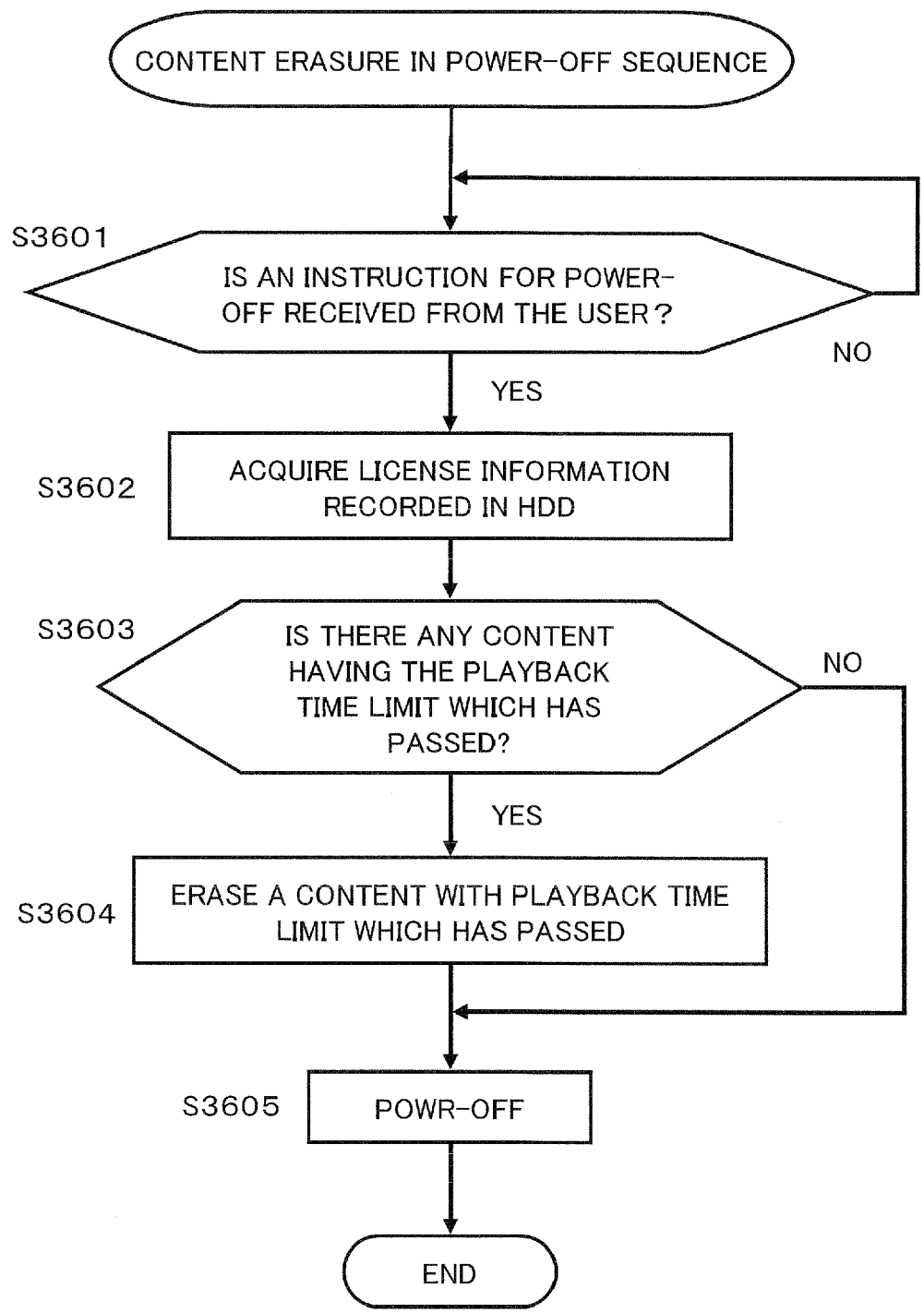
FIG. 36 is a flow chart showing an operation of erasing a content in a turn-off sequence of a power supply.

A case in which a content is erased in a sequence of power-off will be explained by using a flow chart in FIG. 36.

The CPU 212 determines whether a user instructs the recorder 101 to be turned off through the remote controller 102 (S3601). When the user instructs the recorder 101 to be turned off, the CPU 212 instructs the drive controller 204 to read license information of a content recorded in the HDD 205. In response to the instruction, the drive controller 204 reads the license information of the content recorded in the HDD 205 and records the license information in the RAM 213 (S3602).

The CPU 212 interprets information related to a playback time limit of the license information recorded in the RAM 213 to determine whether there is a content of which playback time limit has passed among the contents recorded in the HDD 205 (S3603). When the content of which playback time limit has passed is present, the CPU 212 instructs the drive controller 204 to erase the content. The drive controller 204 erases the content from the HDD 205 (S3604).

On the other hand, when there is no content of which playback time limit has passed, the CPU 212 does not execute the instruction for erasing the content. Thereafter, the recorder 101 performs a predetermined operation for power-off and then the recorder 101 is turned off (S3605).

As described above, after the user instructs the recorder 101 to be turned off, determination of a content to be erased and erasing of the content are executed.

More specifically, regarding a content with the playback time limit among the contents recorded in the HDD 205, the CPU 212 erases the content when the instruction receiver 216 receives an instruction for power-off.

In other words, the recorder 101 of the embodiment is a recorder capable of recording and playing back a content which is downloaded from the content server 104. The recorder 101 includes the HDD 205 or disk 206 configured to store a content having playback time limit, downloaded from the content server 104, the instruction receiver 216 configured to receive an instruction for power-on/off of the recorder 101, and the CPU 212 and the drive controller 204 which are configured to erase a content from the HDD 205 or disk 206. The CPU 212 and the drive controller 204 erase a content of which playback time limit has passed from the HDD 205 or disk 206 when the instruction receiver 216 receives the instruction for power-on/off of the recorder 101.

In this manner, determination of a content to be erased and erasing of the content can be performed in parallel with other operation such as a playback of a content, so that it is possible to prevent application of a large processing load to the CPU 212 and therefore the recorder 101 can be stably operated.

When the recorder 101 is turned on after the content is erased, the recorder 101 may display a warning screen indicating that the content has been erased at the next start of the recorder 101. More specifically, the recorder 101 may operate as follows.

When the instruction receiver 216 receives an instruction for power-on of the recorder 101, the CPU 212 instructs the graphic controller 208 to display a warning screen indicating the content has been erased. The graphic controller 208 reads image data recorded in the memory 209 and used for displaying that the content has been erased, and outputs the image data to the digital television 100 through the video output unit 210.

That is, when the content is erased from the HDD 205, the information related to the erased content is recorded as erasure information in the HDD 205. When the instruction receiver 216 receives the instruction for power-on, the video output unit 210 reads the erasure information from the HDD 205 and outputs it.

When the recording list is displayed, the erasure information may be displayed. More specifically, when the content is erased from the HDD 205, the CPU 212 stores information related to the erased content in the HDD 205 as erasure information. When the instruction receiver 216 receives an instruction for power-on, the CPU 212 reads the erasure information from the HDD 205 and displays the erasure information together with the recording list. In other words, the recorder 101 includes the CPU 212 and graphic controller 208 configured to create list image data displaying a list of content information related to each of all or part of contents stored in the HDD 205. The CPU 212 and graphic controller 208 outputs the erasure information when creating the list image data. In this manner, a user can know that the content has been erased because the playback time limit of the content has passed.

An upper limit of the number of contents which can be erased at once may be set. In this manner, a time required to erase a large number of contents can be reduced, and a timing at which the recorder 101 is turned off can be prevented from being delayed. In contents of which playback time limits have passed, a predetermined number (upper limit) of contents are preferably erased in a chronological order of viewing time limit or a descending order of content size.

The CPU 212 and drive controller 204 may monitor the playback time limit of the content periodically and erase the content of which playback time limit has come. This configuration allows the playback time limit to be managed at appropriate timing regardless of the operation of the recorder 101 such as power-on/off.

7-5-2 Erasing at Display of Recording List

Figure 37:
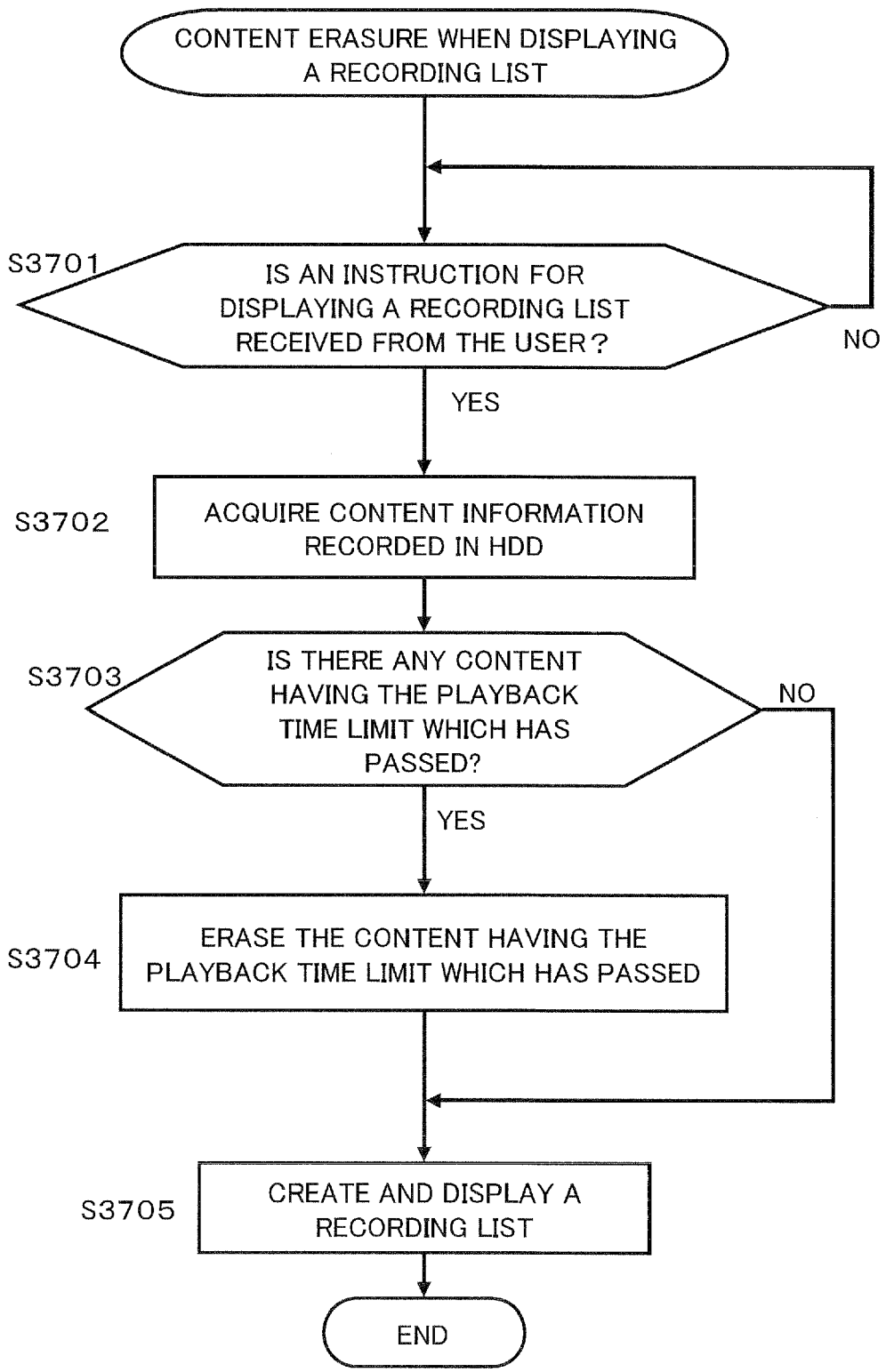
FIG. 37 is a flow chart showing an operation of erasing a content in a sequence of a recording list.

A case in which a content is erased in a display (creation) of a recording list will be explained by using a flow chart in FIG. 37. The CPU 212 determines whether a user instructs to display a recording list through the remote controller 102 (S3701). When the user instructs to display the recording list, the CPU 212 instructs the drive controller 204 to read information of a content recorded in the HDD 205. The drive controller 204 reads license information of the content recorded in the HDD 205 and records the license information in the RAM 213 (S3702).

The CPU 212 interprets information related to a playback time limit of the license information recorded in the RAM 213 to determine whether there is a content of which playback time limit has passed among the contents recorded in the HDD 205 (S3703). When there is the content of which playback time limit has passed, the CPU 212 instructs the drive controller 204 to erase the content. The drive controller 204 erases the content from the HDD 205 (S3704). Thereafter, a recording list is created and displayed (S3705).

More specifically, with respect to a content with a playback time limit in the contents recorded in the HDD 205, the CPU 212 and the graphic controller 208 erases the content when the recording list image data is created.

In other words, the recorder 101 of the embodiment is a recorder capable of recording and playing back a content which is downloaded from the content server 104. The recorder 101 includes the HDD 205 configured to store a content having playback time limit, downloaded from the content server 104, the CPU 212 and graphic controller 208 configured to create list image data displaying a list of content information related to each of all or part of contents stored in the HDD 205, and the CPU 212 and drive controller 204 which are configured to erase a content from the HDD 205. The CPU 212 and drive controller 204 erases the content of which playback time limit has passed from the HDD 205 when the CPU 212 and graphic controller 208 creates the list image data.

With the above operation, when a user creates the recording list, the playback time limit of the content is determined. For this reason, the displayed recording list is a list reflecting always the latest playback time limit. Therefore, a user can be prevented from selecting a content of which playback time limit has passed, and convenience for the user is improved.

An upper limit of the number of contents which can be erased at once may be set. With this arrangement, it is possible to delay a timing at which recording list data is output from the recorder 101, which is caused by erasing a large number of contents. That is, the CPU 212 and drive controller 204 have upper limit of the number of contents which can be erased at once. At this time, a predetermined number (upper limit) of contents may be selectively erased in a chronological order of viewing time limit or a descending order of content size. In short, the CPU 212 and drive controller 204 select a predetermined number (upper limit) of contents from contents of which playback time limits have passed in a chronological order of viewing time limit, and erase the selected contents. Alternatively, the CPU 212 and drive controller 204 select a predetermined number (upper limit) of contents from contents of which playback time limits have passed in a descending order of content size, and erase the selected contents.

When the recorder 101 is turned on after the erasure of the content, the recorder 101 may display a warning screen indicating that the content has been erased, upon the next power-on of the recorder 101. More specifically, the recorder 101 operates as follows.

When the instruction receiver 216 receives an instruction for power-on of the recorder 101, the CPU 212 instructs the graphic controller 208 to display a warning screen indicating that the content has been erased. The graphic controller 208 reads image data recorded in the memory 209 for displaying that the content has been erased and outputs it to the digital television 100 through the video output unit 210.

That is, the recorder 101 includes the instruction receiver 216 configured to receive an instruction for power-on of the recorder 101, and the CPU 212 and video output unit 210 configured to, when the content is erased from the HDD 205, record information related to the erased content as erasure information in the HDD 205, read the erasure information from the HDD 205 and output the read erasure information when the instruction receiver receives the instruction for power-on.

With this arrangement, even though the content recorded in the HDD 205 is erased, information regarding the erasure is presented upon power-on of the recorder 101. Thus the user can know the content which has been automatically erased.

The erasure information may be presented not only upon power-on but also upon creation of the list data by the CPU 212 and graphic controller 208.

7-5-3 Erasing Based on Time Relation to Playback Time Limit

Erasing of a content based on a time relation between a playback time limit and a playback timing will be explained by using a flow chart in FIG. 38.

The CPU 212 records license information recorded in the HDD 205 in a predetermined cycle in the RAM 213 (S3801, S3802).

The CPU 212 interprets information related to a playback time limit of the license information recorded in the RAM 213 to determine whether there is a content of which playback time limit has passed in the contents recorded in the HDD 205 (S3803). When there is the content of which playback time limit has passed, the CPU 212 instructs the drive controller 204 to erase the content. The drive controller 204 erases the content from the HDD 205 (S3804).

More specifically, the CPU 212 erases the content with the playback time limit in the contents recorded in the HDD 205 within a predetermined time after the playback time limit has passed.

In other words, the recorder 101 includes the instruction receiver 216 configured to receive an instruction for power-on of the recorder 101, and the CPU 212 and video output unit 210 configured to, when the content is erased from the HDD 205, record information related to the erased content as erasure information in the HDD 205, read the erasure information from the HDD 205 and output the read erasure information when the instruction receiver receives the instruction for power-on.

With the above operation, a delay of a timing at which a content of which playback time limit has passed is erased can be further shortened.

An upper limit of the number of contents which are erased at once may be set. For example, the upper limit of the number of contents which can be erased at once can be set to 64. A predetermined number (upper limit) of contents may be erased in a chronological order of viewing time limit or a descending order of content sizes.

8. Copying of Content 8-1 Limit of Number of Times of Copy of Content

Copy control of a content when the number of times of copying a content is limited will be explained. An operation performed when a content is copied from the HDD 205 to the disk 206 will be explained below.

When the instruction receiver 216 receives a copying instruction from a user, the CPU 212 performs control to acquire license information of a content to be copied and to record the acquired license information in the RAM 213. When the license information of the content has not been received yet, the license information is downloaded through the network controller 215. The license information includes a decoding key to decode a content to be copied.

In the meta information of the content, as copy limiting information, number of allowable copy of the content is recorded (see FIG. 1B). When the number of allowable copy described in the meta information is 1 or more, the CPU 212 permits the content to be copied, and copies the content in the HDD 205 to the disk 206. The CPU 212 reduces the number of allowable copy described in the meta information by 1 and records the meta information in the HDD 205 through the drive controller 204.

On the other hand, when the number of allowable copy described in the meta information is 0, the CPU 212 prohibits the content to be copied, and does not execute copying of the content from the HDD 205 to the disk 206.

More specifically, the network controller 215 downloads a content stored in the content server 104 and records the content in the HDD 205. The drive controller 204 can copy the content recorded in the HDD 205 to the disk 206. Before the drive controller 204 executes copying, the network controller 215 acquires copy limiting information (for example, the number of allowable copy) of a content to be copied, and determines whether copying is permitted based on the acquired copy limiting information.

The number of times of copy of the content may be recorded in the HDD 205. The copy limiting information may include the number of allowable copies of a content to be copied. When the number of allowable copies is equal to or smaller than the number of times of copy of the content recorded in the HDD 205, it may be determined that the content cannot be copied.

With the above operation, the number of times of copy can be limited to a downloaded content. Therefore, the number of times of copy of a downloaded content can be limited on a content distribution system side.

The number of times of copy may be managed by counting it up. In this case, the CPU 212 counts up the number of times of copy (initial value: 0) one by one every copying process and records the counted-up number of times of copy in the HDD 205 or the like. The CPU 212 compares the counted-up number of times of copy with the number of allowable copy described in the meta information. The CPU 212 may determine that the content cannot be copied when the counted-up number of times of copy is equal to or larger than the number of allowable copy.

8-2 Limit of Copying Period of Content

Copying control of a content performed when a copying period of a content is limited will be explained. An operation performed when a content is copied from the HDD 205 to the disk 206 will be explained below.

When the instruction receiver 216 receives a copying instruction from a user, the CPU 212 performs control to acquire license information of a content to be copied and to record the acquired license information in the RAM 213. When the license information of the content is not received, the license information is downloaded through the network controller 215. The license information includes a decoding key to decode a content to be copied.

In meta information of a content, as copy limiting information, a copy expiration time of the content is recorded (see FIG. 1B). The CPU 212 compares the copy expiration time of the content recorded in the meta information with time information (present date and time) of the secure clock manager 219. When the present date and time is before the copy expiration time recorded in the meta information, the CPU 212 permits the content to be copied and records the content in the HDD 205 to the disk 206.

On the other hand, when the present date and time are after the copy expiration time described in the license information, the CPU 212 prohibits the content from being copied, and does not execute copying of the content from the HDD 205 to the disk 206.

More specifically, the copy limiting information includes a copy expiration time of a content to be copied. When determining that the copy expiration time has passed, the CPU 212 decides that the copy is impossible.

With the above operation, a copy expiration time of a downloaded content can be limited for a downloaded content. Therefore, the copy expiration time of the downloaded content can be limited on a content distribution system side.

Even though a copy expiration time passes during copying, the copying may be continued. That is, the drive controller 204 starts copying of the content, and thereafter continues the copying even though the copy expiration time passes during the copying of the content.

With this arrange, even though a copy expiration time has passes during copying, it is possible to prevent the copying from being interrupted on the way.

In the above embodiment, as warning means, a warning screen which informs of a warning with texts is used. However, the warning means is not limited to this, and another means such as an audio means or a lamp may be used.

9. Correspondence of Terms

The drive controller 204 is an example of a recording unit. The network controller 215 and the drive controller 204 are an example of a downloading unit. The HDD 205 is an example of a recording medium. The drive controller 204 and the video decoder 207 are an example of a playback unit. The instruction receiver 216 is an example of an instruction receiver. The CPU 212 and the graphic controller 208 are an example of a warning unit. The CPU 212 is an example of a controller. The CPU 212 is an example of a controller. The drive controller 204 and the CPU 212 are an example of a display data creating unit. The CPU 11 is an example of a completion detector. The drive controller 204 and the CPU 212 are an example of an erasing unit. The drive controller 208 and the CPU 212 are an example of a copying unit. The FL display unit 217 is an example of a state display unit. The tuner 201, the ADC 202, the video encoder 203, and the drive controller 204 are an example of a broadcast recording unit. The instruction receiver 216 is an example of a request receiver. The video output unit 210 is an example of erasure information output unit. The CPU 212 and the network controller 215 are an example of connection checking unit. The CPU 212 is an example of editing unit. The CPU 212 is an example of an erasure-prohibition canceling unit. The digital television is an example of a display unit.

The disclosure generally concerns a recording and playback apparatus comprising: a controller; an interface portion receiving meta information including the time-limit for a content, then the content having the time-limit for playback and user commands; and a recording medium (205, 206, 213) storing the content and instructions for configuring the controller. The controller can be, for example, the CPU 212. The interface portion can be, for example, the network controller 215 and the instruction receiver 216. The recording medium can be, for example, the HDD 205, disc 206, flash memory 211 and/or RAM 213. The instructions configure the controller to generate video and/or audio signals to be output based on the content in response to a user command including a request to start the output; determine if the time-limit for playback of the content will expire during the output of the video and/or audio signals; generate warning information related to the time limit if it determines the time limit will expire when a user command including a request to stop output is received during output of the video and/or audio signals; continue the output when a user command including a request to cancel the request to stop is received in response to the warning information; and if a user command including a confirmation of the request to cancel the request to stop is received, prohibiting the output thereafter even if another user command including a request to start the output is received. The controller is further configured to determine if the time-limit for playback of the content is likely to expire during the output of the video and/or audio signals in accordance with the time-limit from the metal information.

Industrial Applicability

A recording and playback apparatus according to the present embodiment can be applied to an apparatus such as a digital television or a digital recorder which can record a broadcast program or the like. The embodiment is explained with reference to the specific embodiment. However, many other changes and modifications and other applications are apparent to a person skilled in the art. Therefore, the present invention is not limited to the specific disclosure mentioned here, and the present invention is limited only by the appended claims. This application is related to Japanese Unexamined Patent Application No. 2008-213779 (filed on Aug. 22, 2008), and the contents of which are incorporated herein by reference.

What is claimed is:

1. A recording and reproducing apparatus capable of recording content downloaded from a server in a recording medium and playing back the content, comprising:
   a recording unit configured to download a content stored in the server to record the downloaded content in the recording medium;
   a playback unit configured to play back the content recorded in the recording medium;
   an instruction receiver configured to receive a stop instruction by a user for stopping download of the content done by the recording unit; and
   a controller configured to control the recording unit, wherein
   the controller controls the recording unit so as to stop the download of the content when the instruction receiver receives the stop instruction for stopping download of the content, and to restart the download of the content when a predetermined time elapses in which the recording unit is in a stop state of the download despite the instruction receiver having received the stop instruction by the user.

2. The recording and reproducing apparatus according to claim 1, wherein
   the controller controls the recording unit so as to stop download of all contents which are being downloaded when the instruction receiver receives the stop instruction, and to restart the download of all the contents after a predetermined time elapses.

3. The recording and reproducing apparatus according to claim 1, wherein
   the controller checks usage state of a communication line used for the download when the download is restarted, and selects a content of which download is restarted according to the usage state.

4. The recording and reproducing apparatus according to claim 3, wherein
   the controller does not restart the stopped download while video-on-demand is being played back.

5. The recording and reproducing apparatus according to claim 3, wherein
   the controller does not restart the stopped download when a content different from the content of which download is stopped is being played back.

6. The recording and reproducing apparatus according to claim 5, wherein
   the controller does not restart automatically a first content of which download is stopped during follow-up playback of a second content different from the first content.

7. A recording and reproducing apparatus capable of recording
   various contents downloaded from a server in a recording medium and playing back the various contents, comprising:
   a recording unit configured to download the various contents stored in the server to record the downloaded contents in the recording medium;
   a playback unit configured to play back the various contents recorded in the recording medium;
   an instruction receiver configured to receive a stop instruction by a user for stopping download of at least one of the various contents; and
   a controller configured to control the recording unit, wherein
   the controller controls the recording unit so as to stop the download of the at least one of the various contents when the instruction receiver receives the stop instruction for stopping the download, and to restart the download of the at least one of the various contents when a predetermined time elapses in which the recording unit is in a stop state of the download despite the instruction receiver having received the stop instruction by the user.

8. The recording and reproducing apparatus according to claim 7, wherein
   the controller controls the recording unit so as to stop download of all the various contents which are being downloaded when the instruction receiver receives the stop instruction, and to restart the download of all of the various contents after a predetermined time elapses.

9. The recording and reproducing apparatus according to claim 7, wherein
   the controller checks usage state of a communication line used for the download when the download is restarted, and selects one or more of the various contents of which download is restarted according to the usage state.

10. The recording and reproducing apparatus according to claim 9, wherein
    the controller does not restart the download of the at least one of the various contents when a content different from the at least one of the various contents of which download is topped is currently being played back.

* * * * *